United States Patent
McGrotty

(10) Patent No.: US 12,317,082 B2
(45) Date of Patent: May 27, 2025

(54) TIRE PRESSURE MONITORING SYSTEM SENSOR AUTHENTICATION

(71) Applicant: SENSATA TECHNOLOGIES, INC., Attleboro, MA (US)

(72) Inventor: John Paul J. P. McGrotty, Newtownabbey (GB)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 377 days.

(21) Appl. No.: 17/668,885

(22) Filed: Feb. 10, 2022

(65) Prior Publication Data
US 2022/0256348 A1 Aug. 11, 2022

Related U.S. Application Data

(60) Provisional application No. 63/148,017, filed on Feb. 10, 2021.

(51) Int. Cl.
| | |
|---|---|
| *H04W 12/122* | (2021.01) |
| *B60C 23/04* | (2006.01) |
| *H04L 67/12* | (2022.01) |
| *H04W 4/80* | (2018.01) |
| *H04W 12/06* | (2021.01) |
| *H04W 12/71* | (2021.01) |

(52) U.S. Cl.
CPC ....... *H04W 12/122* (2021.01); *B60C 23/0462* (2013.01); *H04L 67/12* (2013.01); *H04W 4/80* (2018.02); *H04W 12/06* (2013.01); *H04W 12/71* (2021.01); *B60C 23/0461* (2013.01)

(58) Field of Classification Search
CPC ... H04W 12/122; H04W 12/06; H04W 12/71; H04L 67/12
See application file for complete search history.

(56) References Cited

U.S. PATENT DOCUMENTS

| | | | |
|---|---|---|---|
| 9,280,653 B2 * | 3/2016 | Forest | G06F 21/44 |
| 10,245,904 B1 * | 4/2019 | Van Wiemeersch | H04W 12/106 |
| 10,501,055 B1 * | 12/2019 | Yi | G06Q 50/40 |

(Continued)

FOREIGN PATENT DOCUMENTS

| | | |
|---|---|---|
| EP | 1092569 A2 | 4/2001 |
| EP | 2851217 A1 | 3/2015 |
| EP | 2851217 B1 | 3/2017 |

OTHER PUBLICATIONS

Extended European Search Report, EP22156059.2, Jul. 15, 2022, 7 pages.

*Primary Examiner* — Viral S Lakhia
(74) *Attorney, Agent, or Firm* — Mark H. Williams

(57) ABSTRACT

Methods, apparatus, systems, and computer program products for tire pressure monitoring system (TPMS) sensor authentication are disclosed. In a particular embodiment, an electronic control unit (ECU) of a vehicle receives a first radio frequency (RF) transmission that includes TPMS data and a first signature value. In this particular embodiment, the ECU uses a key value to generate a second signature value and determines whether the second signature value corresponds with the first signature value. In this example embodiment, the ECU uses a determination of whether the second signature value corresponds with the first signature value to determine whether the first RF transmission is from a particular TPMS sensor authenticated to the key value.

29 Claims, 33 Drawing Sheets

(56) References Cited

U.S. PATENT DOCUMENTS

| | | | | |
|---|---|---|---|---|
| 10,812,976 B2* | 10/2020 | Ramic | ................... | H04W 12/06 |
| 10,991,175 B2* | 4/2021 | Zhang | ................... | H04L 63/062 |
| 11,046,287 B1* | 6/2021 | Schafer | ................ | B60R 25/007 |
| 11,165,766 B2* | 11/2021 | Block | ................... | G06F 9/4416 |
| 11,177,953 B2* | 11/2021 | Zeh | ...................... | H04L 9/3271 |
| 11,283,602 B2* | 3/2022 | Brickell | .............. | H04W 12/069 |
| 11,290,437 B2* | 3/2022 | Zhang | ................... | H04L 63/065 |
| 2008/0018448 A1 | 1/2008 | Ghabra et al. | | |
| 2011/0313623 A1* | 12/2011 | Greer | ................. | B60C 23/0437 |
| | | | | 701/49 |
| 2017/0149820 A1* | 5/2017 | Ruvio | .................... | G06N 20/00 |
| 2019/0230615 A1* | 7/2019 | Werner | .............. | B60C 23/0408 |
| 2019/0375519 A1* | 12/2019 | Hartmann | ............ | B64F 1/002 |
| 2020/0066064 A1* | 2/2020 | Jeong | ................... | B60W 40/10 |
| 2020/0207163 A1* | 7/2020 | Schwegler | .......... | B60C 23/0462 |
| 2020/0384815 A1* | 12/2020 | Adler | ...................... | H04W 4/48 |
| 2021/0109189 A1* | 4/2021 | Yamaguchi | ........... | B60R 25/245 |
| 2024/0391278 A1* | 11/2024 | Schubert | ............. | H04W 12/106 |

* cited by examiner

TIRE PRESSURE MONITORING SYSTEM SENSOR AUTHENTICATION

CROSS-REFERENCE TO RELATED APPLICATIONS

This application is a non-provisional application for patent entitled to a filing date and claiming the benefit of earlier-filed U.S. Provisional Patent Application Ser. No. 63/148,017, filed Feb. 10, 2021, the contents of which are herein incorporated by reference in their entirety.

BACKGROUND

The air pressure of a motor vehicle tire can be an important factor of road safety. Improper tire pressure can lead to greater fuel consumption and inferior vehicle controllability. Tire pressure that is too low can lead to an increase in friction between the road and the tire, negatively affecting vehicle controllability. Low tire pressure can also lead to the tire rolling out of the tire rim, resulting in serious accidents. Tire pressure that is too high can reduce friction between the tire and the road, which can lead to skidding and loss of control. In addition, a high-pressure tire is more prone to burst when its temperature increases during use.

It can be tedious to manually check the tire pressure of each tire of a vehicle before every use of the vehicle. Thus, this type of preventative maintenance was often skipped. This led to the development of tire pressure monitoring systems (TPMS) that include one or more sensors to measure an internal pressure of a tire, and wirelessly communicate the tire pressure to a vehicle component.

One issue that is ubiquitous with any wireless communication is security. Accordingly, the disclosure herein addresses various aspects of wireless security, and more particularly, with respect to TPMS.

SUMMARY

Methods, apparatus, systems, and computer program products for tire pressure monitoring system (TPMS) sensor authentication are disclosed. In a particular embodiment, an electronic control unit (ECU) of a vehicle receives a first radio frequency (RF) transmission that includes TPMS data and a first signature value. In this particular embodiment, the ECU uses a key value to generate a second signature value and determines whether the second signature value corresponds with the first signature value. In this example embodiment, the ECU uses a determination of whether the second signature value corresponds with the first signature value to determine whether the first RF transmission is from a particular TPMS sensor authenticated to the key value.

In another embodiment, an ECU receives from a TPMS sensor, a plurality of separate radio frequency (RF) transmissions that each include a different key value portion and uses the different key value portions to generate a key value associated with the TPMS sensor. In this particular embodiment, the ECU uses the generated key value to determine whether a RF transmission that is received after generating the key value is from the TPMS sensor associated with the generated key value.

In another embodiment, an ECU receives one or more radio frequency (RF) transmissions and determines whether characteristics of the one or more RF transmissions align with known characteristics of RF transmissions from an authenticated TPMS sensor. In this particular embodiment, the ECU uses a determination of whether the characteristics of the one or more RF transmissions align with the known characteristics of RF transmissions from the authenticated TPMS sensor to determine whether the one or more RF transmissions are from the authenticated TPMS sensor.

In another embodiment, a TPMS sensor generates TPMS data associated with one or more measurements of a tire and generates transmission data that includes the TPMS data. In this example embodiment, the TPMS sensor uses a key value to generate a signature value for authenticating some portion of the transmission data and includes the signature value in a radio frequency (RF) transmission of the transmission data.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DESCRIPTION OF EMBODIMENTS

The terminology used herein for the purpose of describing particular examples is not intended to be limiting for further examples. Whenever a singular form such as "a", "an" and "the" is used and using only a single element is neither explicitly nor implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled via one or more intervening elements. If two elements A and B are combined using an "or", this is to be understood to disclose all possible combinations, i.e., only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Figure 1:
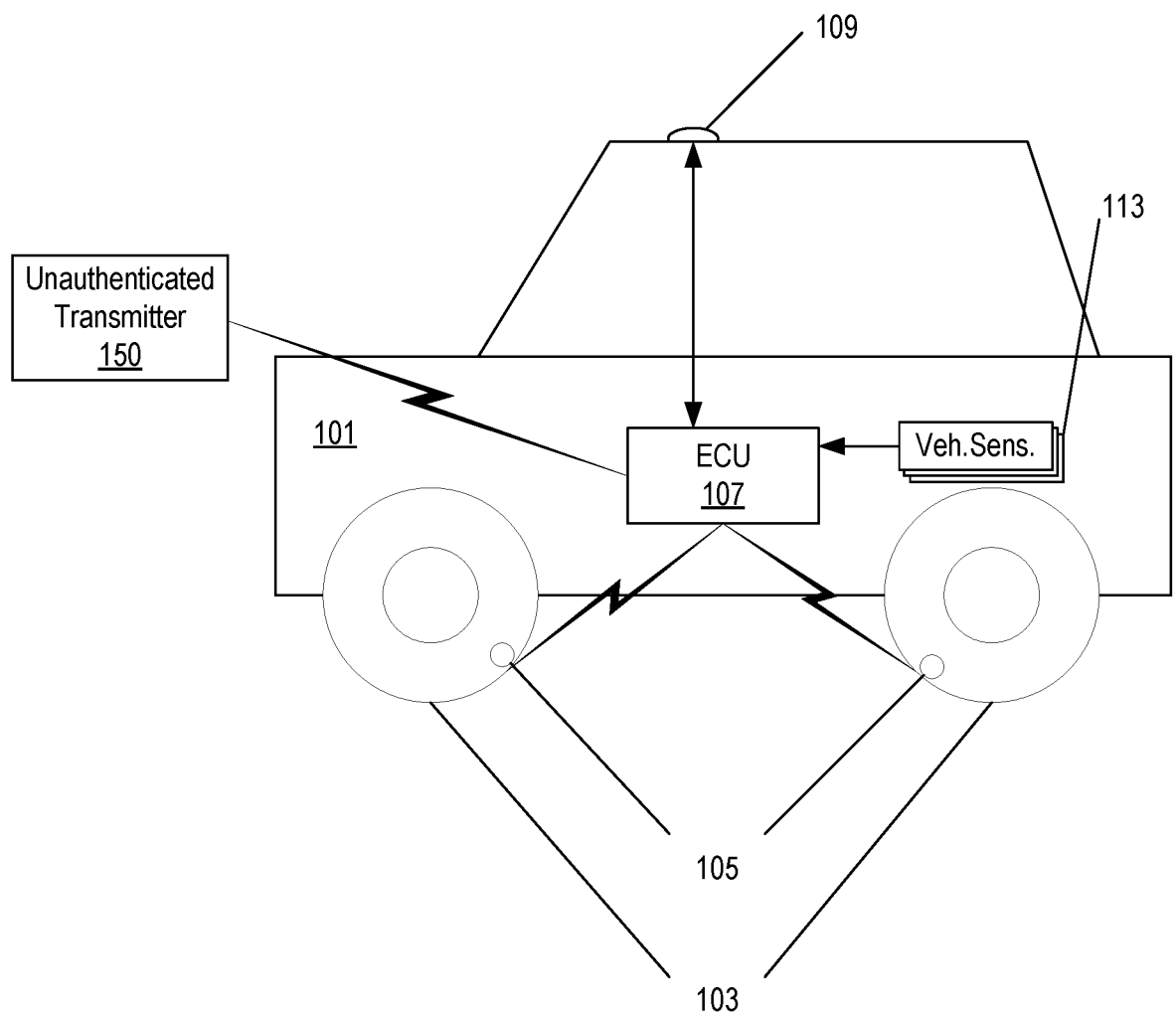
FIG. 1 sets forth a block diagram of a system configured for tire pressure monitoring system (TPMS) sensor authentication in accordance with at least one embodiment of the present disclosure.

Exemplary methods, apparatuses, and computer program products for tire pressure monitoring system (TPMS) sensor authentication in accordance with the present disclosure are described with reference to the accompanying drawings, beginning with FIG. 1. FIG. 1 sets forth a diagram of a system (100) configured for TPMS sensor authentication in accordance with at least one embodiment of the present disclosure. The system (100) of FIG. 1 includes a vehicle (101) equipped with tires (103) that include TPMS sensors (105). While the embodiment of FIG. 1 shows two tires each equipped with a TPMS sensor (105), it will be understood that as few as one, and as many as all, of the tires (103) of the vehicle (101) may include a TPMS sensor (105).

The vehicle of FIG. 1 further includes a vehicle electronic control unit (ECU) (107) that controls various components and systems within a vehicle. In a particular embodiment, the ECU (107) is configured to control one or more vehicle subsystems. Commonly referred to as the vehicle's "computers", an ECU may be a vehicle subsystem control units, such as an Engine Control Module (ECM), a Powertrain Control Module (PCM), a Transmission Control Module (TCM), a Brake Control Module (BCM), a Central Timing Module (CTM), a General Electronic Module (GEM), a Suspension Control Module (SCM). In a particular embodiment, the ECU may be considered a Vehicle Control Unit (VCU) that controls one or more other ECUs.

Each TPMS sensor (105) may be equipped with a wireless transceiver for uni-directional or bidirectional wireless communication with the ECU (107), as will be described in more detail below. The ECU may be similarly equipped with a wireless transceiver for bidirectional wireless communication with each of the TPMS sensors (105), as will be described in more detail below. The bidirectional wireless communication may be realized by low power communication technology such as Bluetooth Low Energy or other low power bidirectional communication technology that is intended to conserve energy consumed. Alternatively, each TPMS sensor (105) may include a unidirectional transmitter configured to transmit signals (e.g., RF signals) to the ECU (107).

Each vehicle system may include sensors (113) used to measure and communicate vehicle operating conditions. For example, the ABS may include wheel speed sensors on the wheelbase used to measure wheel speed. The ESP subsystem may include yaw rate sensors configured to measure the yaw-induced acceleration of the vehicle when the vehicle is maneuvering a curve. Readings from such sensors (113) may be provided to the ECU (107), which may provide parameters based on these readings to the TPMS sensor (105).

The vehicle (101) may further include a transceiver (109) communicatively coupled to the ECU (107) for cellular terrestrial communication, satellite communication, or both.

Readers will appreciate that the ECU (107) may be configured to periodically receive signals indicating vehicle operating conditions. For example, the TPMS sensors (105) may measure tire pressure readings and provide that data to the ECU (107). The ECU (107) may, in turn, be configured to take actions in response to receiving the tire pressure data. Under normal tire pressure conditions, the ECU (107) may periodically receive tire pressure readings from the sensors (105) and take no action. However, in case of low tire pressure, the TPMS sensors (105) may provide tire pressure data that indicates a lower-than-normal reading for tire pressure. The ECU (107) may be configured to receive this lower pressure data from the TPMS sensors (105) and respond with a notification to a driver of the vehicle. A driver of the vehicle may respond to the message by stopping the vehicle to check the tire pressure, because abnormally low tire pressure may lead to a dangerous driving condition. In the case where the vehicle (101) is an autonomous vehicle, the ECU (107) may, alone or in combination with other components, control the vehicle's operation without human inputs. Accordingly, an autonomous vehicle may be configured to automatically slow down or stop in response to receiving a low tire pressure warning.

Readers will appreciate that, an unauthorized person such as a hacker may wish to mimic a legitimate transmission that appears to be from a sensor of the vehicle. If the hacker is able to determine how to mimic RF transmissions from a TPMS such as the TPMS sensors (105) of FIG. 1, the hacker can remotely transmit false or spoofed transmissions (e.g., RF transmissions or other transmissions such as cellular) to the ECU (107). These spoofed RF transmissions may appear legitimate to the ECU (107) and may cause the vehicle to slow down or stop as described above. Relatedly, if the ECU (107) considers an RF transmission received from a hacker to be an apparently authentic TPMS RF transmission, the ECU (107) may then begin to trust all transmissions from this particular source and respond accordingly. In other words, the hacker can use spoofed TPMS RF transmissions as a gateway to transmit other spoofed messages that cause the ECU (107) to take other actions such that the hacker may be able to gain complete remote control of the vehicle (101).

FIG. 1 also depicts an unauthenticated transmitter (150). The unauthenticated transmitter 150 may be configured to send transmissions (such as RF signals, cellular signals, or the like) to the ECU (107) that are capable of being received and processed by the ECU (107). The unauthenticated RF transmitter (150) may be, for example, a device being used by an attacker to compromise the security of the vehicle (101). The attacker may have some knowledge of the operation of the ECU (107) and be aware of signals received by the ECU (107). The attacker may wish to send signals to the ECU (107) that appear to be authentic signals that cause the ECU (107) to take one or more actions.

In order to prevent the ECU (107) from relying on transmissions from the unauthorized transmitter (150), the ECU (107) and the TPMS sensors (105) may be configured for TPMS sensor authentication, according to embodiments of the present disclosure.

In a particular embodiment, the ECU (107) is configured to receive a first radio frequency (RF) transmission that includes TPMS data and a signature value. The ECU (107) is also configured to use a key value to generate a second signature value and determine whether the second signature value corresponds with the first signature value. In this example embodiment, the ECU (107) is also configured to use a determination of whether the second signature value corresponds to the first signature value to determine whether the first RF transmission is from a particular TPMS sensor authenticated to the key value.

In another embodiment, the ECU (107) is configured to receive from a TPMS sensor, a plurality of separate radio frequency (RF) transmissions that each include a different key value portion and use the different key value portions to generate a key value associated with the TPMS sensor. In this particular embodiment, the ECU (107) is also configured to use the generated key value to determine whether a RF transmission that is received after generating the key value is from the TPMS sensor associated with the generated key value. In a particular embodiment, the ECU may only be able to authenticate transmissions after the key value has been determined—leaving a short duration of unauthenticated operation after a sensor replacement.

In another embodiment, the ECU (107) is configured to receive one or more radio frequency (RF) transmissions and determine whether characteristics of the one or more RF transmissions align with known characteristics of RF transmissions from an authenticated TPMS sensor. In this particular embodiment, the ECU (107) is also configured to use a determination of whether the characteristics of the one or more RF transmissions align with the known characteristics of RF transmissions from the authenticated TPMS sensor to determine whether the one or more RF transmissions are from the authenticated TPMS sensor.

In another embodiment, one of more of the TPMS sensors (105) of FIG. 1 are configured to generate TPMS data associated with one or more measurements of a tire and generate transmission data that includes the TPMS data. In this example embodiment, the TPMS sensor (105) is configured to use a key value to generate a signature value for authenticating some portion of the transmission data and include the signature value in a radio frequency (RF) transmission of the transmission data.

The arrangement of devices making up the exemplary system illustrated in FIG. 1 are for explanation, not for limitation. Data processing systems useful according to various embodiments of the present disclosure may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), Bluetooth protocol, Near Field Communication, Controller Area Network (CAN) protocol, and others as will occur to those of skill in the art. Various embodiments of the present disclosure may be implemented on a variety of hardware platforms in addition to those illustrated in FIG. 1.

Figure 2:
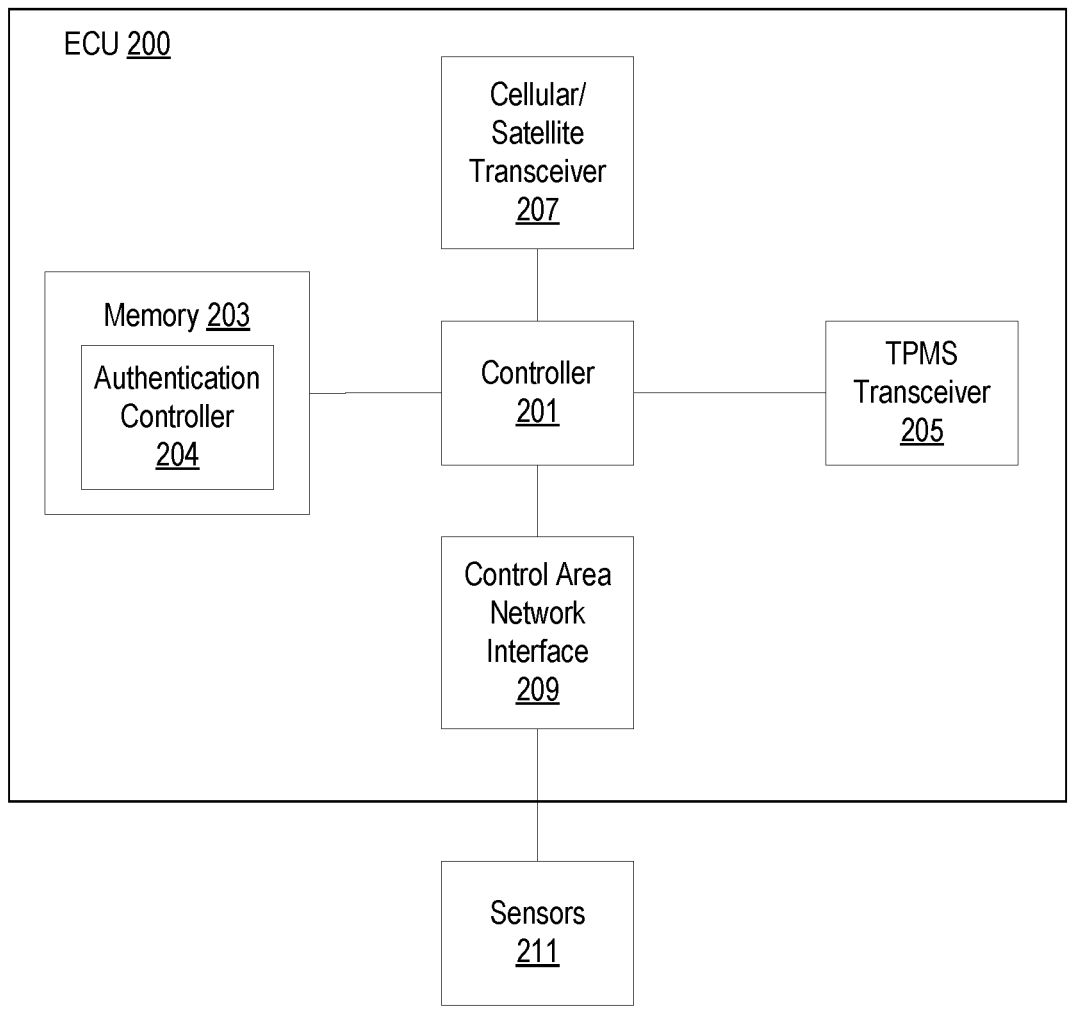
FIG. 2 illustrates a block diagram of an exemplary electronic control unit configured for authenticating a TPMS sensor in accordance with at least one embodiment of the present disclosure.

For further explanation, FIG. 2 sets forth a diagram of an exemplary vehicle electronic control unit (ECU) (200) for TPMS RF authentication according to embodiments of the present disclosure. The ECU (200) includes a controller (201) coupled to a memory (203). The controller (201) is configured to obtain sensor readings related to vehicle operating conditions, as well as data from sources external to the vehicle, and provide configuration parameters to a TPMS sensor, such as TPMS sensor (300) of FIG. 3. The controller may include or implement a microcontroller, an Application Specific Integrated Circuit (ASIC), a digital signal processor (DSP), a programmable logic array (PLA) such as a field programmable gate array (FPGA), or other data computation unit in accordance with the present disclosure. The sensor readings and data, as well as TPMS data received from the TPMS sensor, may be stored in the memory (203). The memory (203) may be a non-volatile memory such as flash memory. For example, the ECU (200) may obtain vehicle operating condition data such as sensor readings from sensors on-board the vehicle.

For bidirectional or uni-directional wireless communication with a TPMS, the ECU (200) includes a TPMS transceiver (205) coupled to the controller (201). In one embodiment, the TPMS transceiver (205) is a Bluetooth Low Energy transmitter-receiver. In other embodiments, the TPMS transceiver (205) may be other types of low power communication technology that is intended to conserve energy consumed in the TPMS. The ECU (200) may further include a transceiver (207) for cellular terrestrial communication, satellite communication, or both.

The ECU (200) may further comprise a controller area network (CAN) interface (209) for communicatively coupling vehicle sensors and devices to the controller (201). The CAN interface (209) couples a plurality of sensors (211) that may include a wheel speed sensor, a yaw rate sensor, an inclination sensor, and a pressure sensor, to the controller (201). The wheel speed sensor measures the rotational angular speed of the wheel, e.g., in radians per second. The yaw rate sensor may be used to measure the yaw-induced acceleration of the vehicle, for example, when the vehicle is maneuvering a curve, which will influence the magnitude of loading on each tire. The yaw rate sensor may also provide information on the shear forces on the tire where it contacts the road. The inclination sensor may detect longitudinal and/or transverse inclination of the vehicle. In a particular embodiment, the wheel speed sensor, the yaw rate sensor, the inclination sensor, and the pressure sensor transmit respective readings to the controller (201).

In some embodiments, the controller (201) may be configured to receive TPMS data from a TPMS sensor while driving. Examples of TPMS data may include but it is not limited to tire pressure data and temperature data. For example, the controller (201) can receive, via the TPMS transceiver (205), the TPMS data from a TPMS sensor indicating the tire pressure level of a tire. For example, the controller (201) can receive data indicating tire pressure level from the TPMS sensor via the TPMS transceiver (205), or from other sensors (e.g., tire pressure sensors, etc.). In some implementations, the controller (201) is configured to receive radio frequency (RF) transmissions from the TPMS sensor. For example, the controller (201) may receive RF transmissions from the TPMS sensor that include TPMS data, such as tire pressure data. The tire pressure data may include tire pressure readings taken by the TPMS sensor for a particular tire of the vehicle.

In some implementations, the controller (201) may be configured to determine whether a particular tire of a vehicle is operating under acceptable tire pressure conditions. Readers will appreciate that vehicle tires may need to maintain a tire pressure within a certain range of values (e.g., 28-36 pounds per square inch (psi)). Where the tire pressure falls outside the defined range, operating the vehicle may result in an unsafe condition. Moreover, even if all tires of a vehicle have pressure values within an acceptable range, there may be a deviation between pressure values for different tires that increases driving risk or adversely impacts vehicle performance, fuel efficiency, tire life, or other aspects of vehicle operation.

Accordingly, the controller (201) may be configured to compare tire pressure values that are received in an incoming RF transmission to default or threshold values or ranges. If a tire pressure value received in an incoming RF transmission does not satisfy a certain threshold value or range, the controller (201) may be configured to take one or more actions. For example, the controller (201) may be configured to present a notification to the driver of the vehicle that tire pressure for one or more tires is too low, too high, and so on. Additionally, or alternatively, the controller (201) may present a recommendation that the driver slow down, stop, inflate the tire, or take other actions to restore the tire to a normal pressure state. In case of an autonomous vehicle, the controller (201) may be configured to slow or stop the vehicle or send a notification to another vehicle system that the vehicle should slow down or stop.

The memory (203) may also include an authentication controller (204) configured for TPMS sensor authentication. In some implementations, the ECU (200) may be configured to receive RF transmissions as described above via the TPMS transceiver (205) and process the incoming RF transmissions using the authentication controller (204).

In a particular embodiment, the authentication controller (204) includes computer program instructions that when executed by the controller (201) cause the controller (201) to carry out the operations of receiving a first radio frequency (RF) transmission that includes TPMS data and a signature value; using a key value to generate a second signature value; determining whether the second signature value corresponds to the first signature value; and using, by the ECU, a determination of whether the second signature value corresponds to the first signature value to determine whether the first RF transmission is from a particular TPMS sensor authenticated to the key value.

In a particular embodiment, the authentication controller (204) includes computer program instructions that when executed by the controller (201) cause the controller (201) to carry out the operations of receiving from a TPMS sensor, a plurality of separate radio frequency (RF) transmissions that each include a different key value portion; using the different key value portions to generate a key value associated with the TPMS sensor; and using the generated key value to determine whether a RF transmission that is received after generating the key value is from the TPMS sensor associated with the generated key value.

In a particular embodiment, the authentication controller (204) includes computer program instructions that when executed by the controller (201) cause the controller (201) to carry out the operations of receiving one or more radio frequency (RF) transmissions; determining whether characteristics of the one or more RF transmissions align with known characteristics of RF transmissions from an authenticated TPMS sensor; and using, by the ECU, a determination of whether the characteristics of the one or more RF transmissions align with the known characteristics of RF transmissions from the authenticated TPMS sensor to determine whether the one or more RF transmissions are from the authenticated TPMS sensor.

Figure 3:
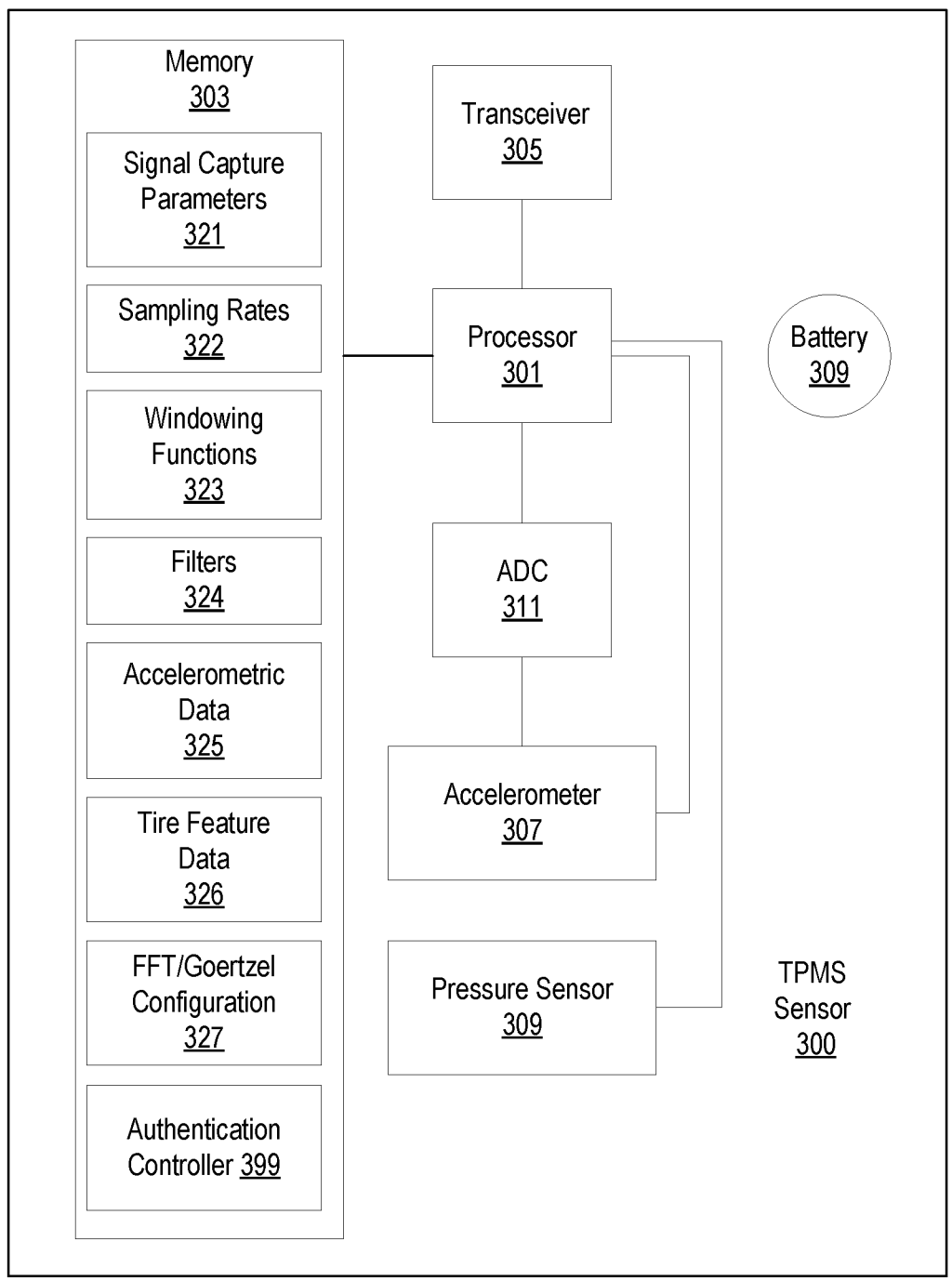
FIG. 3 illustrates a block diagram of an exemplary TPMS sensor configured for authentication with a vehicle component in accordance with at least one embodiment of the present disclosure.

For further explanation, FIG. 3 sets forth a diagram of an exemplary TPMS sensor (300) configured for TPMS RF authentication according to embodiments of the present disclosure. The TPMS sensor (300) includes a processor (301). The processor may include or implement a microcontroller, an Application Specific Integrated Circuit (ASIC), a digital signal processor (DSP), a programmable logic array (PLA) such as a field programmable gate array (FPGA), or other data computation unit in accordance with the present disclosure.

The TPMS sensor (300) of FIG. 3 also includes a memory (303) coupled to the processor (301). The memory may store signal capture configuration parameters (321) and other data received from the ECU (200). The memory (303) may store a sampling rates table (322) of sampling rates each corresponding to a specific parameter value, e.g., a tire pressure of the tire. The memory (303) may also store a windowing function table (323) of windowing functions each corresponding to a specific parameter value, e.g., a tire pressure of the tire. The memory (303) may also store a filter table (324) filter frequency bands, each corresponding to a specific parameter value, e.g., a tire pressure of the tire. The memory (303) may also store accelerometric data (325), including a raw digital signal sampled from the accelerometer (307) by the ADC (311) and a processed accelerometric waveform processed by the processor (301). The memory (303) may also store TPMS data (326), such as tire pressure values extracted by the processor (301). The memory (303) may also store FFT or Goertzel algorithm configurations (327). In some implementations, the TPMS sensor (300) may be configured to transmit RF transmissions as described above via TPMS transceiver (305).

For unidirectional or bidirectional wireless communication with the ECU (200), the TPMS sensor (300) of FIG. 3 includes a transceiver (305) coupled to the processor (301). In one embodiment, the transceiver (305) is a Bluetooth Low Energy transmitter-receiver. In other embodiments, the transceiver (305) may be other types of low energy communication technology that is intended to conserve energy consumed in the TPMS sensor (300). The TPMS sensor (300) transmits TPMS data, such as acceleration profiles and tire pressure values to the ECU (200) via the transceiver (305). In a particular embodiment, the TPMS sensor (300) includes a uni-directional transmitter configured to transmit TPMS data to the ECU (200).

The accelerometer (307) of FIG. 3 may also be an acceleration sensor, an accelerometric device, a shock sensor, a force sensor, a microelectromechanical systems (MEMs) sensor, or other device that is similarly responsive to acceleration magnitude and/or to changes in acceleration. For example, an accelerometer senses acceleration in the radial plane (z-plane) and outputs an electric pulse signal responsive to sensed acceleration. In an embodiment, the accelerometer (307) is configurable with an accelerometer range, a wheel speed parameter, or other vehicle parameter provided by the ECU (200). For example, g-offset can be determined via wheel speed sensor or another vehicle parameter and used to capture and process signals faster. Accelerometers may have a selectable range of forces they can measure. These ranges can vary from ±1 g up to ±700 g. An example range of an accelerometer is ±200 g. The accelerometer range may be configured based on wheel speed, for example, ±150 g at a low speed, ±250 g at a medium speed, and ±500 g at a high speed. Typically, the smaller the range, the more sensitive the readings will be from the accelerometer. The pressure sensor (309) of FIG. 3 may be an air pressure sensor that measures the air or gas pressure inside a tire of the vehicle. The pressure sensor (309) may be mounted onto the rim of a wheel of the vehicle so that it is inside a tire.

The TPMS sensor (300) of FIG. 3 also includes an analog to digital converter (ADC) (311) that receives the electric pulse signals from the accelerometer (307) and samples them according to a sampling rate. The ADC (311) converts the raw analog signals received from the accelerometer (307) into a raw digital signal that is suitable for digital signal processing. The sample rate of the ADC (311) may be configured via wheel speed from the wheel speed sensor or another vehicle-provided parameter from a vehicle sensor.

The TPMS sensor (300) of FIG. 3 also includes a battery (309) connected to a power bus (not shown) to power the transceiver (305), the processor (301), the ADC (311), the accelerometer (307), and the memory (303). One skilled in the art will realize that the TPMS sensor (300) may be powered by other sources alternative to or in addition to the battery (309), such as an energy harvester or other power source.

In some implementations, the TPMS sensor (300) may be configured to send radio frequency (RF) transmissions to a recipient, such as the ECU (107) of FIG. 1 or the ECU (200) of FIG. 2.

The memory (303) may include an authentication controller (399) configured for TPMS sensor authentication, according to one or more embodiments of the present disclosure. In a particular embodiment, the authentication controller (399) includes computer program instructions that when executed by the processor (301) cause the processor (301) to carry out the operations of generating TPMS data associated with one or more measurements of a tire; generating transmission data that includes the TPMS data; using a key value to generate a signature value for authenticating some portion of the transmission data; and including the signature value in a radio frequency (RF) transmission of the transmission data.

Figure 4:
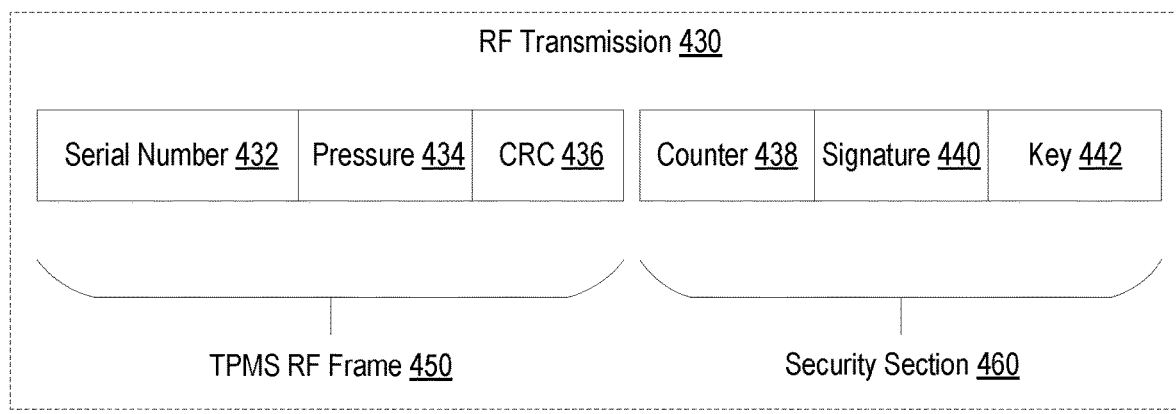
FIG. 4 is an illustration of a RF data frame format for TPMS sensor authentication in accordance with at least one embodiment of the present disclosure.

For further explanation, FIG. 4 sets forth a diagram of an exemplary RF transmission (430). The RF transmission may include TPMS data data such as one or values from TPMS data (326). As described above, the TPMS data (326) may include tire pressure values for a particular tire of the vehicle. For example, the tire pressure value may indicate that a certain tire has a current tire pressure of 32 pounds per square inch (psi). Accordingly, the RF transmission (430) may include a pressure value (434). In addition to the tire pressure value, the TPMS sensor (300) may also include other information in the RF transmission. For example, the RF transmission may include a transmission identifier such as a serial number or other identifier, shown as serial number (432) in FIG. 4. The RF transmission may also include a security check value such as a cyclic redundancy checksum value, shown as CRC (436) in FIG. 4. Taken together, the serial number (432), the pressure (434), and the CRC (436) may form a TPMS RF message frame (450). The TPMS RF message frame (450) may indicate a particular tire pressure reading to the ECU (200). The ECU (200) may use the received tire pressure reading to determine whether a particular tire of a vehicle is operating under acceptable tire pressure conditions. As described above, the ECU (200) may be configured to compare the received tire pressure reading to one or more stored values or ranges. If the received value does not fall within, for example, an acceptable range of pressure values, the ECU (200) may be configured to present a notification to a driver of the vehicle, cause the vehicle to slow down or stop, or take additional actions.

Readers will appreciate that a TPMS sensor typically transmits TPMS data to a electronic control system that then takes one or more actions during normal vehicle operation. For example, the TPMS sensor may transmit tire pressure data that indicates normal operation when the tire pressure is within normal ranges. Where the tire pressure falls outside normal ranges, the TPMS sensor may report this condition as well, causing the ECU to, for example, present a notification that the tire pressure is too low. Such notifications may cause a driver of the vehicle, or vehicle's own control systems in the case of autonomous vehicles, to slow down or stop the vehicle. Readers will appreciate that TPMS notifications can be used as an attack vector for attacking the vehicle's control systems, e.g., to transmit hazardous messages such as apparently authentic tire pressure warnings that force the driver of the vehicle (or for autonomous vehicles, the vehicle itself) to slow down or stop in order to inspect the vehicle's tires or remediate any unsafe tire or vehicle conditions.

In some implementations, the TPMS sensor (300) is configured to include a security section (460) in an RF transmission such as the RF transmission (430). A particular RF transmission may include some or all of the components of the security section (460). In some implementations, the security section (460) may include a counter (438). Counter (438) may be a counter value that indicates a count or ordering of an RF transmission. For example, the ECU (200) may be configured to compare the counter value of counter (438) to a previously received counter value to ensure that RF transmissions are being received in sequence. An out-of-sequence counter value may indicate that an unauthenticated RF transmitter, rather than the TPMS sensor (300), is attempting to send RF transmissions to the ECU (200). For example, in a playback attack, an unauthenticated RF transmitter may be sending recorded RF telegrams in an attempt to bypass authentication.

In some implementations, the security section 460 may include a signature (440). The signature (440) may be a value that is representative of some or all of the TPMS RF frame (450). For example, the signature (440) may be a hash value of some or all of the values of the serial number (432), the pressure (434), and/or the CRC (436). The TPMS sensor (300) may generate the signature (440) using a particular hashing algorithm (e.g., MD5, SHA-1, SHA-2, NTLM, AES etc.). In addition, the TPMS sensor (300) may be configured to generate the signature using key (442). In some implementations, the TPMS sensor (300) transmits the key (442) to the ECU (200) during an initialization process, as described in further detail below.

Figure 5:
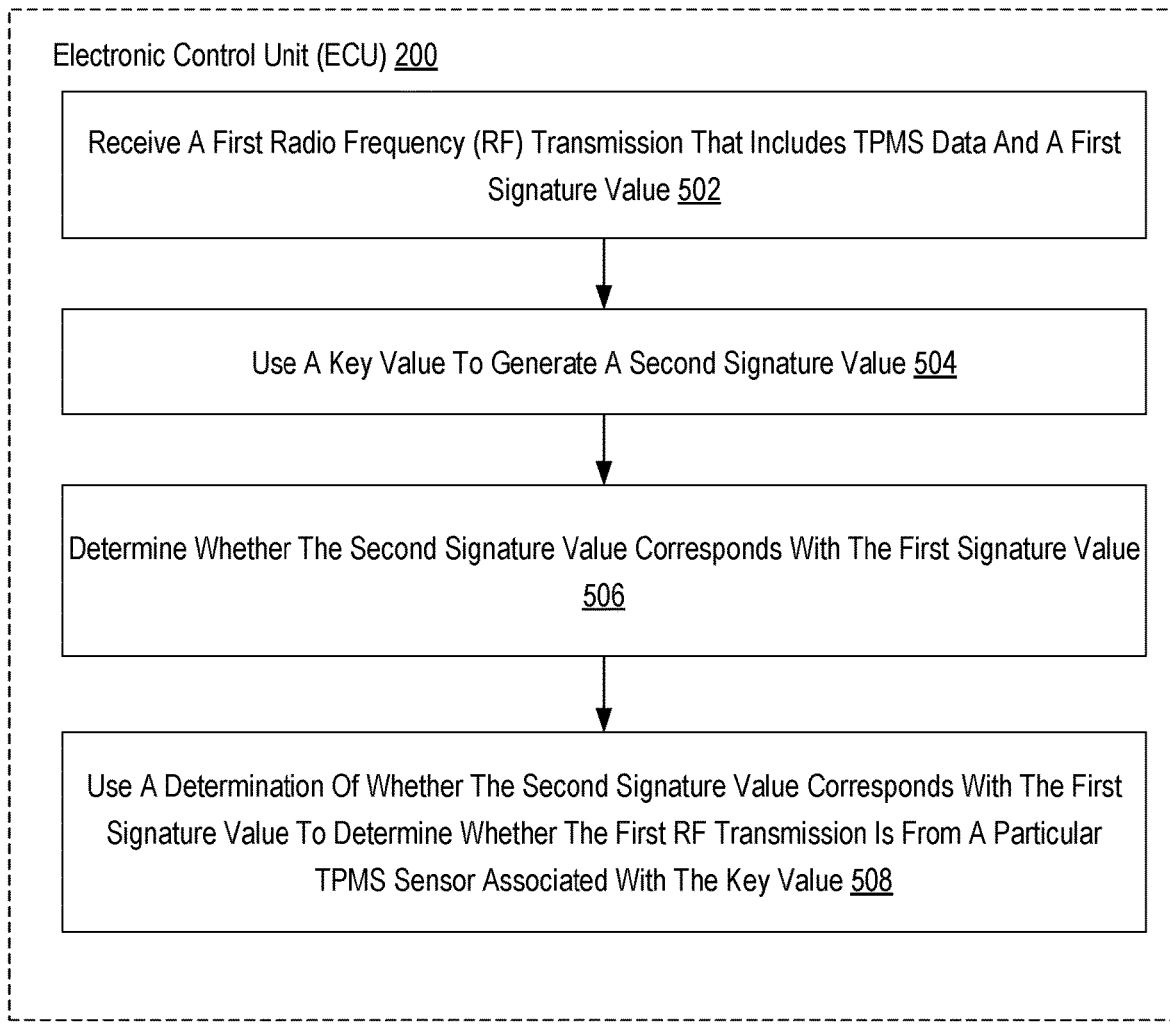
FIG. 5 is a flowchart of an example method for TPMS sensor authentication in accordance with at least one embodiment of the present disclosure.

For further explanation, FIG. 5 sets forth a flowchart of an example method for TPMS sensor authentication in accordance with at least one embodiment of the present disclosure. The method of FIG. 5 includes receiving (502), by an electronic control unit (ECU) (200) of a vehicle, a first radio frequency (RF) transmission that includes TPMS data and a first signature value. As described above with respect to FIG. 3, the TPMS sensor (300) may be configured to transmit an RF transmission (such as RF transmission (430)) that includes a TPMS RF frame (450) and a security section (660). TPMS data may be any sensor data generated or collected by the TPMS sensor. In some implementations, the RF transmission (430) includes the TPMS RF frame (450) and at least the signature (440). As described above, the signature (440) can be a value that represents all or part of the TPMS RF frame (450). The signature may be an encoded version of, for example, the tire pressure value for a tire corresponding to the TPMS sensor (300). For example, the signature (440) may be a hash of pressure (434) that is created using a hashing algorithm and/or created using a key value. The TPMS sensor (300) may be configured to transmit the key value to the ECU (200) during an initialization process that is discussed in further detail below. For example, during an initialization process, a TPMS—such as the TPMS sensor (300)—of the vehicle may transmit a key value that the TPMS uses to encode, for example, tire pressure values that the TPMS will later transmit to the ECU (200). The ECU (200) may be configured to store the received key value and use the key value to generate a second signature value for authenticating incoming RF transmissions, such as RF transmission (430). Alternatively, the key value for a specific sensor serial number may be passed to the vehicle ECU by OEM production or diagnostic tools.

The method of FIG. 5 also includes using (504), by the ECU (200), a key value to generate the second signature value. In some implementations, the ECU may be configured to use known parts of the TPMS RF frame (430) and other known data such as the key to create the second signature value. For example, the ECU (200) may be configured to independently calculate the second signature value using the tire pressure value for a tire corresponding to the TPMS sensor (300). In some implementations, the ECU (200) may use the same hashing function or algorithm to generate the second signature value as the function or algorithm that was used by the TPMS sensor (300) to create the first signature value. The signature value may be a hash or some other representative sequence of characters that can be processed using an algorithm or function to obtain the first signature value. The first signature value may be a hash of one or more portions of the TPMS RF Frame (450), shown in FIG. 4. For example, the first signature value may be a hash of the pressure (434), created using a hashing algorithm such as HMAC-SHA256. Accordingly, the ECU (200) may be configured to validate/authenticate the first signature value by generating the second signature value with the same HMAC-SHA256 algorithm and the key value that the ECU (200) previously received (e.g., from TPMS sensor (300) or from a programming device). For example, during an initialization process, a TPMS—such as the TPMS sensor (300)—of the vehicle may transmit a key value that the TPMS sensor uses to hash, for example, tire pressure values that the TPMS sensor will later transmit to the ECU (200). The ECU (200) may be configured to store the received key value and use the key value to generate a second signature value for comparison to the first signature value in incoming RF transmissions, such as RF transmission (430).

In addition, the method of FIG. 5 also includes determining (506), by the ECU (200), whether the second signature value corresponds with the first signature value. As described above, the first signature value may be a representative sequence of characters (e.g., a hash) that represents some portion of the TPMS RF frame (450), such as the pressure (434). When the ECU (200) receives the RF transmission (430), the ECU (200) receives both the TPMS RF Frame (450) and the security section (460). In some implementations, the ECU (200) can compare the first signature value to the second signature value. If the values are the same, then the ECU (200) may determine that the RF transmission is from an authenticated TPMS (e.g., the TPMS sensor (300)). This is because the ECU (200) will generate the second signature value (440) using the key value that the ECU (200) received either from the TPMS sensor (300) itself or from another trusted source, such as a programming device of a vehicle manufacturer or dealer. So, if the ECU (200) uses the same key value and the same process that was used by the TPMS sensor (300) to generate the first signature value from the original value, the ECU (200) can obtain the second signature value. Readers will appreciate that even if an attacker can guess at or deduce the hashing algorithm that is being used, the attacker is unlikely to spoof the first signature value accurately without the key value used to generate the first signature value.

The method of FIG. 5 includes using (508), by the ECU (200), a determination of whether the second signature value corresponds with the first signature value to to determine whether the first RF transmission is from a particular TPMS sensor authenticated to the key value. Using (508), by the ECU (200), a determination of whether the second signature value corresponds with the first signature value to determine whether the first RF transmission is from a particular TPMS sensor authenticated to the key value may be carried out by after determining that the second signature value does not correspond to the first signature value, determine that the first RF transmission is not from the particular TPMS sensor authenticated to the key value; and after determining that the second signature value does correspond to the first signature value, determine that the first RF transmission is from the particular TPMS sensor authenticated to the key value.

Figure 6:
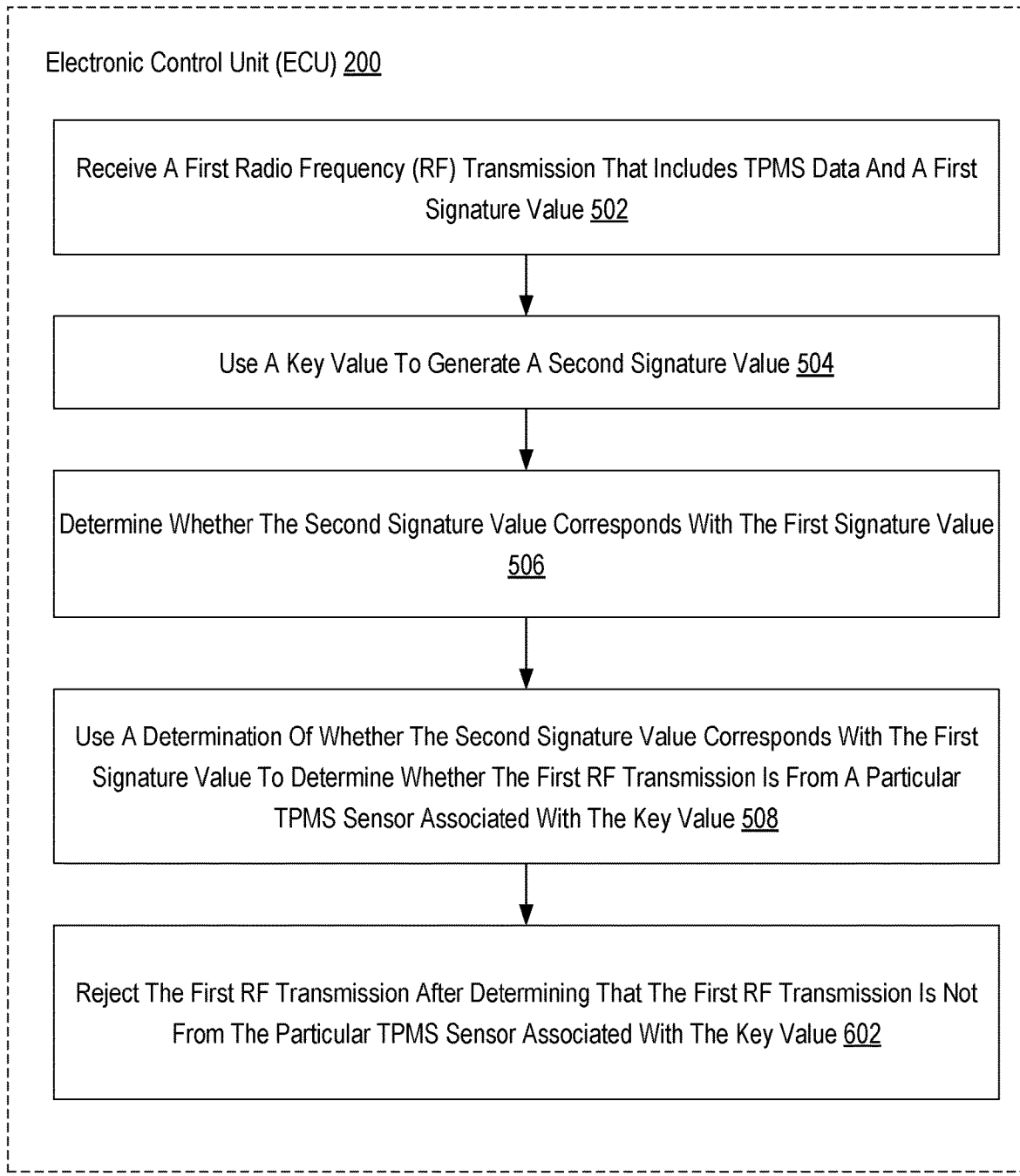
FIG. 6 is a flowchart of an example method for TPMS sensor authentication in accordance with at least one embodiment of the present disclosure.

For further explanation, FIG. 6 sets forth a flowchart of an example method for TPMS sensor authentication in accordance with at least one embodiment of the present disclosure. The method of FIG. 6 includes elements of FIG. 5. In addition, the method of FIG. 6 also includes rejecting (602), by the ECU (200), the first RF transmission after determining that the first RF transmission is not from the particular TPMS sensor associated with the key value. In some implementations, the ECU (200) may be configured to discard or delete all values that are received as part of the rejected RF transmission or generated as a result of processing the rejected RF transmission. Notably, the ECU (200) may be configured to take no action to alter current vehicle operations in response to receiving or processing the rejected RF transmission. In a particular embodiment, the behavior of the system in response to an authentication failure is for the application designer to determine. For example, it may be used to silently record that an attack has been carried out—or it may be used to discard suspicious incoming data. The decision on how to use this technology may depend on the risk analysis of the system designer.

Figure 7:
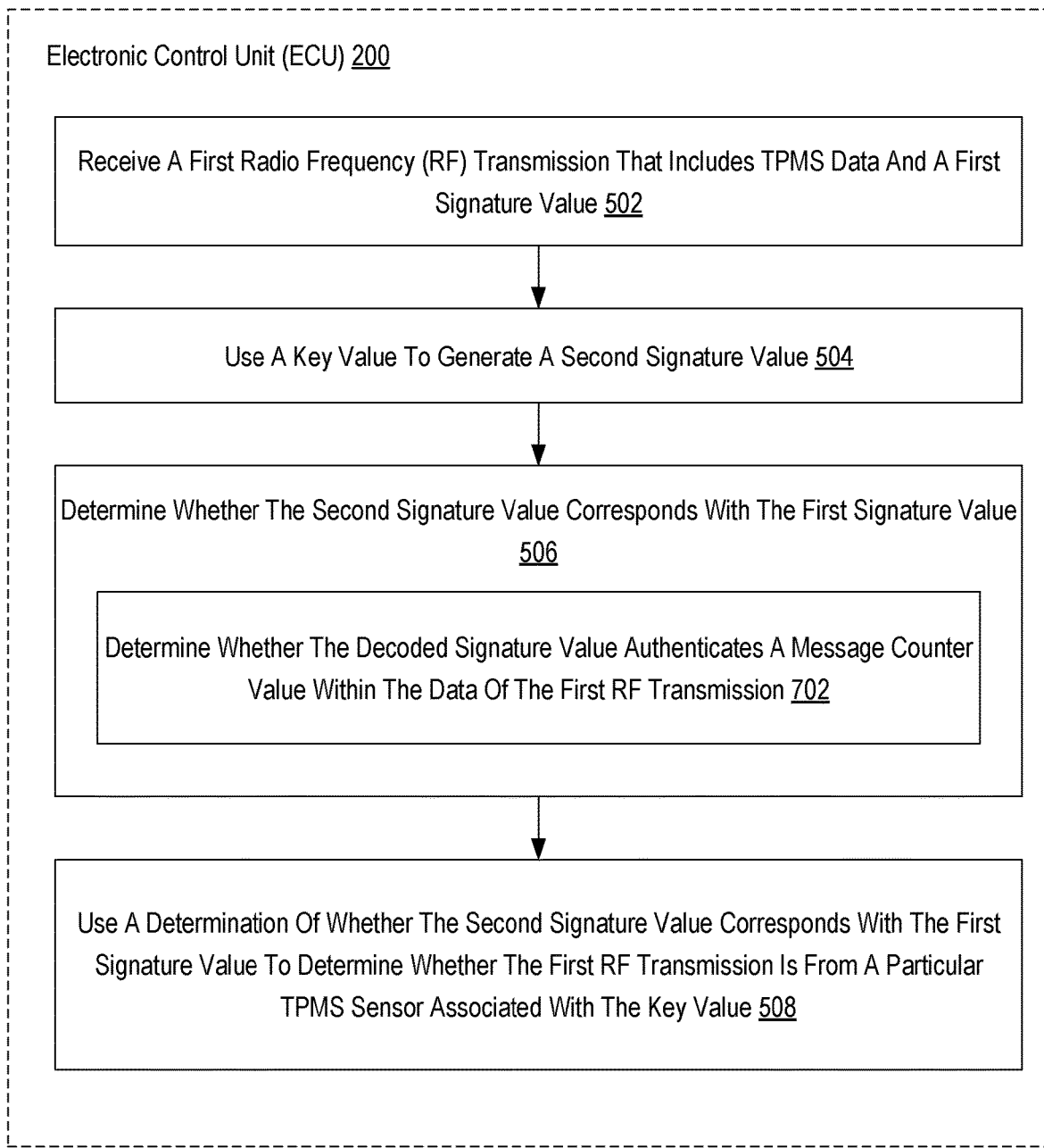
FIG. 7 is a flowchart of an example method for TPMS sensor authentication in accordance with at least one embodiment of the present disclosure.

For further explanation, FIG. 7 sets forth a flowchart of an example method for TPMS sensor authentication in accordance with at least one embodiment of the present disclosure. The method of FIG. 7 includes elements of FIG. 5. However, in the method of FIG. 7, determining (506), by the ECU, whether the second signature value corresponds with the first signature value includes determining (702) whether the second signature value authenticates a message counter value within the data of the first RF transmission. As described above, the TPMS sensor may be configured to transmit a security section (460) that includes a counter (438) that indicates a count or ordering of an RF transmission. While the example provided above described that the pressure (434) is hashed to obtain the signature (440), readers will appreciate that, in some implementations, the TPMS sensor (300) may hash the counter (438) to obtain the signature (440). In other implementations, the TPMS sensor (300) may generate a hash of both the pressure (434) and the counter (438), or combine the pressure (434) and the counter (438) in other ways to obtain the signature (440).

Figure 8:
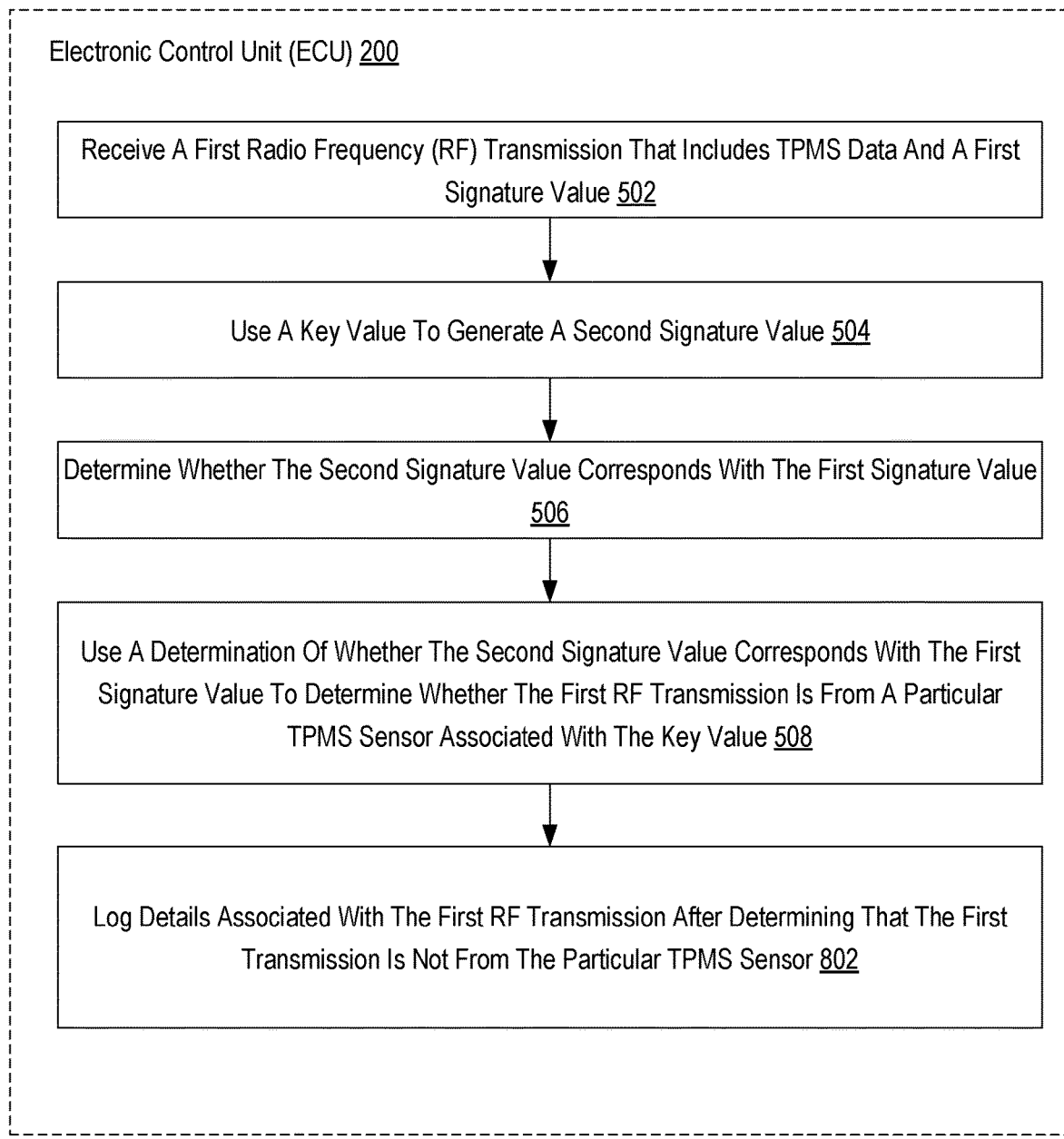
FIG. 8 is a flowchart of an example method for TPMS sensor authentication in accordance with at least one embodiment of the present disclosure.

For further explanation, FIG. 8 sets forth a flowchart of an example method for TPMS sensor authentication in accordance with at least one embodiment of the present disclosure. The method of FIG. 8 includes elements of FIG. 5. In addition, the method of FIG. 8 also includes logging (802) details associated with the first RF transmission after determining that the first RF transmission is not from the particular TPMS sensor associated with the key value. Rather than alter vehicle operations, the method also includes that the ECU (200) may be configured to log details associated with the RF transmission after determining that the RF transmission is not from the particular TPMS associated with the key value and should be rejected. In some implementations, the ECU (200) may be configured to log the date, time, vehicle location, data within the actual RF transmission, metadata of the RF transmission (e.g., signal strength, power level, signal direction or orientation), current vehicle conditions or operating parameters, vehicle passenger data, and the like. In some implementations, the ECU (200) may be configured to report one or more of the logged details to parties including the vehicle driver, the vehicle owner, the vehicle manufacturer, the manufacturer of the ECU (200), the manufacturer of the TPMS sensor (300), and/or other authorities such as local law enforcement. The ECU (200) may be also configured to present details of the rejected RF transmission on a display device of the vehicle or another computing device (e.g., a mobile device of the vehicle driver or owner).

Figure 9:
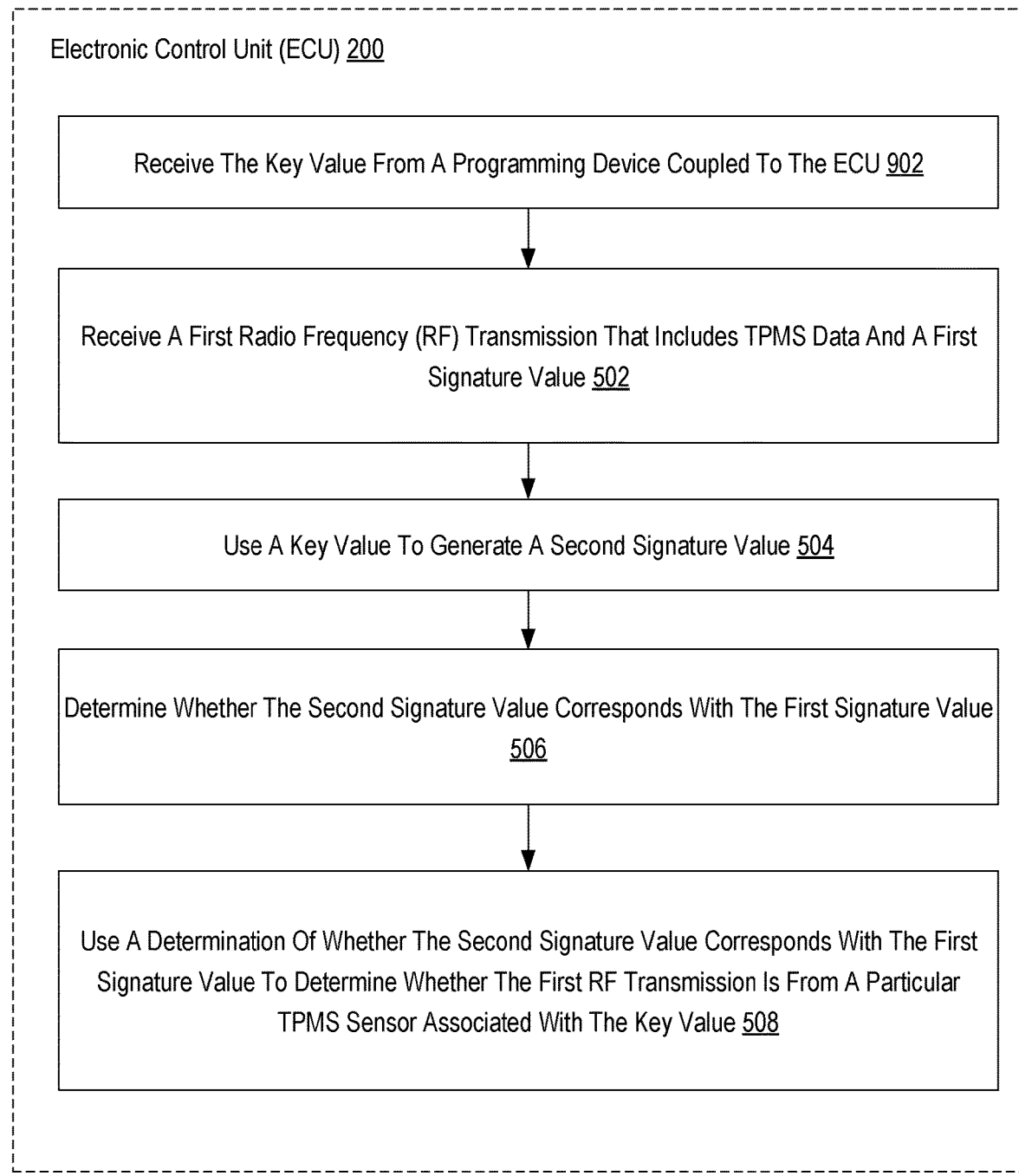
FIG. 9 is a flowchart of an example method for TPMS sensor authentication in accordance with at least one embodiment of the present disclosure.

For further explanation, FIG. 9 sets forth a flowchart of an example method for TPMS sensor authentication in accordance with at least one embodiment of the present disclosure. The method of FIG. 9 includes elements of FIG. 5. In addition, the method of FIG. 9 also includes receiving (902), by the ECU, the key value from a programming device coupled to the ECU. In some implementations, a vehicle manufacturer or vehicle sales business such as a car dealership may receive the key via a secure out-of-band method from the manufacturer of the TPMS (e.g., the TPMS sensor (300)). Prior to or during sale of the vehicle to a buyer, the manufacturer or dealership may program the ECU (200) of the vehicle with the key. For example, the dealership may connect the ECU (200) to a programming device such as a low-frequency (LF) tool that securely transmits the key received from the TPMS manufacturer to the ECU (200). In this way, the key is provided to the ECU (200) in location or context that is more secure where an attacker is unlikely to be able to obtain the key. For example, an attacker may be unable to predict when the key is transferred from the very short range LF device to the ECU (200), or may be unable to intercept the key during the abovementioned key transfer. LF communications may be based on the same type of magnetic signaling used for NFC/Access cards and are inherently very short range. Alternatively, the ECU (200) can directly or indirectly scan or otherwise obtain the key value from a physical location (e.g. a label on the TPMS sensor (300) prior to installation).

Figure 10:
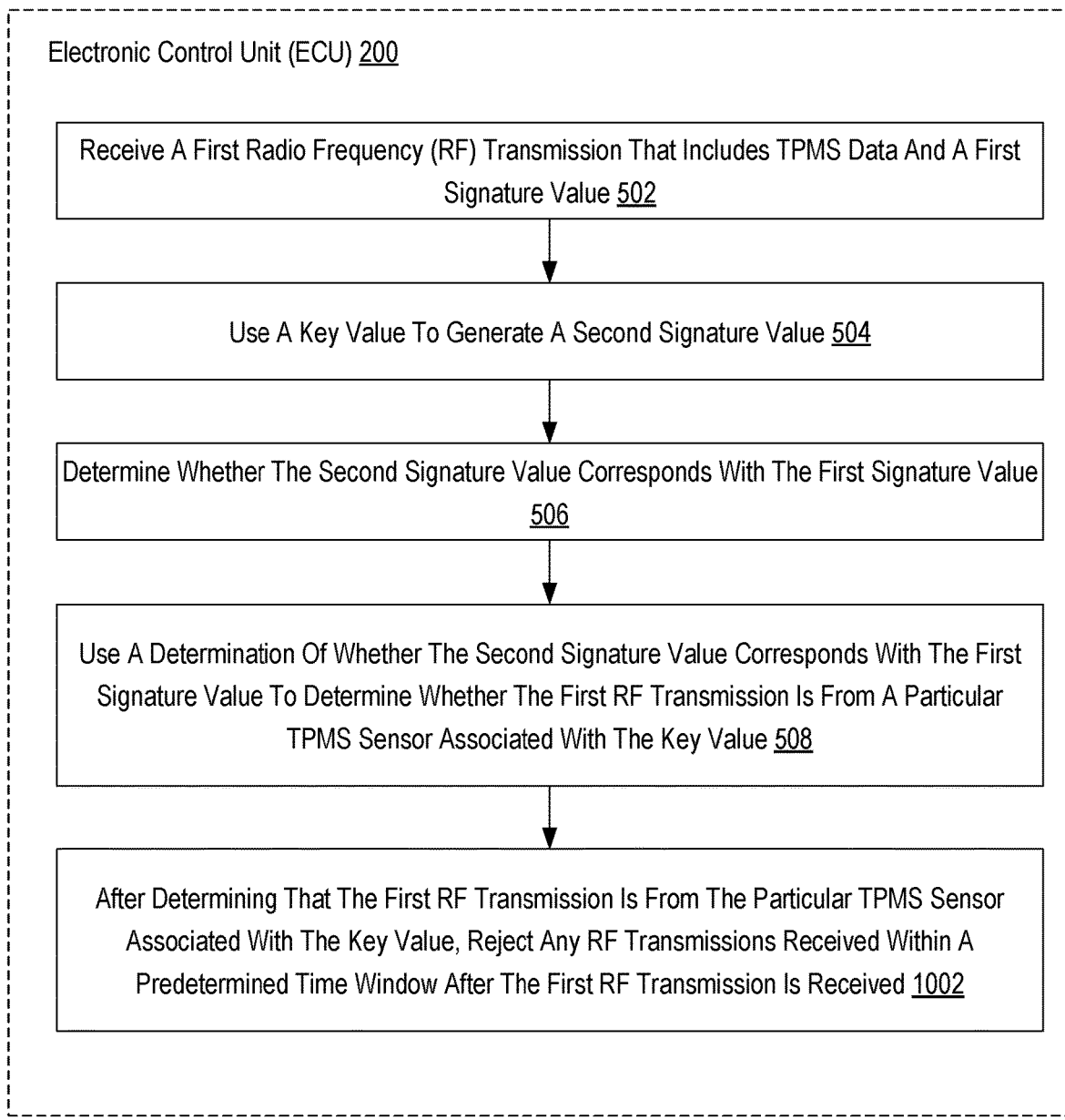
FIG. 10 is a flowchart of an example method for TPMS sensor authentication in accordance with at least one embodiment of the present disclosure.

For further explanation, FIG. 10 sets forth a flowchart of an example method for TPMS sensor authentication in accordance with at least one embodiment of the present disclosure. The method of FIG. 10 includes elements of FIG. 5. In addition, the method of FIG. 10 also includes after determining that the first RF transmission is from the particular TPMS sensor associated with the key value, rejecting (1002) any RF transmissions received with a predetermined time window after the first RF transmission is received. In some implementations, the ECU (200) may be configured with data indicating that an authenticated TPMS of the vehicle (e.g., the TPMS sensor (300)) transmits RF transmissions at a defined rate, such as once every minute. Accordingly, the ECU (200) may be configured to receive an RF transmission at a certain time, such as 10:00:00 AM, and then reject any RF transmissions that are received until one minute has elapsed since the last RF transmission was received (e.g., until 10:01:00 AM). After the one minute has elapsed, the ECU (200) may resume accepting and processing RF transmissions.

Figure 11:
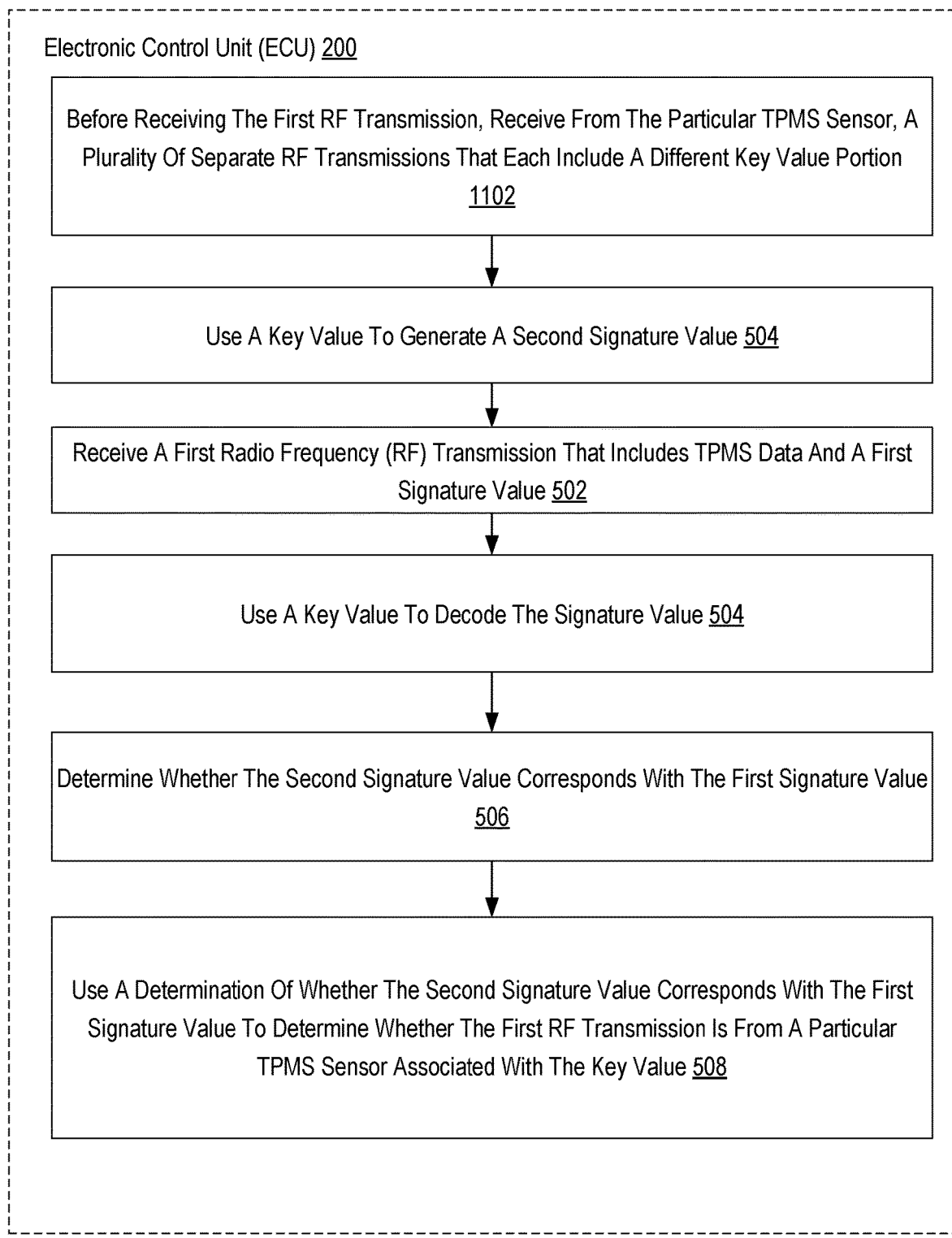
FIG. 11 is a flowchart of an example method for TPMS sensor authentication in accordance with at least one embodiment of the present disclosure.

For further explanation, FIG. 11 sets forth a flowchart of an example method for TPMS sensor authentication in accordance with at least one embodiment of the present disclosure. The method of FIG. 11 includes elements of FIG. 5. In addition, the method of FIG. 11 also includes before receiving the first RF transmission, receiving (1102) from the particular TPMS sensor, by the ECU, a plurality of separate RF transmissions that each include a different key value portion. For example, in order to further secure the key exchange process, the TPMS sensor (300) may only transmit, to the ECU (200), portions of the key value at a given time. For example, the TPMS sensor (300) may only transmit a portion of the key once per hour until the entire key is transmitted. In this way, an attacker or unauthorized person may not be able to obtain the entire key quickly. The attacker may need to wait near the vehicle or follow the vehicle for an extended period of time in order to obtain the entire key so that the attacker can send appear to be an authenticated TPMS and send (fake) TPMS messages to the ECU (200).

The method of FIG. 11 also includes using (1104), by the ECU, the different key value portions to re-assemble the key value. For example, the ECU (200) may be configured to assemble various portions of the key into the complete key. In some implementations, the TPMS sensor (300) may transmit key portions along with a key portion indicator (e.g., a portion sequence number) that indicates the key portion along with its placement within the complete key to the ECU (200). The ECU (200) may be configured to receive each portion of the key and assemble the complete key using the key portions and associated key portion indicators. In another implementation, the TPMS sensor (300) may transmit the key value in a sequence of transmissions where the first transmission is marked with an indicator or header that indicates a "Key Transmission Start" and the final transmission is marked with an indicator or header that indicates a "Key Transmission End". The ECU (200) may be configured to assemble the key value using the plurality of key transmissions, the above-mentioned indicators or headers, and/or other information (e.g., transmission timestamps).

Figure 12:
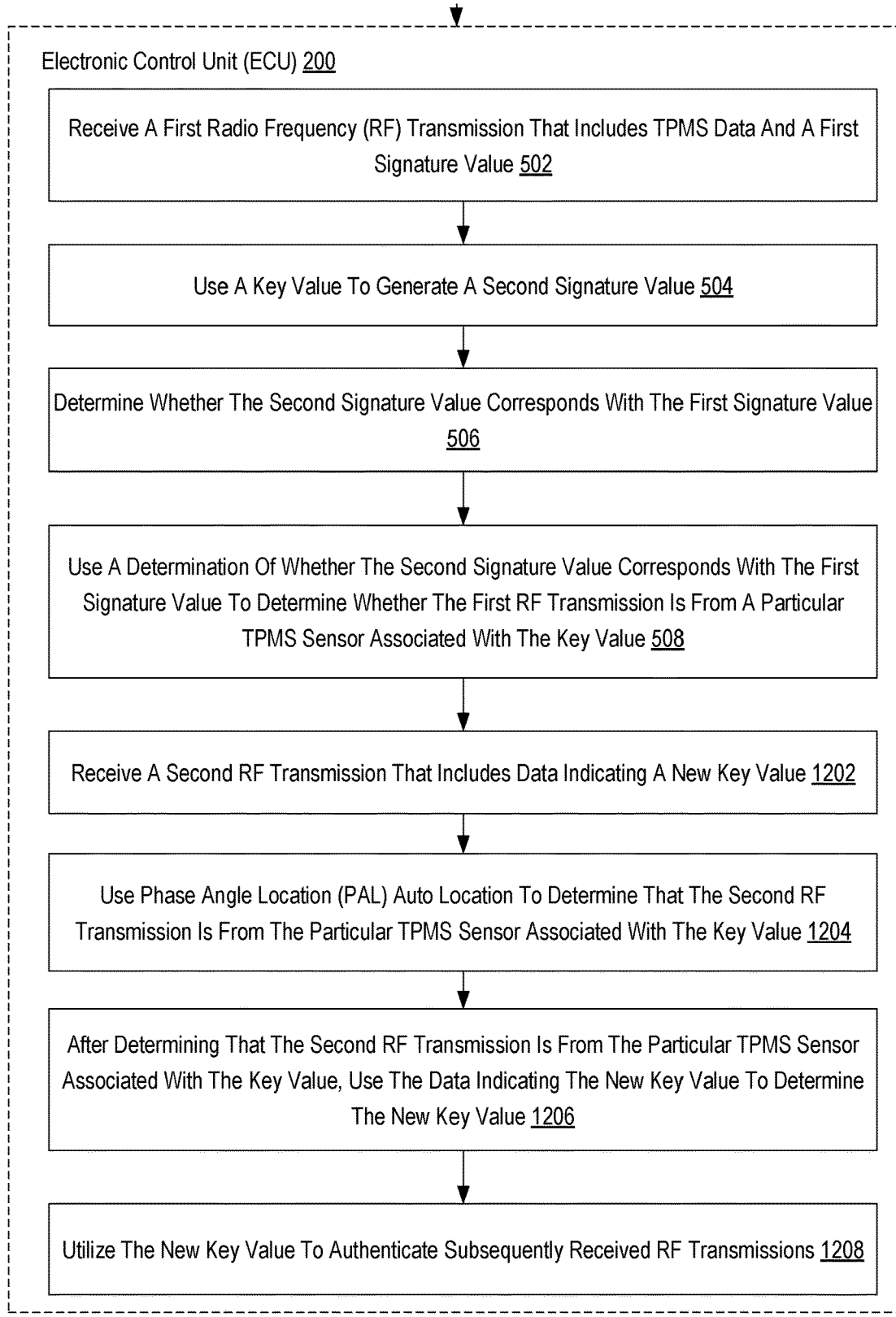
FIG. 12 is a flowchart of an example method for TPMS sensor authentication in accordance with at least one embodiment of the present disclosure.

For further explanation, FIG. 12 sets forth a flowchart of an example method for TPMS sensor authentication in accordance with at least one embodiment of the present disclosure. The method of FIG. 12 includes elements of FIG. 5. In addition, the method of FIG. 12 also includes receiving (1202), by the ECU, a second RF transmission that includes data indicating a new key value. The second transmission that includes data indicating a new key value or pair value that is different from the key that is currently in use. The subsequent transmission may include a new key value or a new pair value. In some implementations, the TPMS sensor (300) and/or the ECU (200) maintain a table or other data structure that correlates key values (such as the key values described herein as being used to encode TPMS data) with other pair values. The pair values may be used by either or both of the TPMS sensor (300) and the ECU (200) as correspondent values to the key values. In other words, if the TPMS sensor (300) sends a pair value to the ECU (200), the ECU (200) can use the received pair value to locate the corresponding key value in the abovementioned table or other data structure.

The method of FIG. 12 also includes using (1204), by the ECU, phase angle location (PAL) auto location to determine that the second RF transmission is from the particular TPMS sensor associated with the key value. For example, rather than transmitting a pair value for looking up the new key value, the TPMS sensor (300) may just transmit a new key value using the space for key value (442). The ECU (200) may determine that the newly received key value differs from the currently used key value. The ECU (200) may be configured to verify that the new key value was received from an authenticated TPMS device of the vehicle. Accordingly, the method also includes using phase angle location (PAL) auto location methods to determine that the second RF transmission is from the particular TPMS associated with the key value that is currently in use. For example, a phase angle sensor (not shown) may operate to measure a phase angle of a wheel. Using phase angle data from phase angle readings taken at different times, the ECU (200) can determine the location of the RF transmission source. If the RF transmission source location for the second RF transmission corresponds to the location of the TPMS sensor (300) (which may also be determined using PAL auto location), the ECU (200) may determine that the second RF transmission originated from the TPMS sensor (300).

In addition, the method of FIG. 12 also includes after determining that the second RF transmission is from the particular TPMS sensor associated with the key value, using (1206), by the ECU, the data indicating the new key value to determine the new key value. For example, the second RF transmission may not include a new key value, rather it may include a pair value as described above, or some other indicator that the ECU (200) can use to identify the new key value. The method also includes utilizing the new key value to authenticate subsequently received RF transmissions.

The method of FIG. 12 also includes utilizing (1208), by the ECU, the new key value to authenticate subsequently received RF transmissions. Utilizing (1208), by the ECU, the new key value to authenticate subsequently received RF transmissions may be carried out by using the new key value to decode signatures in subsequently received RF transmissions; determining whether the decoded signature corresponds to other data within the transmission; and based on the determination of whether the decoded signature corresponds to other data within the transmission, determine whether the subsequently received transmission is from an authorized TPMS sensor.

Figure 13:
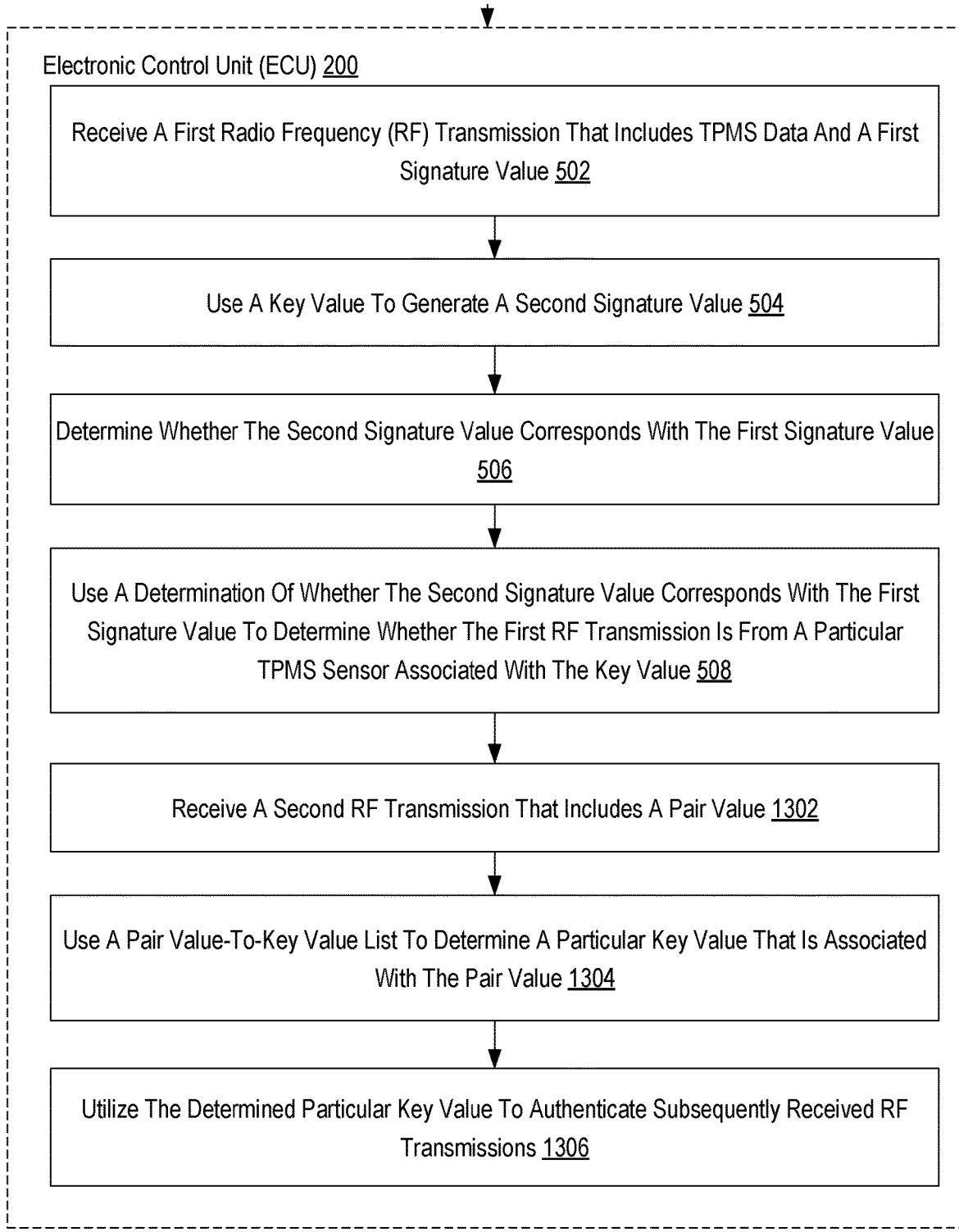
FIG. 13 is a flowchart of an example method for TPMS sensor authentication in accordance with at least one embodiment of the present disclosure.

For further explanation, FIG. 13 sets forth a flowchart of an example method for TPMS sensor authentication in accordance with at least one embodiment of the present disclosure. The method of FIG. 13 includes elements of FIG. 5. In addition, the method of FIG. 13 also includes receiving (1302), by the ECU, a second RF transmission that includes a pair value. A pair value may be any data in any format that can be used to cross-reference to a key value. Receiving (1302), by the ECU, a second RF transmission that includes a pair value may be carried out by an RF transceiver of the ECU, the second RF transmission.

In addition, the method of FIG. 13 also includes using (1304), by the ECU, a pair value-to-key value list to determine a particular key value that is associated with the pair value. A pair value-to-key value list may include entries matching a pair value with a key value. In this example, the ECU may use the received pair value as an index for finding a corresponding key value. Using (1304), by the ECU, a pair value-to-key value list to determine a particular key value that is associated with the pair value may be carried out by using the pair value as an index for identifying a particular key value that is associated with the pair value.

The method of FIG. 13 also includes utilizing (1306), by the ECU, the determined particular key value to authenticate subsequently received RF transmissions. Utilizing (1306), by the ECU, the determined particular key value to authenticate subsequently received RF transmissions may be carried out by using the new key value to decode signatures in subsequently received RF transmissions; determining whether the decoded signature corresponds to other data within the transmission; and based on the determination of whether the decoded signature corresponds to other data within the transmission, determine whether the subsequently received transmission is from an authorized TPMS sensor.

The method also includes determining whether the second RF transmission includes a new key value or a pair value. In some implementations, the ECU (200) may be configured to compare a current RF transmission (e.g., the second RF transmission) to a previous RF transmission (e.g., the first RF transmission) and determine any differences. For example, at a current time, the first RF transmission may not include a key value that is currently in use because the key value that is currently in use was previously sent (e.g., during initialization of the TPMS sensor (300)). In other words, the section that corresponds to key (442) of the first RF transmission may be blank. However, the section corresponding to key (442) in the second RF transmission may not be blank.

As noted above, the method includes determining that the second RF transmission includes a pair value. In response to determining the presence of a pair value, the ECU (200) determines that the currently used key value should be replaced with a new key value. Moreover, the ECU (200) can use the pair value to look up the new key value that should be used, using the table or data structure described above. For example, the method also includes using a pair value-to-key value list to determine a particular key value that is associated with the pair value. The ECU (200) may locate the new key value and, for example, use the new key value to decode a signature value that was received within the second RF transmission to decode TPMS data that was also received in the second RF transmission. The method also includes utilizing the determined particular key value to authenticate subsequently received RF transmissions that are received after the second RF transmission.

Figure 14:
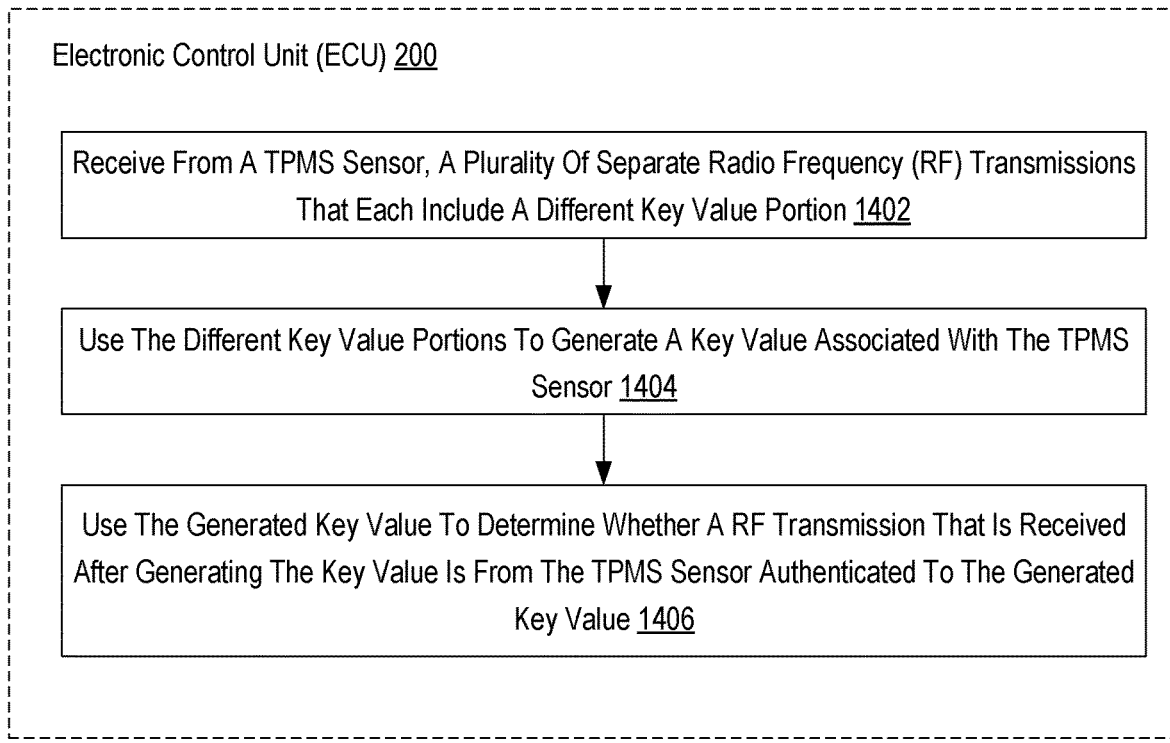
FIG. 14 is a flowchart of an example method for TPMS sensor authentication in accordance with at least one embodiment of the present disclosure.

For further explanation, FIG. 14 sets forth a flowchart of an example method for TPMS sensor authentication in accordance with at least one embodiment of the present disclosure. The method of FIG. 14 includes receiving (1402) from a TPMS sensor, by an electronic control unit (ECU) (1400) of a vehicle, a plurality of separate radio frequency (RF) transmissions that each include a different key value portion. Receiving (1402) from a TPMS sensor, by an electronic control unit (ECU) of a vehicle, a plurality of separate radio frequency (RF) transmissions that each include a different key value portion may be carried out by receiving a first RF transmission that includes a first portion of the key value; receiving a second RF transmission that includes a second portion of the key value; and receiving a third RF transmission that includes a third portion of the key value. Readers of skill in the art will realize that any number of transmission may be used to transmit any number of portions of the key value.

The method of FIG. 14 also includes using (1404), by the ECU, the different key value portions to generate a key value associated with the TPMS sensor. Using (1404), by the ECU (200), the different key value portions to generate a key value associated with the TPMS sensor may be carried out by combining the key value portions to generate the key value.

In addition, the method of FIG. 14 includes using (1406), by the ECU (200), the generated key value to determine whether a RF transmission that is received after generating the key value is from the TPMS sensor associated with the generated key value. Using (1406), by the ECU (200), the generated key value to determine whether a RF transmission that is received after generating the key value is from the TPMS sensor associated with the generated key value may be carried out by using the key value to decode signatures in the RF transmissions; determining whether the decoded signature corresponds to other data within the transmission; and based on the determination of whether the decoded signature corresponds to other data within the transmission, determine whether the subsequently received transmission is from an authorized TPMS sensor.

Figure 15:
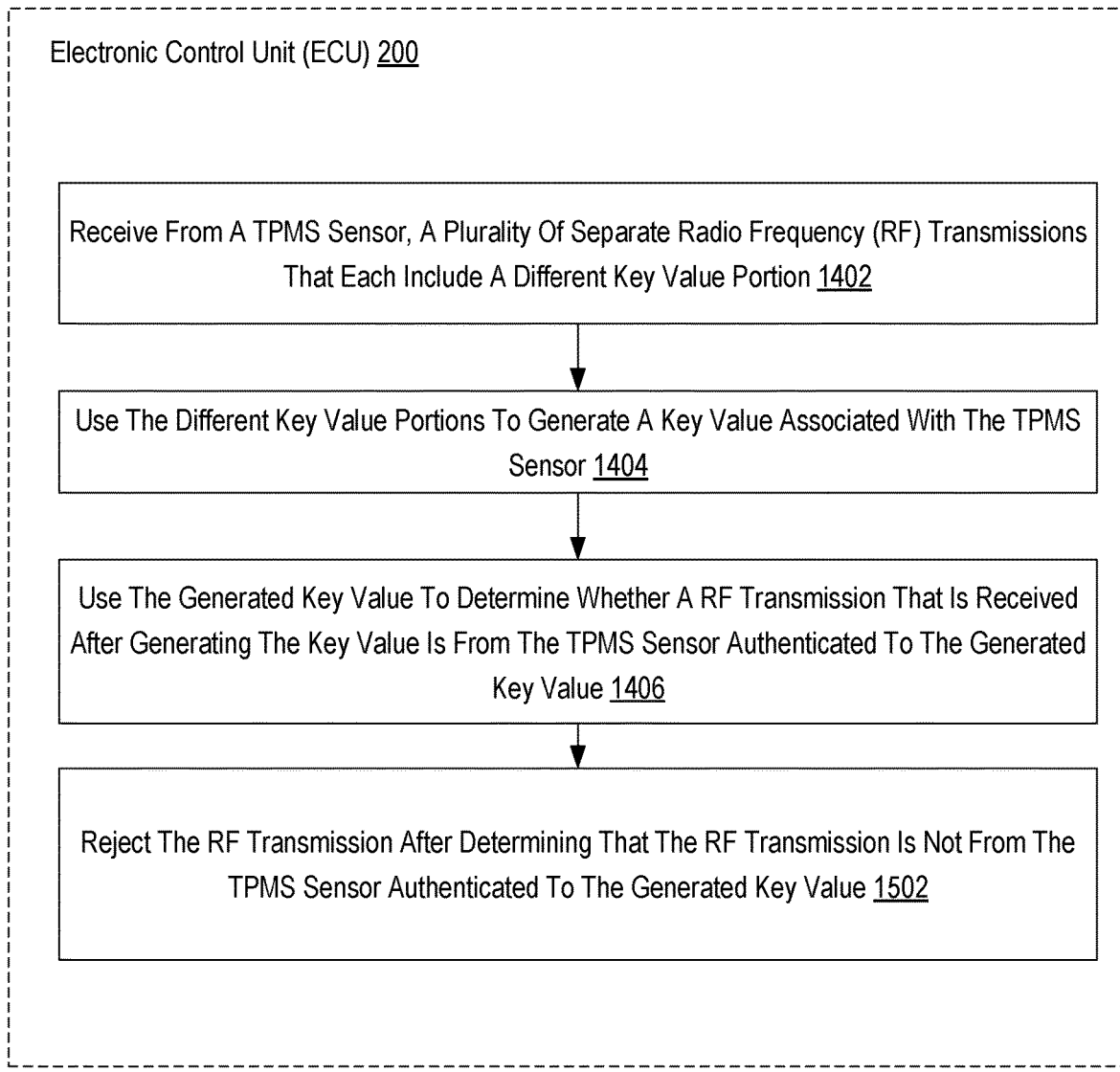
FIG. 15 is a flowchart of an example method for TPMS sensor authentication in accordance with at least one embodiment of the present disclosure.

For further explanation, FIG. 15 sets forth a flowchart of an example method for TPMS sensor authentication in accordance with at least one embodiment of the present disclosure. The method of FIG. 15 includes elements of FIG. 14. In addition, the method of FIG. 15 also includes rejecting (1502) the RF transmission after determining that the RF transmission is not from the TPMS sensor authenticated to the generated key value. In some implementations, the ECU (200) may be configured to discard or delete all values that are received as part of the rejected RF transmission or generated as a result of processing the rejected RF transmission. Notably, the ECU (200) may be configured to take no action to alter current vehicle operations in response to receiving or processing the rejected RF transmission.

Figure 16:
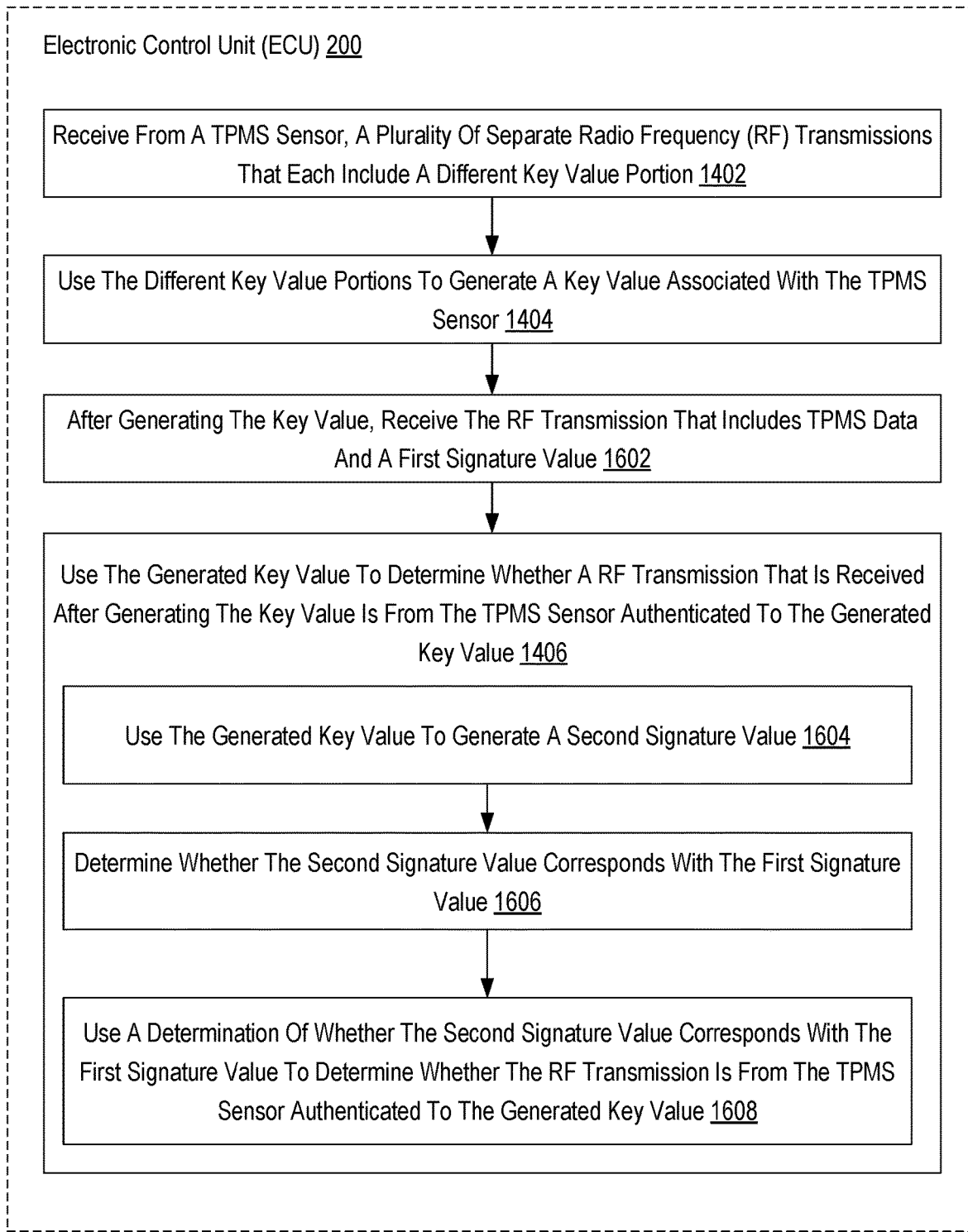
FIG. 16 is a flowchart of an example method for TPMS sensor authentication in accordance with at least one embodiment of the present disclosure.

For further explanation, FIG. 16 sets forth a flowchart of an example method for TPMS sensor authentication in accordance with at least one embodiment of the present disclosure. The method of FIG. 16 includes elements of FIG. 14. In addition, the method of FIG. 16 also includes after generating the key value, receiving (1602), by the ECU, the RF transmission that includes TPMS data and a first signature value. In some implementations, the ECU (200) may use the same hashing function or algorithm to generate a second signature value as the function or algorithm that was used by the TPMS sensor (300) to initially generate the first signature value. The signature value may be a hash or some other representative sequence of characters that can be processed using an algorithm or function to obtain the original value. The signature value may be a hash of one or more portions of the TPMS RF Frame (450), shown in FIG. 4. For example, the signature value may be a hash of the pressure (434), created using a hashing algorithm such as HMAC-SHA256. Accordingly, the ECU (200) may be configured to generate the second signature value by generating the second signature value with the same HMAC-SHA256 algorithm and the key value that the ECU (200) previously received (e.g., from TPMS sensor (300) or from a programming device). For example, during an initialization process, a TPMS—such as the TPMS sensor (300)—of the vehicle may transmit a key value that the TPMS sensor uses to encode, for example, tire pressure values that the TPMS sensor will later transmit to the ECU (200). The ECU (200) may be configured to store the received key value and use the key value to generate a second signature value for authenticating incoming RF transmissions, such as RF transmission (430).

In the example of FIG. 16, using (1406), by the ECU, the generated key value to determine whether the RF transmission is from the TPMS sensor associated with the generated key value includes using (1604), by the ECU, the generated key value to generate the second signature value. In some implementations, the ECU (200) may use the same hashing function or algorithm to generate the second signature value as the function or algorithm that was used by the TPMS sensor (300) to initially generate the first signature value. The signature value may be a hash or some other representative sequence of characters that can be processed using an algorithm or function. The signature value may be a hash of one or more portions of the TPMS RF Frame (450), shown in FIG. 4. For example, the signature value may be a hash of the pressure (434), created using a hashing algorithm such as HMAC-SHA256. Accordingly, the ECU (200) may be configured to calculate the second signature value by generating the second signature value with the same HMAC-SHA256 algorithm and the key value that the ECU (200) previously received (e.g., from TPMS sensor (300) or from a programming device). For example, during an initialization process, a TPMS—such as the TPMS sensor (300)—of the vehicle may transmit a key value that the TPMS sensor uses to encode, for example, tire pressure values that the TPMS sensor will later transmit to the ECU (200). The ECU (200) may be configured to store the received key value and use the key value to generate a second signature value for authenticating incoming RF transmissions, such as RF transmission (430).

In the example of FIG. 16, using (1406), by the ECU, the generated key value to determine whether the RF transmission is from the TPMS sensor associated with the generated key value includes determining (1606), by the ECU, whether the second signature value corresponds with the first signature value. As described above, the signature value may be a representative sequence of characters (e.g., a hash) that represents some portion of the TPMS RF frame (450), such as the pressure (434). When the ECU (200) receives the RF transmission (430), the ECU (200) receives both the TPMS RF Frame (450) and the security section (460). In some implementations, the ECU (200) can compare the first signature value to the second signature value. For example, the ECU (200) can use the pressure (434) to calculate a second signature value matching the first signature value obtained from the received RF (440). If the values are the same, then the ECU (200) may determine that the RF transmission is from an authenticated TPMS (e.g., the TPMS sensor (300)). This is because the ECU (200) will match the second signature (440) using the key value that the ECU (200) received either from the TPMS sensor (300) itself or from another trusted source, such as a programming device of a vehicle manufacturer or dealer. So, if the ECU (200) uses the same key value and the same process that was used by the TPMS sensor (300) to generate the first signature value from the original value, the ECU (200) can use the original value (e.g., the pressure (434)) and create a matching (second) signature. The ECU (200) can then compare the received value of the first signature value (440) and the second signature value and determine that the two values are identical. Readers will appreciate that even if an attacker can guess at or deduce the hashing algorithm that is being used, the attacker is unlikely to spoof the first signature value accurately without the key value used to generate the first signature value.

In the example of FIG. 16, using (1406), by the ECU, the generated key value to determine whether the RF transmission is from the TPMS sensor associated with the generated key value includes using (1608), by the ECU, a determination of whether the generated second signature value corresponds to the first signature value to determine whether the RF transmission is from the TPMS sensor associated with the generated key value. Using (1608), by the ECU, a determination of whether the second signature value corresponds to the first signature value to determine whether the RF transmission is from the TPMS sensor associated with the generated key value may be carried out by after determining that the second signature value does not correspond to the first signature value, determine that the first RF transmission is not from the particular TPMS sensor authenticated to the key value; and after determining that the second signature value does correspond to the first signature value, determine that the first RF transmission is from the particular TPMS sensor authenticated to the key value.

Figure 17:
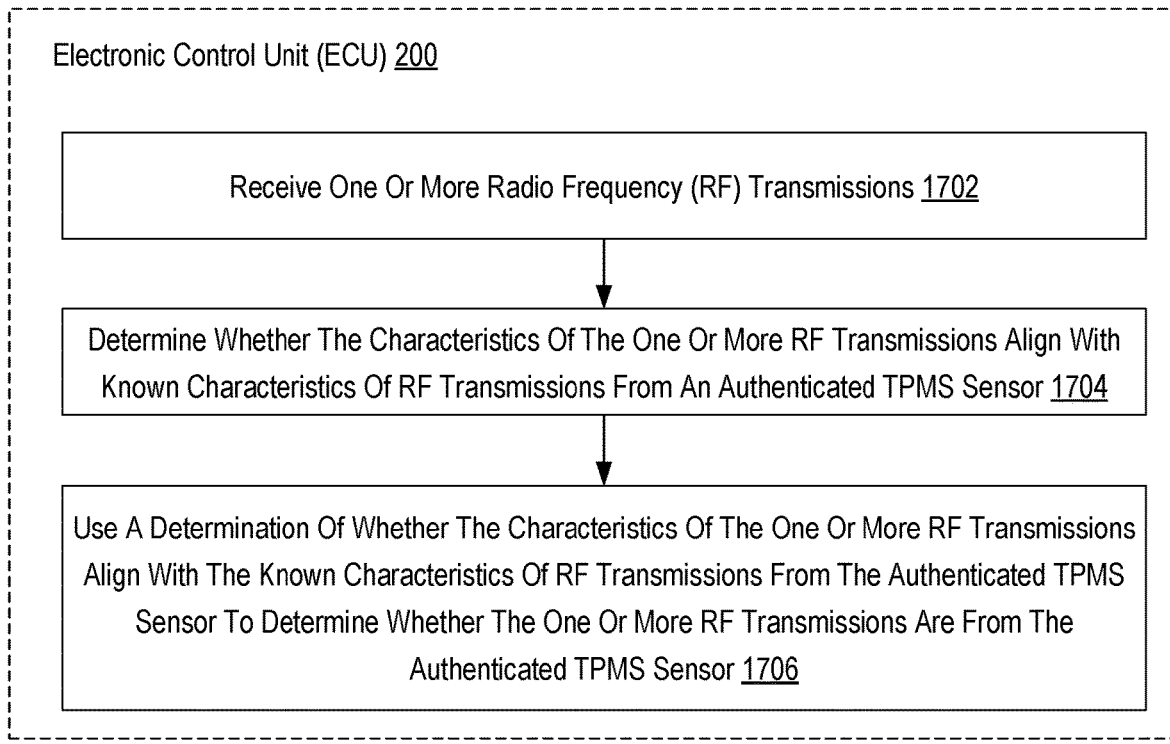
FIG. 17 is a flowchart of an example method for TPMS sensor authentication in accordance with at least one embodiment of the present disclosure.

For further explanation, FIG. 17 sets forth a flowchart of an example method for TPMS sensor authentication in accordance with at least one embodiment of the present disclosure. The method of FIG. 17 includes receiving (1702), by an electronic control unit (ECU) (1700) of a vehicle, one or more radio frequency (RF) transmissions. In some implementations, the ECU (200) may be configured to receive RF transmissions as described above via TPMS transceiver (205) and process the incoming transmissions using authentication controller (204). The authentication controller (204) includes computer program instructions that when executed by the controller 401 cause the controller (201) to carry out the operations of receiving a first radio frequency (RF) transmission that includes TPMS data and a first signature value, using a key value to generate a second signature value, determining whether the second signature value corresponds to the first signature value, and using a determination of whether the second signature value corresponds to the first signature value to determine whether the first RF transmission is from a particular TPMS authenticated to the key value.

The method of FIG. 17 includes determining (1704), by the ECU (200), whether characteristics of the one or more RF transmissions align with known characteristics of RF transmissions from an authenticated TPMS sensor. In some implementations, the ECU (200) is configured with data representing typical, average, or median values or ranges for one or more characteristics of RF transmissions. The ECU (200) may be configured with specific values or ranges representing a majority (e.g., within a 90% confidence interval) of RF transmissions receivable by the ECU (200). Additionally or alternatively, the ECU (200) may be configured to record RF transmission characteristic values and generate statistics (e.g., averages) representing historical RF transmission characteristic values. The ECU (200) can determine values of these same characteristics for any incoming RF transmissions and compare the determined values to the abovementioned known or historically observed values. The ECU (200) can use the comparison to determine whether the characteristics of the incoming RF transmission indicate that it originates from a known (e.g., authenticated) TPMS RF transmissions source or from an unknown (e.g., unauthenticated) source.

In addition, the method of FIG. 17 includes using (1706), by the ECU (200), a determination of whether the characteristics of the one or more RF transmissions align with the known characteristics of RF transmissions from the authenticated TPMS sensor to determine whether the one or more RF transmissions are from the authenticated TPMS sensor. Using (1706), by the ECU, a determination of whether the characteristics of the one or more RF transmissions align with the known characteristics of RF transmissions from the authenticated TPMS sensor to determine whether the one or more RF transmissions are from the authenticated TPMS sensor may be carried out by after determining that the characteristics of the one or more RF transmissions align with the known characteristics of RF transmissions from the authenticated TPMS sensor, determining that the one or more RF transmissions are from the authenticated TPMS sensor; and after determining that the characteristics of the one or more RF transmissions do not align with the known characteristics of RF transmissions from the authenticated TPMS sensor, determining that the one or more RF transmissions are not from the authenticated TPMS sensor.

Figure 18:
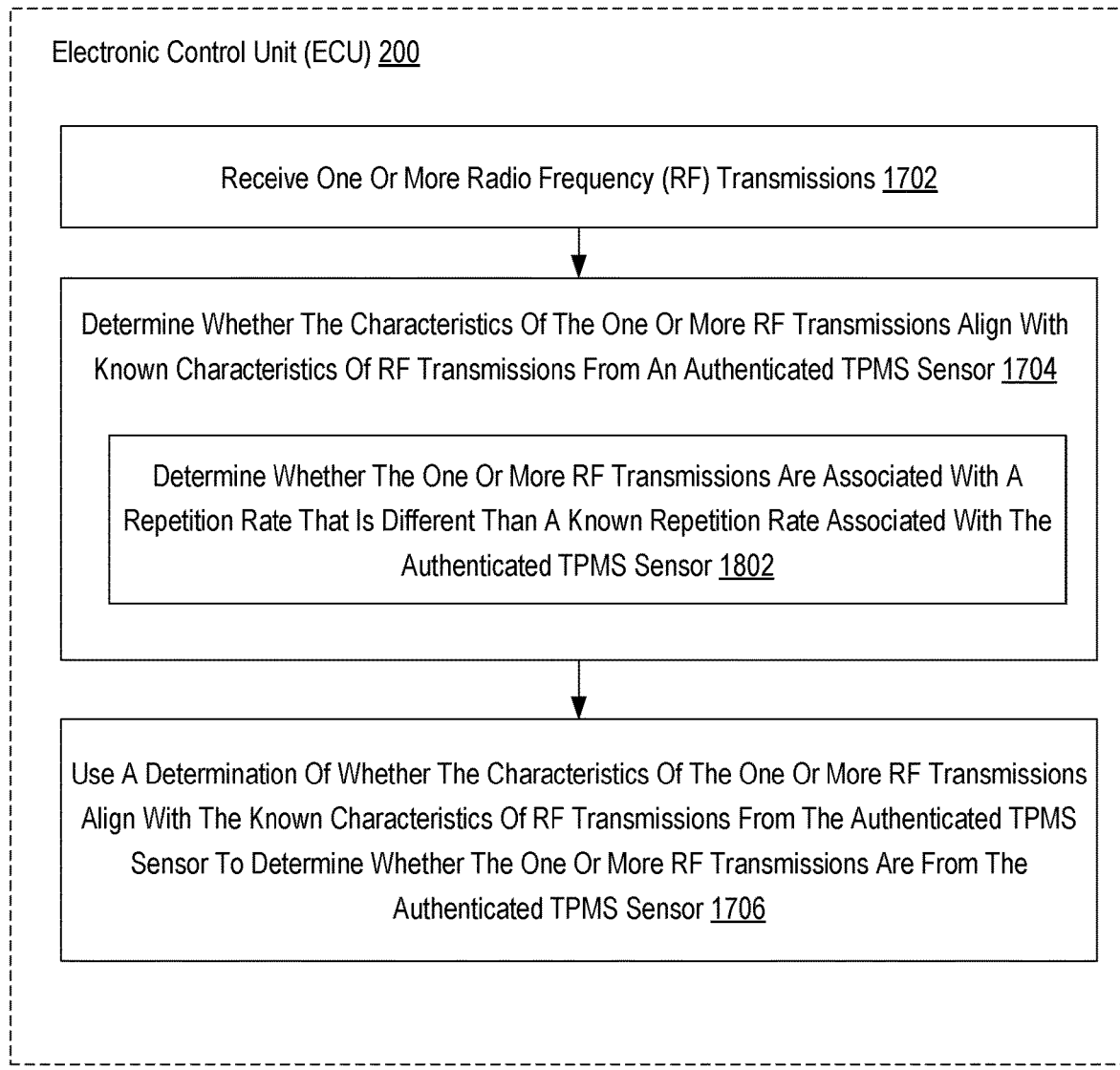
FIG. 18 is a flowchart of an example method for TPMS sensor authentication in accordance with at least one embodiment of the present disclosure.

For further explanation, FIG. 18 sets forth a flowchart of an example method for TPMS sensor authentication in accordance with at least one embodiment of the present disclosure. The method of FIG. 18 includes elements of FIG. 17. In the method of FIG. 18, determining (1704), by the ECU, whether characteristics of the one or more RF transmissions align with known characteristics of RF transmissions from an authenticated TPMS sensor includes determining (1802) whether the one or more RF transmissions are associated with a repetition rate that is different than a known repetition rate associated with the authenticated TPMS sensor. As part of the determination of whether characteristics of incoming RF transmissions align with known characteristics of RF transmissions, the method also includes determining (1006) whether a repetition rate of incoming RF transmissions correspond to a repetition rate associated with transmissions from an authenticated TPMS. For example, as described above, the ECU (200) may store RF characteristic values for repetition rate that indicate that an authenticated TPMS of the vehicle transmits RF transmissions only once per minute. The ECU (200) may interpret (whether in isolation or in combination with other authentication methods) that incoming RF transmissions having a once-per-minute repetition rate are likely to be from an authenticated TPMS. Accordingly, the ECU (200) may store transmission times for incoming RF transmissions, generate a repetition rate value for those RF transmissions, and compare the generated rate value to a known repetition rate value for an authenticated TPMS. In case the generated rate value is within a threshold range of the known repetition rate value, the ECU (200) may determine that the incoming RF transmissions are likely to be from an authenticated TPMS. Alternatively, where the generated rate value is outside the threshold range of the known repetition rate value, the ECU (200) may determine that the incoming RF transmissions are likely to be from an unauthenticated RF transmitter and likely reject the incoming RF transmissions.

Figure 19:
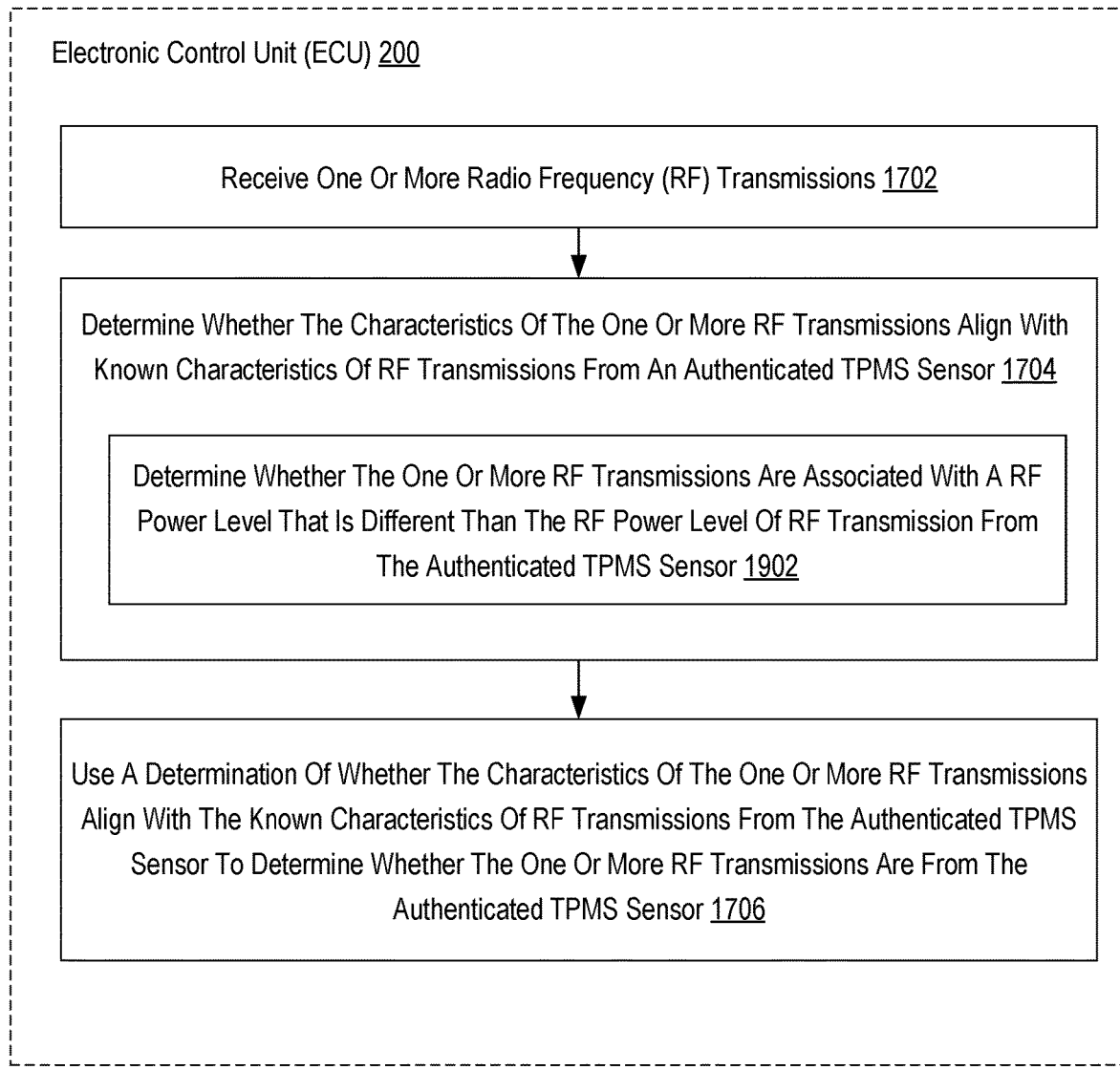
FIG. 19 is a flowchart of an example method for TPMS sensor authentication in accordance with at least one embodiment of the present disclosure.

For further explanation, FIG. 19 sets forth a flowchart of an example method for TPMS sensor authentication in accordance with at least one embodiment of the present disclosure. The method of FIG. 19 includes elements of FIG. 17. In the method of FIG. 19, determining (1704), by the ECU, whether characteristics of the one or more RF transmissions align with known characteristics of RF transmissions from an authenticated TPMS sensor includes determining (1902) whether the one or more RF transmissions are associated with a RF power level that is different than the RF power level of RF transmission from the authenticated TPMS sensor. For example, as described above, the ECU (200) may store RF characteristic values for RF transmission power level that indicate that an authenticated TPMS of the vehicle transmits RF transmissions at an average of 1 dBm (decibel-milliwatts). The ECU (200) may interpret (whether in isolation or in combination with other authentication methods) that incoming RF transmissions having a 1 dBm power level are likely to be from an authenticated TPMS. Accordingly, the ECU (200) may store transmission times for incoming RF transmissions, generate a power level value for those RF transmissions, and compare the generated power level value to a known power level value for an authenticated TPMS. In case the generated power level value is within a threshold range of the known power level value, the ECU (200) may determine that the incoming RF transmissions are likely to be from an authenticated TPMS. Alternatively, where the generated power level value is outside the threshold range of the known power level value, the ECU (200) may determine that the incoming RF transmissions are likely to be from an unauthenticated RF transmitter and likely reject the incoming RF transmissions.

Figure 20:
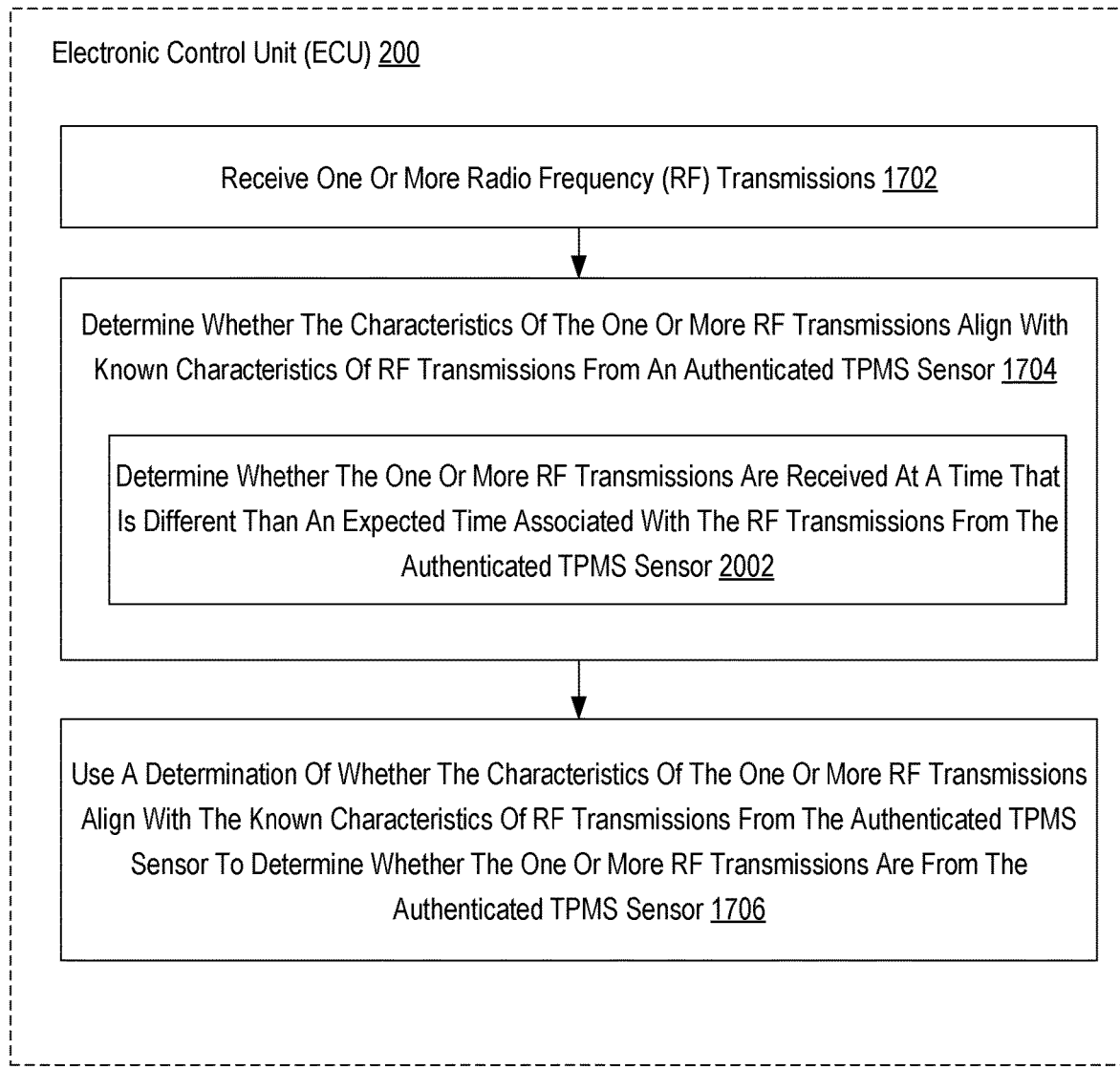
FIG. 20 is a flowchart of an example method for TPMS sensor authentication in accordance with at least one embodiment of the present disclosure.

For further explanation, FIG. 20 sets forth a flowchart of an example method for TPMS sensor authentication in accordance with at least one embodiment of the present disclosure. The method of FIG. 20 includes elements of FIG. 17. In the method of FIG. 20, determining (1704), by the ECU, whether characteristics of the one or more RF transmissions align with known characteristics of RF transmissions from an authenticated TPMS sensor includes determining (2002) whether the one or more RF transmissions are received at a time that is different than an expected time associated with the RF transmissions from the authenticated TPMS sensor. For example, as described above, the ECU (200) may store RF characteristic values for RF transmission power level that indicate that an authenticated TPMS of the vehicle transmits RF transmissions regularly every 119-121 seconds with greater than 90% reception. The ECU (200) may interpret (whether in isolation or in combination with other authentication methods) that incoming RF transmissions that are received within a multiple of 119 to 121 seconds are likely to be from an authentic TPMS. Accordingly, the ECU (200) may record transmission times for incoming RF transmissions and determine whether the recorded transmission times are within the 119 second to 121 second timeframe. In case the transmission time is within a threshold range of the 119 to 121 second timeframe, the ECU (200) may determine that the incoming RF transmissions are likely to be from an authenticated TPMS. Alternatively, where the transmission time is outside the 119 to 121 second timeframe, the ECU (200) may determine that the incoming RF transmissions are likely to be from an unauthenticated RF transmitter and likely reject the incoming RF transmissions.

Figure 21:
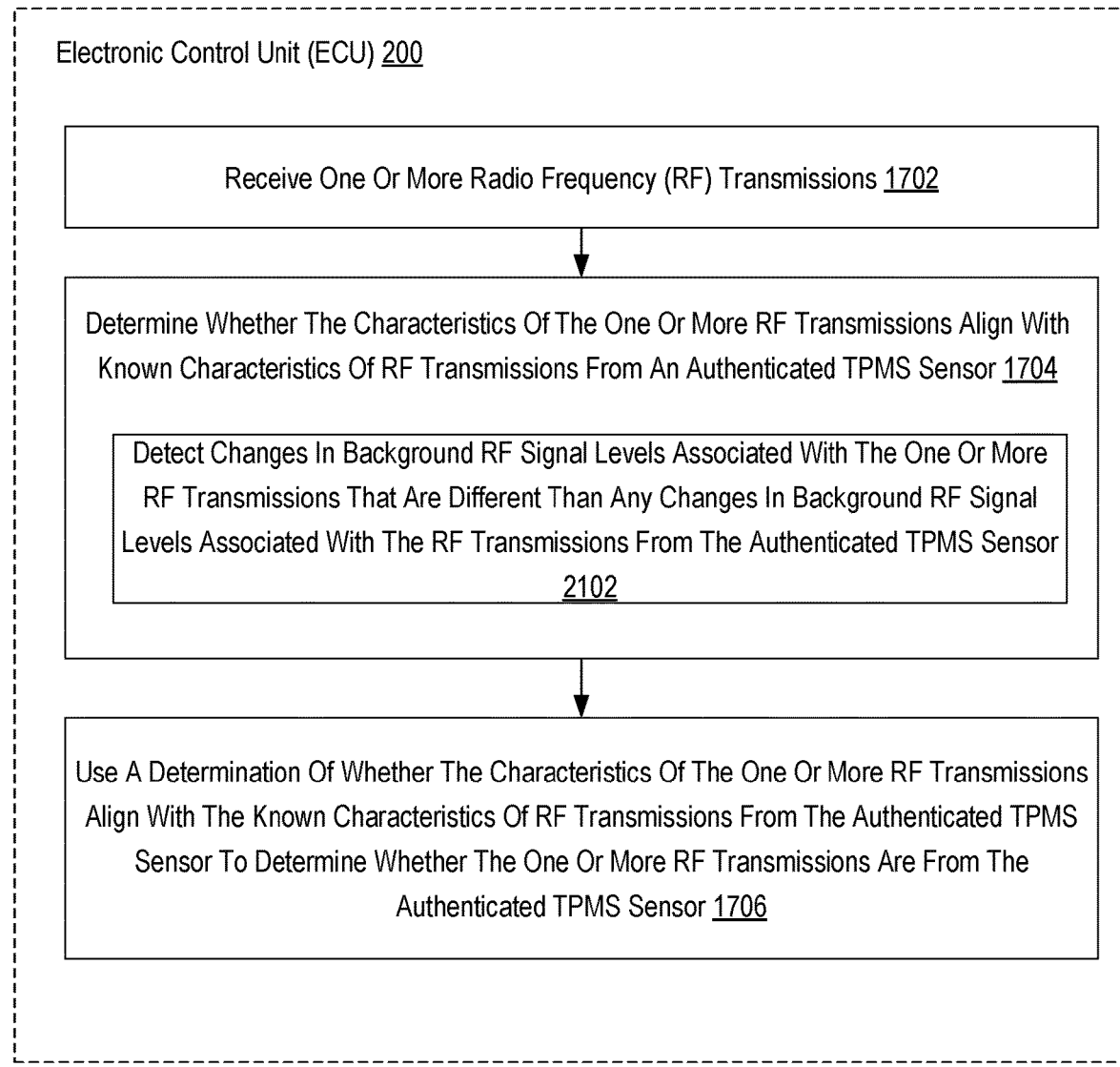
FIG. 21 is a flowchart of an example method for TPMS sensor authentication in accordance with at least one embodiment of the present disclosure.

For further explanation, FIG. 21 sets forth a flowchart of an example method for TPMS sensor authentication in accordance with at least one embodiment of the present disclosure. The method of FIG. 21 includes elements of FIG. 17. In the method of FIG. 21, determining (1704), by the ECU, whether characteristics of the one or more RF transmissions align with known characteristics of RF transmissions from an authenticated TPMS sensor includes detecting (2102) changes in background RF signal levels associated with the one or more RF transmissions that are different than any changes in background RF signal levels associated with the RF transmissions from the authenticated TPMS sensor. Detecting (2102) changes in background RF signal levels associated with the one or more RF transmissions that are different than any changes in background RF signal levels associated with the RF transmissions from the authenticated TPMS sensor may be carried out by analyzing background RF signals in addition to those that are being directed at the ECU in order to determine whether an unauthorized person is attempting to block transmissions from the authenticated TPMS. For example, an attacker may become aware of the frequency or other transmission characteristics of a typical RF transmission from an authenticated TPMS and use tools such as an RF jammer to block or obscure the signals sent from the authenticated TPMS sensor to the ECU. The attacker may intend to block authenticated signals so that only the attacker's transmissions are properly received by the ECU.

Detecting (2102) changes in background RF signal levels associated with the one or more RF transmissions that are different than any changes in background RF signal levels associated with the RF transmissions from the authenticated TPMS sensor may be carried out by storing a first set of values representing average values for one or more attributes or characteristics of background RF transmissions. For example, the ECU may be programmed with characteristics of typical background radio frequency signal levels that are detected by the ECU (e.g., being transmitted from other RF devices such as cell phones). Additionally, or alternatively, the ECU may be configured to store background RF signal characteristic values and determine historical averages or other statistics for such values.

In addition, detecting (2102) changes in background RF signal levels includes receiving a background RF transmission having a second set of values for the one or more attributes. For example, the ECU may detect one or more background RF transmissions. The one or more background RF transmissions may have characteristic values that are different from the first set of average values.

The ECU may also be configured to determine whether the first set of values deviate from the second set of values by more than a threshold amount. For example, the received set of background transmissions may have characteristic values that deviate from the average values by more than a threshold amount. If so, the method also includes determining that an unauthenticated RF transmitter is attempting to jam authentic RF transmissions to the ECU (e.g., the ECU). The ECU may be configured to detect that RF jamming is taking place and present a notification to the vehicle driver or owner or notify other persons such as law enforcement, as described above. Alternatively, the received set of background transmissions may have characteristic values that do not deviate from the average values by more than a threshold amount. If so, the method also includes determining that no RF jamming is taking place and that background RF transmissions are within normal ranges.

Figure 22:
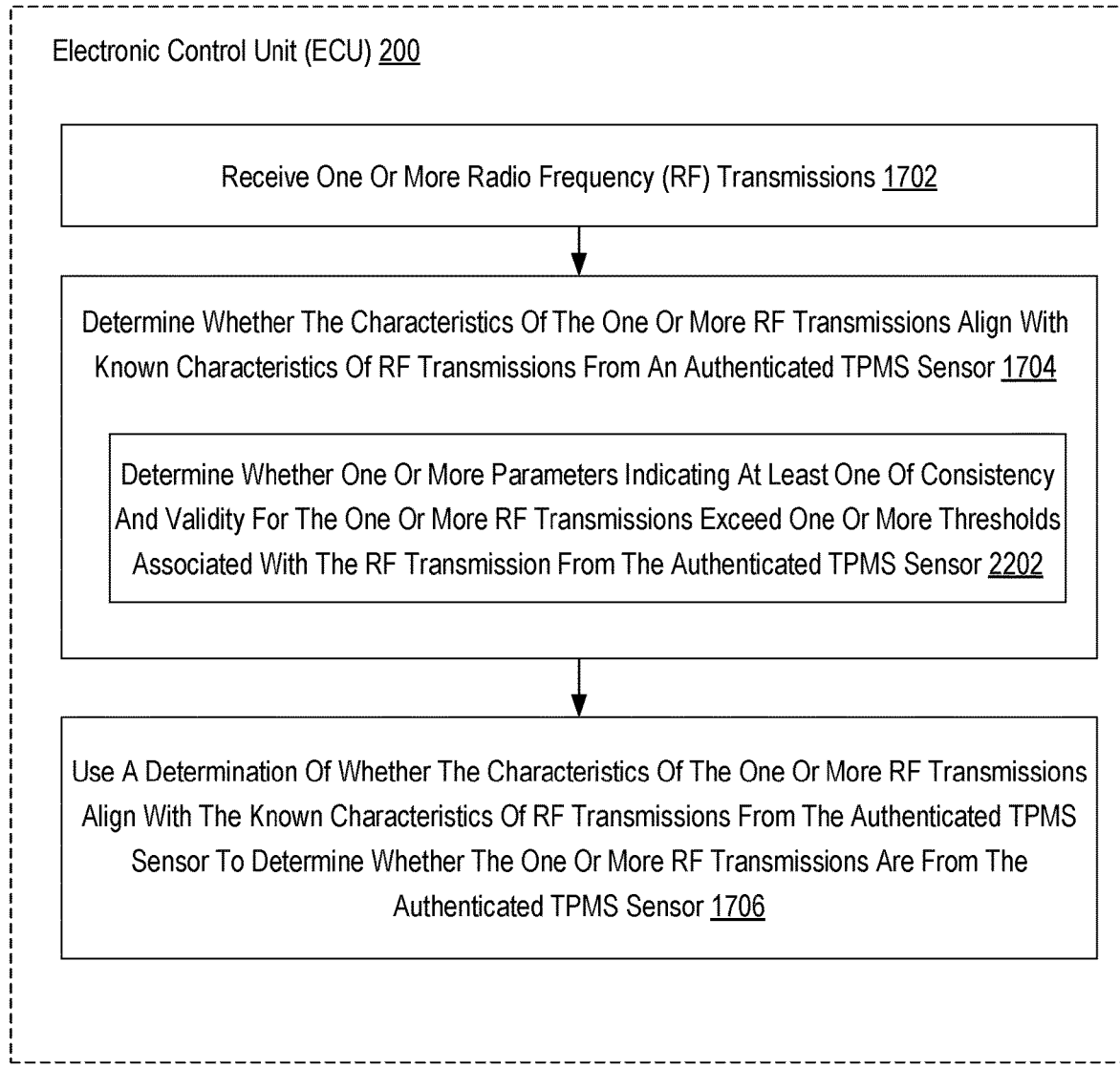
FIG. 22 is a flowchart of an example method for TPMS sensor authentication in accordance with at least one embodiment of the present disclosure.

For further explanation, FIG. 22 sets forth a flowchart of an example method for TPMS sensor authentication in accordance with at least one embodiment of the present disclosure. The method of FIG. 22 includes elements of FIG. 17. In the method of FIG. 22, determining (1704), by the ECU, whether characteristics of the one or more RF transmissions align with known characteristics of RF transmissions from an authenticated TPMS sensor includes determining (2202) whether one or more parameters indicating at least one of consistency and validity for the one or more RF transmissions exceed one or more thresholds associated with the RF transmission from the authenticated TPMS sensor. Determining (2202) whether one or more parameters indicating at least one of consistency and validity for the one or more RF transmissions exceed one or more thresholds associated with the RF transmission from the authenticated TPMS sensor may be carried out by comparing the one or more parameters to one or more thresholds associated with the RT transmissions.

Figure 23:
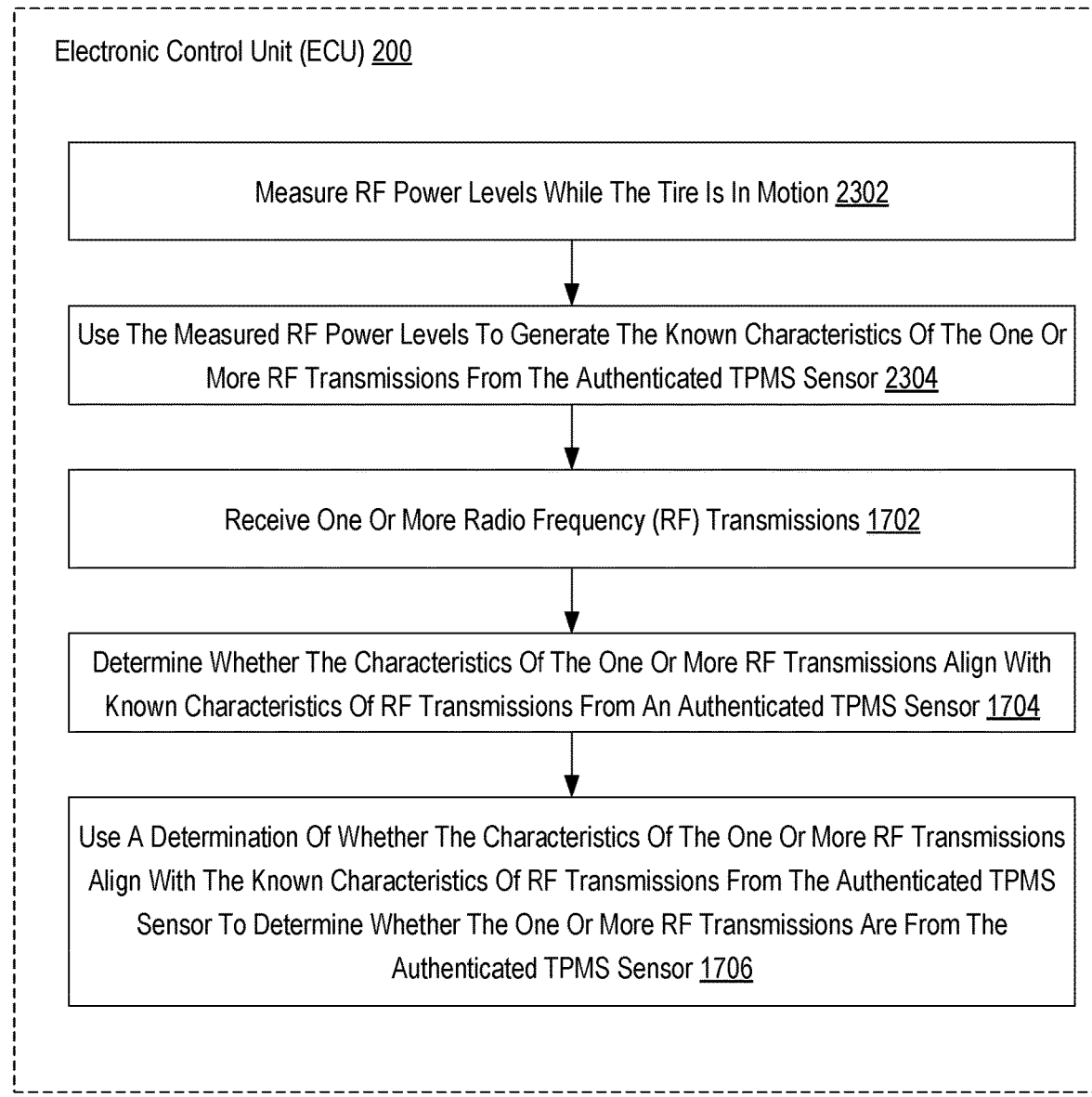
FIG. 23 is a flowchart of an example method for TPMS sensor authentication in accordance with at least one embodiment of the present disclosure.

For further explanation, FIG. 23 sets forth a flowchart of an example method for TPMS sensor authentication in accordance with at least one embodiment of the present disclosure. The method of FIG. 23 includes elements of FIG. 17. In addition, the method of FIG. 23 also includes measuring (2302), by the ECU, RF power levels while the tire is in motion. Measuring (2302), by the ECU, RF power levels while the tire is in motion may be carried out by capturing data indicating a motion state of a tire (e.g., acceleration data); using the captured data to determine whether the tire is in motion; and after determining that the tire is in motion, capturing the RF power level.

In addition, the method of FIG. 23 also includes using (2304), by the ECU, the measured RF power levels to generate the known characteristics of the one or more RF transmissions from the authenticated TPMS sensor. Using (2304), by the ECU, the measured RF power levels to generate the known characteristics of the one or more RF transmissions from the authenticated TPMS sensor may be carried out by converting the RF power level measurements to one or more characteristic parameters; and storing the one or more characteristic parameters.

Figure 24:
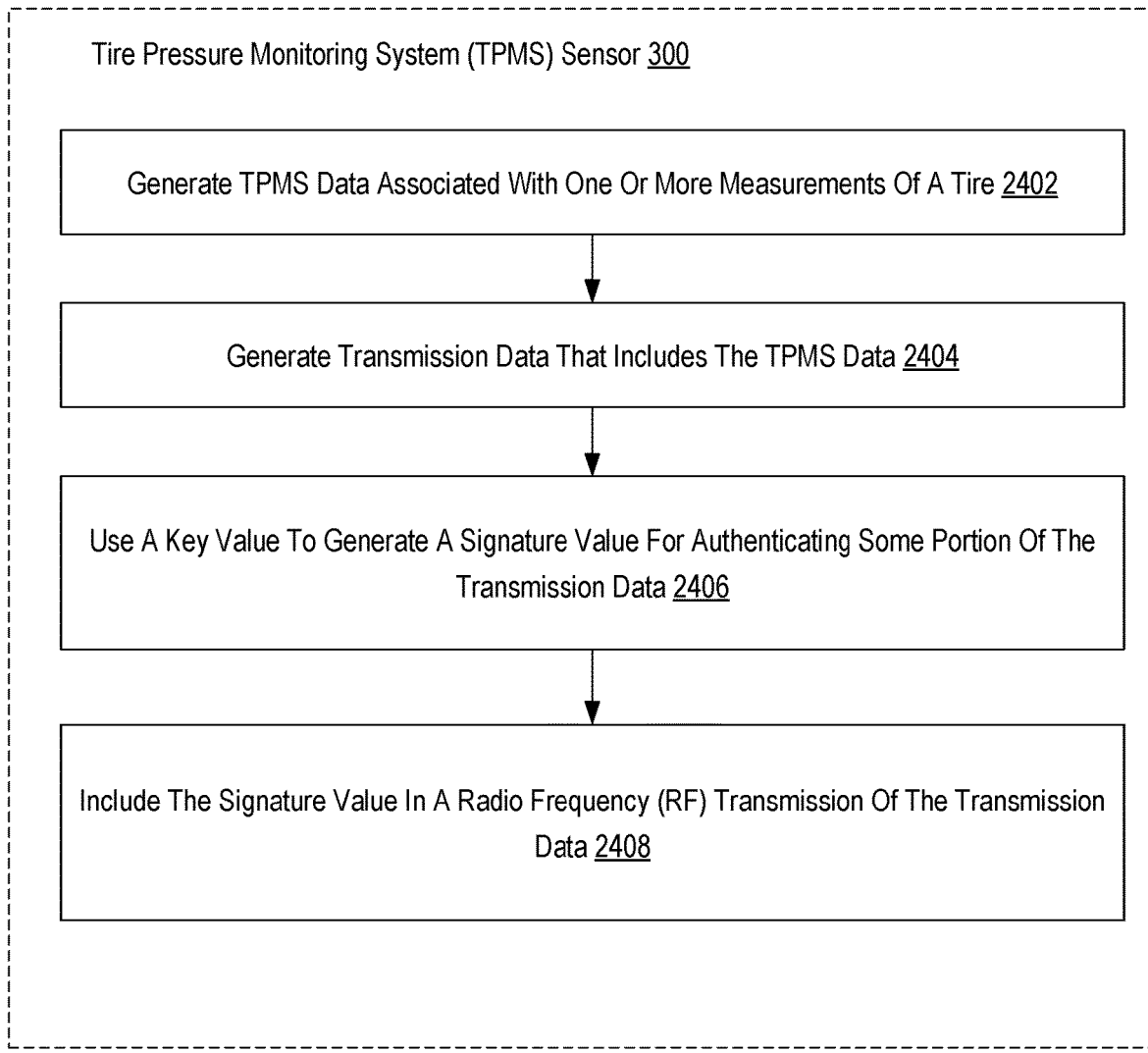
FIG. 24 is a flowchart of an example method for TPMS sensor authentication in accordance with at least one embodiment of the present disclosure.

For further explanation, FIG. 24 sets forth a flowchart of an example method for TPMS sensor authentication in accordance with at least one embodiment of the present disclosure. The method of FIG. 24 includes generating (2402), by a TPMS sensor (300), TPMS data associated with one or more measurements of a tire. Generating (2402), by the TPMS sensor (300), TPMS data associated with one or more measurements of a tire may be carried out by utilizing one or more sensors within the TPMS sensor to capture or generate raw data associated with a tire; and converting the raw sensor data using an analog to digital converter to generate sensor data.

The method of FIG. 24 also includes generating (2404), by the TPMS sensor (300), transmission data that includes the TPMS data. Generating (2404), by the TPMS sensor (300), transmission data that includes the TPMS data may be carried out by converting the sensor data for transmission in data frames or packets.

In addition, the method of FIG. 24 also includes using (2406), by the TPMS sensor (300), a key value to generate a signature value for authenticating some portion of the transmission data. Using (2406), by the TPMS sensor (300), a key value to generate a signature value for authenticating some portion of the transmission data may be carried out by applying a hashing function or algorithm to encode some portion of the transmission data as a signature value.

The method of FIG. 24 includes including (2408), by the TPMS sensor (300), the signature value in a radio frequency (RF) transmission of the transmission data. Including (2408), by the TPMS sensor (300), the signature value in a radio frequency (RF) transmission of the transmission data may be carried out by appending the signature value to the TPMS data for transmission.

Figure 25:
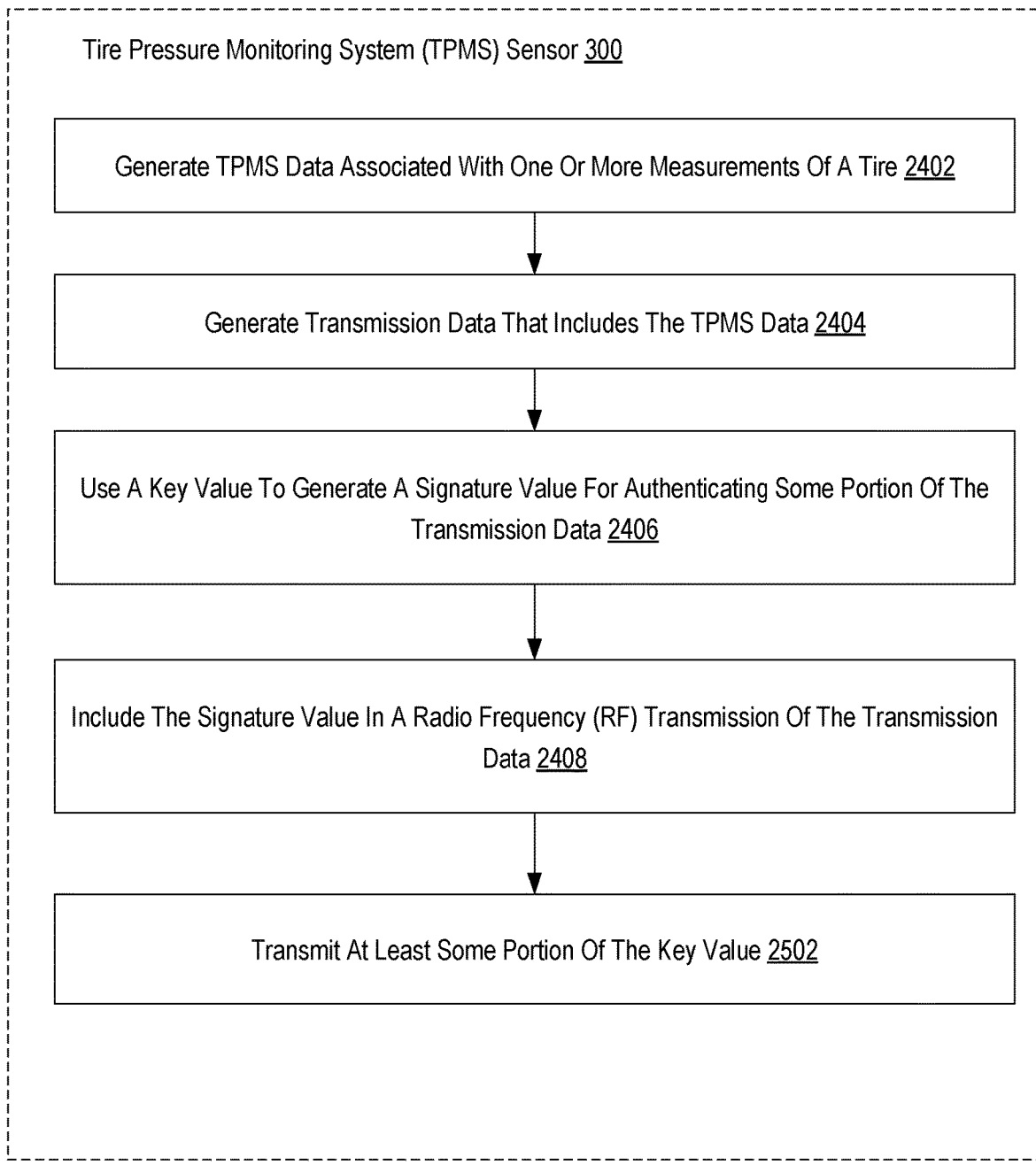
FIG. 25 is a flowchart of an example method for TPMS sensor authentication in accordance with at least one embodiment of the present disclosure.

For further explanation, FIG. 25 sets forth a flowchart of an example method for TPMS sensor authentication in accordance with at least one embodiment of the present disclosure. The method of FIG. 25 includes elements of FIG. 24. In addition, the method of FIG. 25 also includes transmitting (2502), by the TPMS sensor (300), at least some portion of the key value. Transmitting (2502), by the TPMS sensor (300), at least some portion of the key value may be carried out by transmitting all or a portion of the key value in packets or data frames via an RF transceiver.

Figure 26:
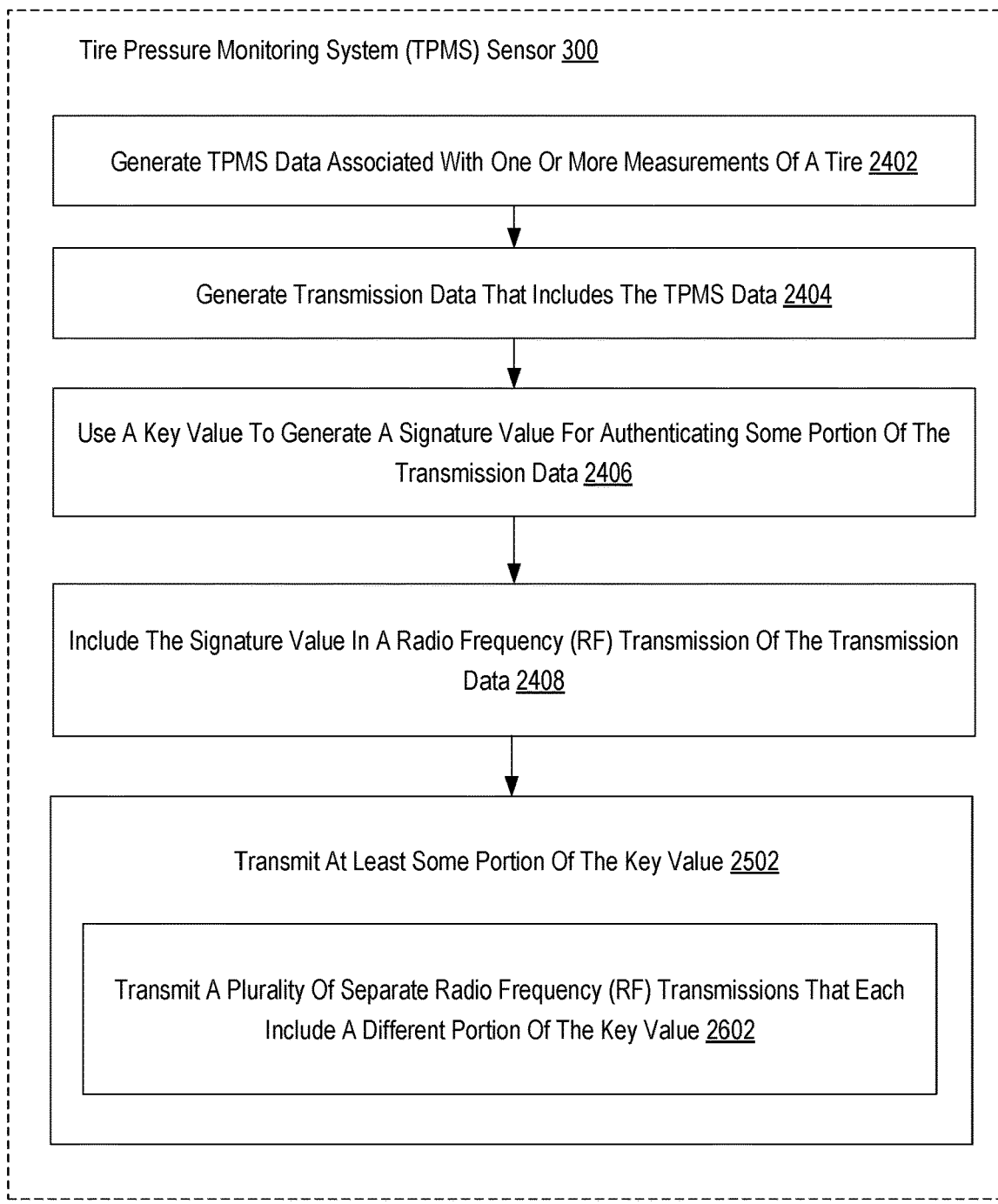
FIG. 26 is a flowchart of an example method for TPMS sensor authentication in accordance with at least one embodiment of the present disclosure.

For further explanation, FIG. 26 sets forth a flowchart of an example method for TPMS sensor authentication in accordance with at least one embodiment of the present disclosure. The method of FIG. 26 includes elements of FIG. 25. In the method of FIG. 26, transmitting (2502), by the TPMS sensor (300), at least some portion of the key value includes transmitting (2602), by the TPMS sensor (300), a plurality of separate radio frequency (RF) transmissions that each include a different portion of the key value. For example, in order to further secure the key exchange process, the TPMS sensor (300) may only transmit, to the ECU (200), portions of the key value at a given time. For example, the TPMS sensor (300) may only transmit a portion of the key once per hour until the entire key is transmitted. In this way, an attacker or unauthorized person may not be able to obtain the entire key quickly. The attacker may need to wait near the vehicle or follow the vehicle for an extended period of time in order to obtain the entire key so that the attacker can send appear to be an authenticated TPMS and send (fake) TPMS messages to the ECU (200).

Figure 27:
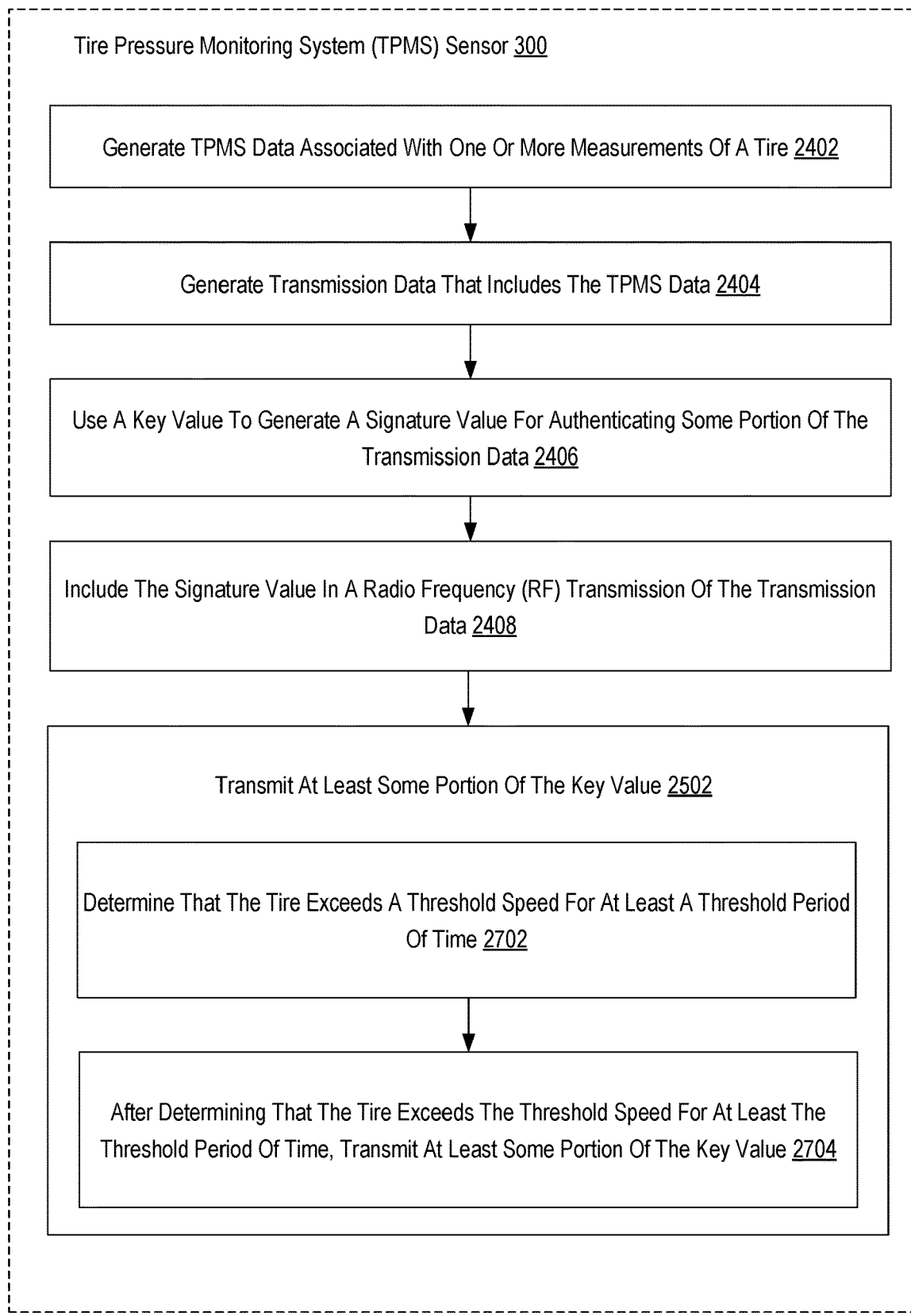
FIG. 27 is a flowchart of an example method for TPMS sensor authentication in accordance with at least one embodiment of the present disclosure.

For further explanation, FIG. 27 sets forth a flowchart of an example method for TPMS sensor authentication in accordance with at least one embodiment of the present disclosure. The method of FIG. 27 includes elements of FIG. 25. In the method of FIG. 27, transmitting (2502), by the TPMS sensor (300), at least some portion of the key value includes determining (2702), by the TPMS sensor (300), that the tire exceeds a threshold speed for at least a threshold period of time. Determining (2702), by the TPMS sensor (300), that the tire exceeds a threshold speed for at least a threshold period of time may be carried out by capturing data from one or more sensors of the TPMS sensor; using the captured data to determine a speed of the tire or vehicle; determining that the determined speed of the tire has exceeded a speed threshold for the threshold period of time.

In the method of FIG. 27, transmitting (2502), by the TPMS sensor (300), at least some portion of the key value includes after determining that the tire exceeds the threshold speed for at least the threshold period of time, transmitting (2704), by the TPMS sensor (300), at least some portion of the key value. Transmitting (2704), by the TPMS sensor (300), at least some portion of the key value may be carried out by transmitting all or a portion of the key value in packets or data frames via an RF transceiver.

Figure 28:
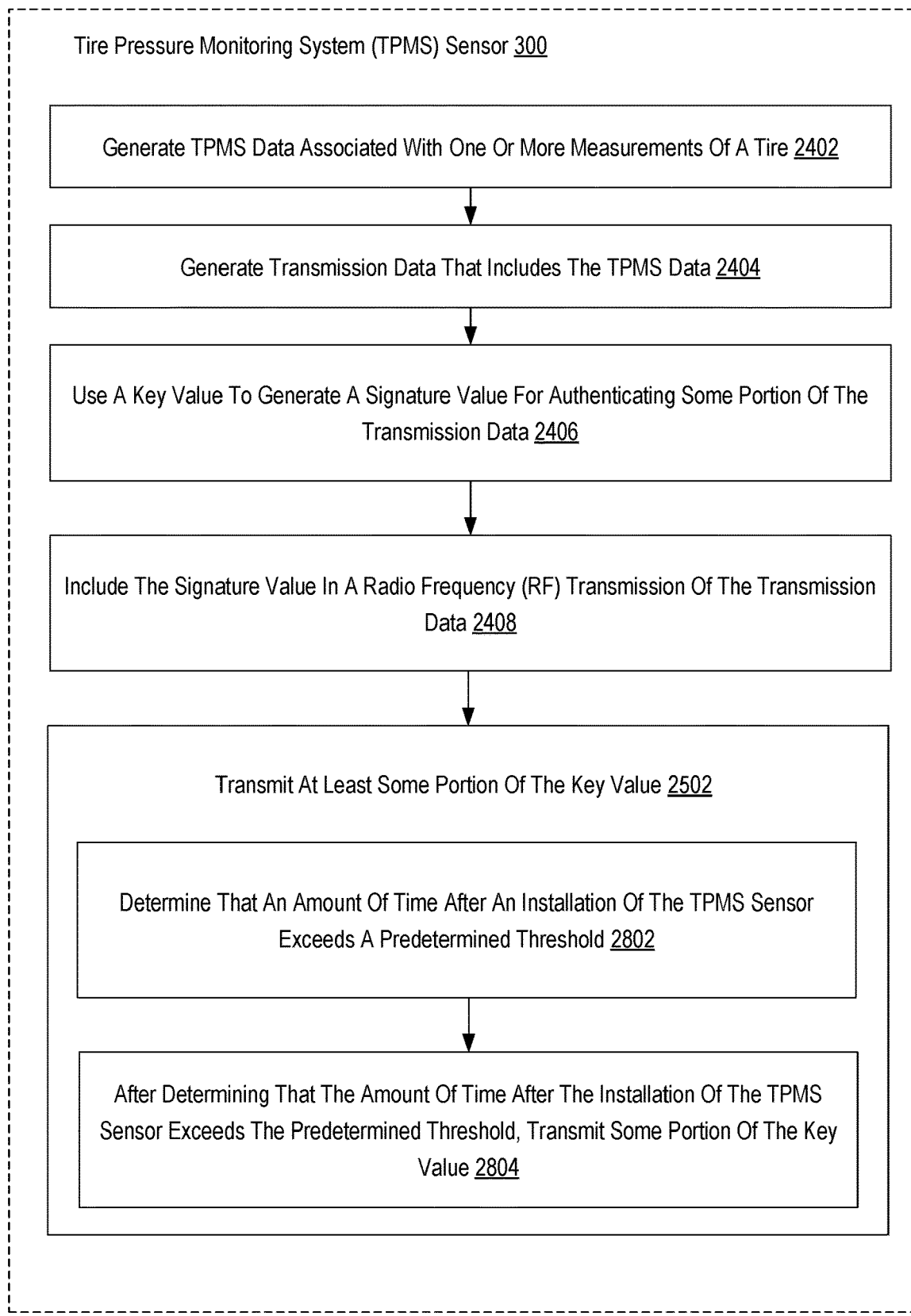
FIG. 28 is a flowchart of an example method for TPMS sensor authentication in accordance with at least one embodiment of the present disclosure.

For further explanation, FIG. 28 sets forth a flowchart of an example method for TPMS sensor authentication in accordance with at least one embodiment of the present disclosure. The method of FIG. 28 includes elements of FIG. 25. In the method of FIG. 28, transmitting (2502), by the TPMS sensor (300), at least some portion of the key value includes determining (2802), by the TPMS sensor (300), that an amount of time after an installation of the TPMS sensor exceeds a predetermined threshold. Determining (2802), by the TPMS sensor (300), that an amount of time after an installation of the TPMS sensor exceeds a predetermined threshold may be carried out by starting a timer or a tire revolution counter; and determining that the timer tire revolution counter has exceeded the predetermined threshold.

In addition, the method of FIG. 28 includes after determining that the amount of time after the installation of the TPMS sensor exceeds the predetermined threshold, transmitting (2804), by the TPMS sensor (300), some portion of the key value. Transmitting (2804), by the TPMS sensor (300), some portion of the key value may be carried out by transmitting all or a portion of the key value in packets or data frames via an RF transceiver.

Figure 29:
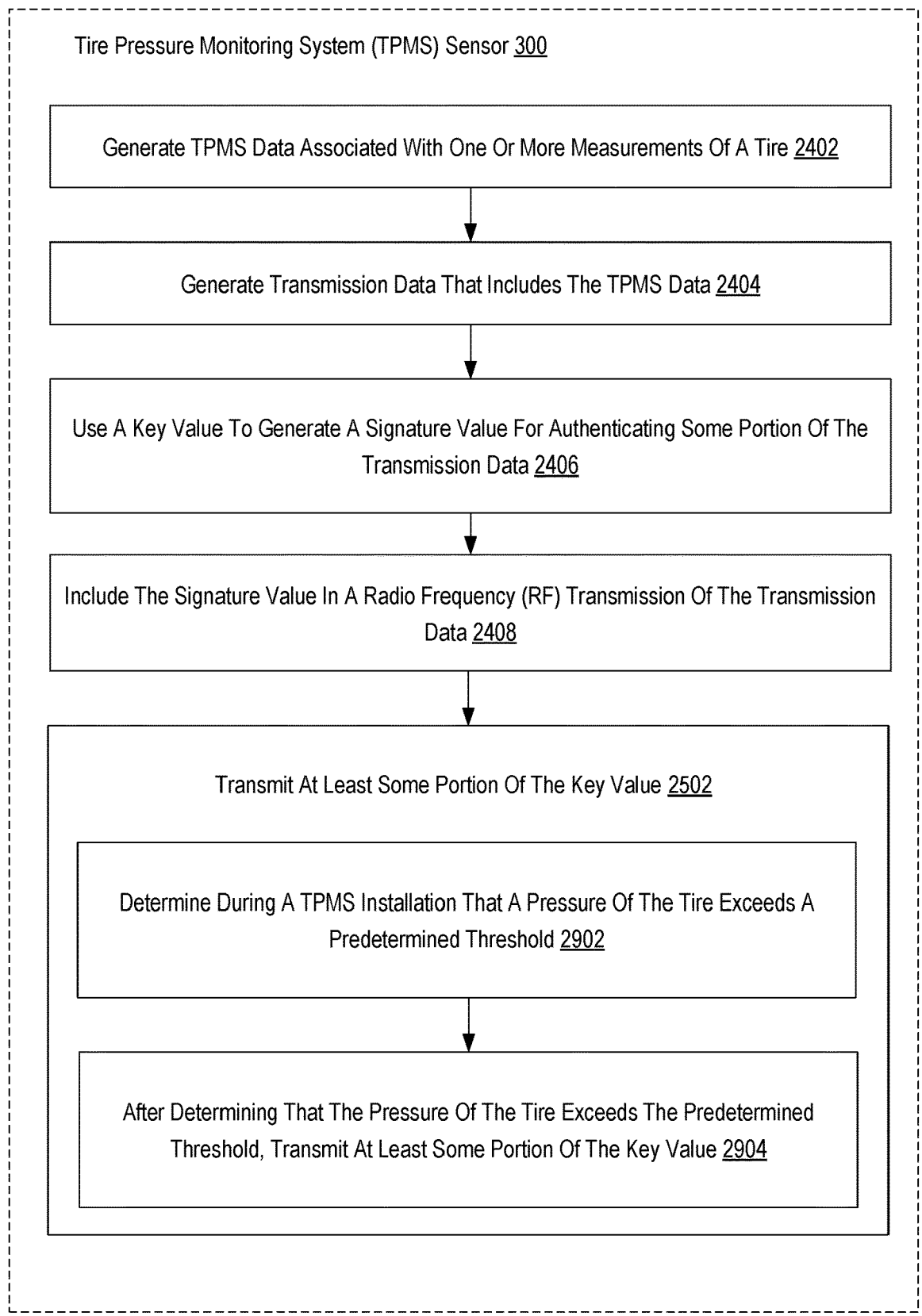
FIG. 29 is a flowchart of an example method for TPMS sensor authentication in accordance with at least one embodiment of the present disclosure.

For further explanation, FIG. 29 sets forth a flowchart of an example method for TPMS sensor authentication in accordance with at least one embodiment of the present disclosure. The method of FIG. 29 includes elements of FIG. 25. In the method of FIG. 29, transmitting (2502), by the TPMS sensor (300), at least some portion of the key value includes determining (2902) during a TPMS installation that a pressure of the tire exceeds a predetermined threshold. Determining (2902) during a TPMS installation that a pressure of the tire exceeds a predetermined threshold may be carried out by capturing tire pressure data from one or more tire pressure sensors of the TPMS sensor; using the captured data to determine a pressure of the tire; determining that the determined pressure of the tire has exceeded a threshold.

In addition, in the method of FIG. 29, transmitting (2502), by the TPMS sensor (300), at least some portion of the key value includes after determining that the pressure of the tire exceeds the predetermined threshold, transmitting (2904) at least some portion of the key value. Transmitting (2904) at least some portion of the key value may be carried out by transmitting all or a portion of the key value in packets or data frames via an RF transceiver.

Figure 30:
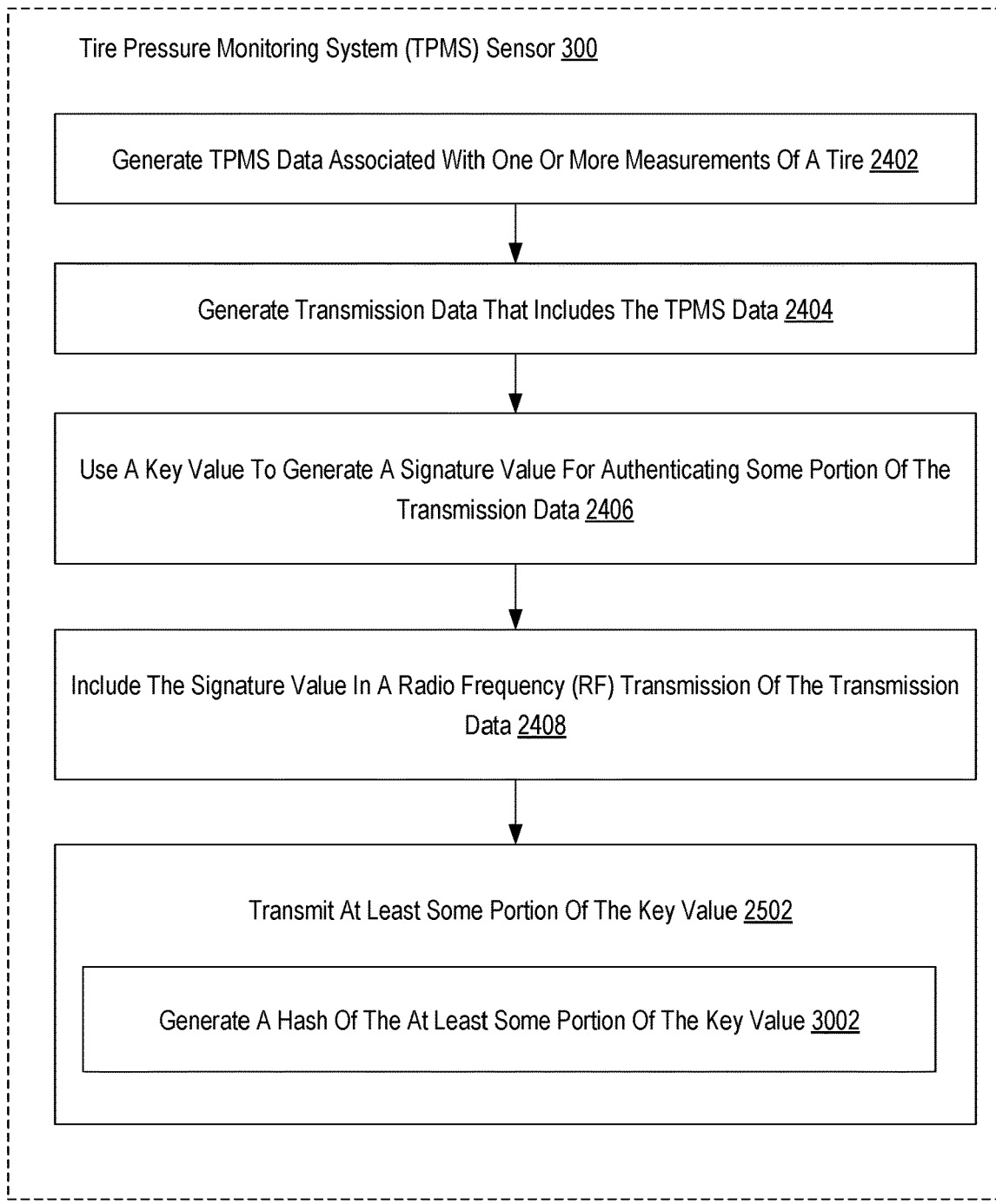
FIG. 30 is a flowchart of an example method for TPMS sensor authentication in accordance with at least one embodiment of the present disclosure.

For further explanation, FIG. 30 sets forth a flowchart of an example method for TPMS sensor authentication in accordance with at least one embodiment of the present disclosure. The method of FIG. 30 includes elements of FIG. 25. In addition, in the method of FIG. 30, transmitting (2502), by the TPMS sensor (300), at least some portion of the key value includes generating (3002) an encrypted version of at least some portion of the key value. Generating (3002) an encrypted version of the at least some portion of the key value may be carried out by applying one or more encryption algorithms to some portion of the key value to generate the encrypted version of the portion of the key value.

Figure 31:
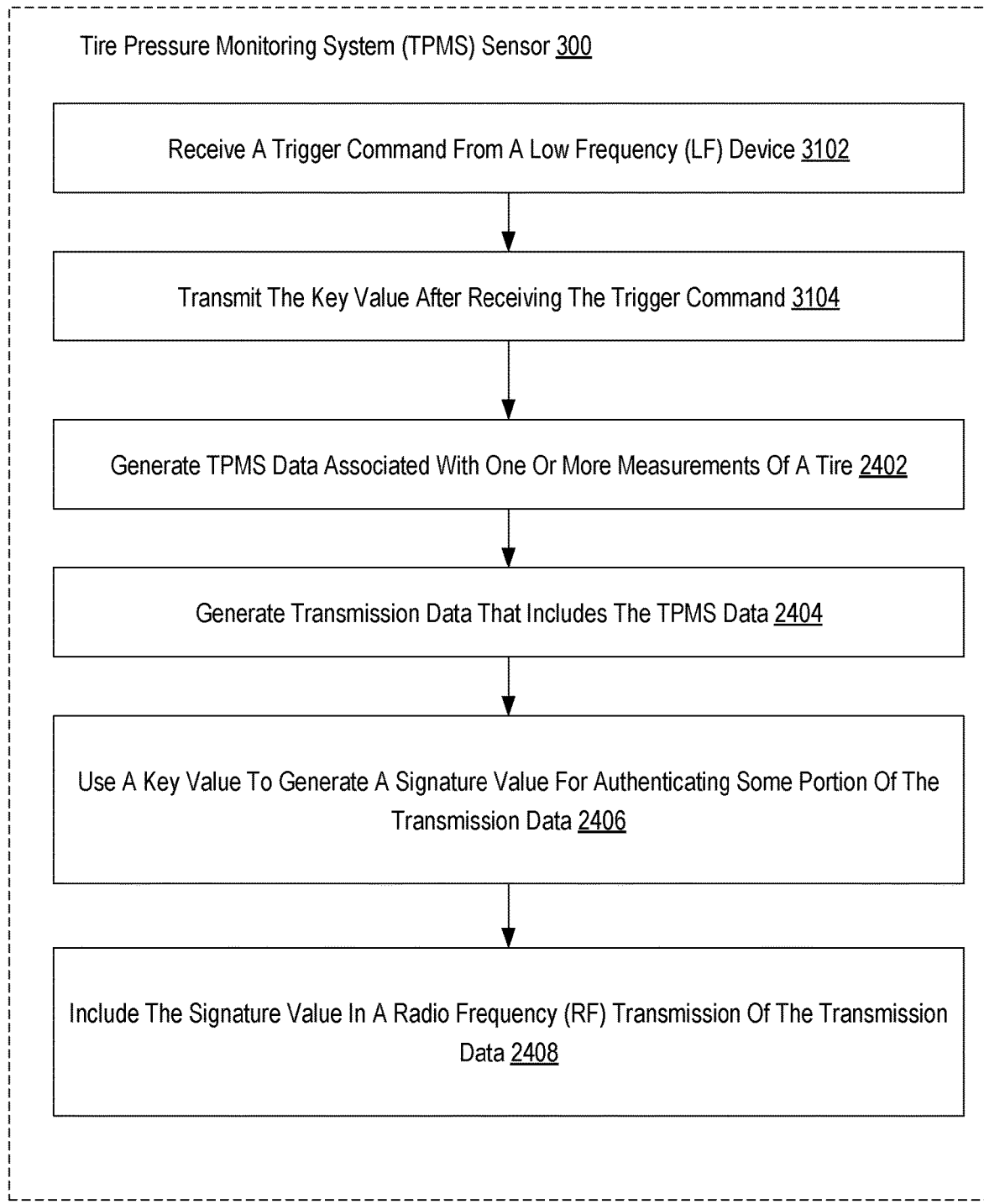
FIG. 31 is a flowchart of an example method for TPMS sensor authentication in accordance with at least one embodiment of the present disclosure.

For further explanation, FIG. 31 sets forth a flowchart of an example method for TPMS sensor authentication in accordance with at least one embodiment of the present disclosure. The method of FIG. 31 includes elements of FIG. 25. In addition, the method of FIG. 31 also includes receiving (3102), by the TPMS sensor (300), a trigger command from a low frequency (LF) device. Receiving (3102), by the TPMS sensor (300), a trigger command from a low frequency (LF) device may be carried out by receiving a signal at a transceiver of the TPMS sensor; comparing the signal to one or more stored patterns; and based on the comparison of the signal to one or more stored patterns, determining that the signal is associated with a trigger command.

In addition, the method of FIG. 31 also includes transmitting (3104), by the TPMS sensor (300), the key value after receiving the trigger command. Transmitting (3104), by the TPMS sensor (300), the key value after receiving the trigger command may be carried out by after receiving a signal that matches a stored pattern associated with a trigger command, transmitting some portion of the key value via a RF transmitter.

Figure 32:
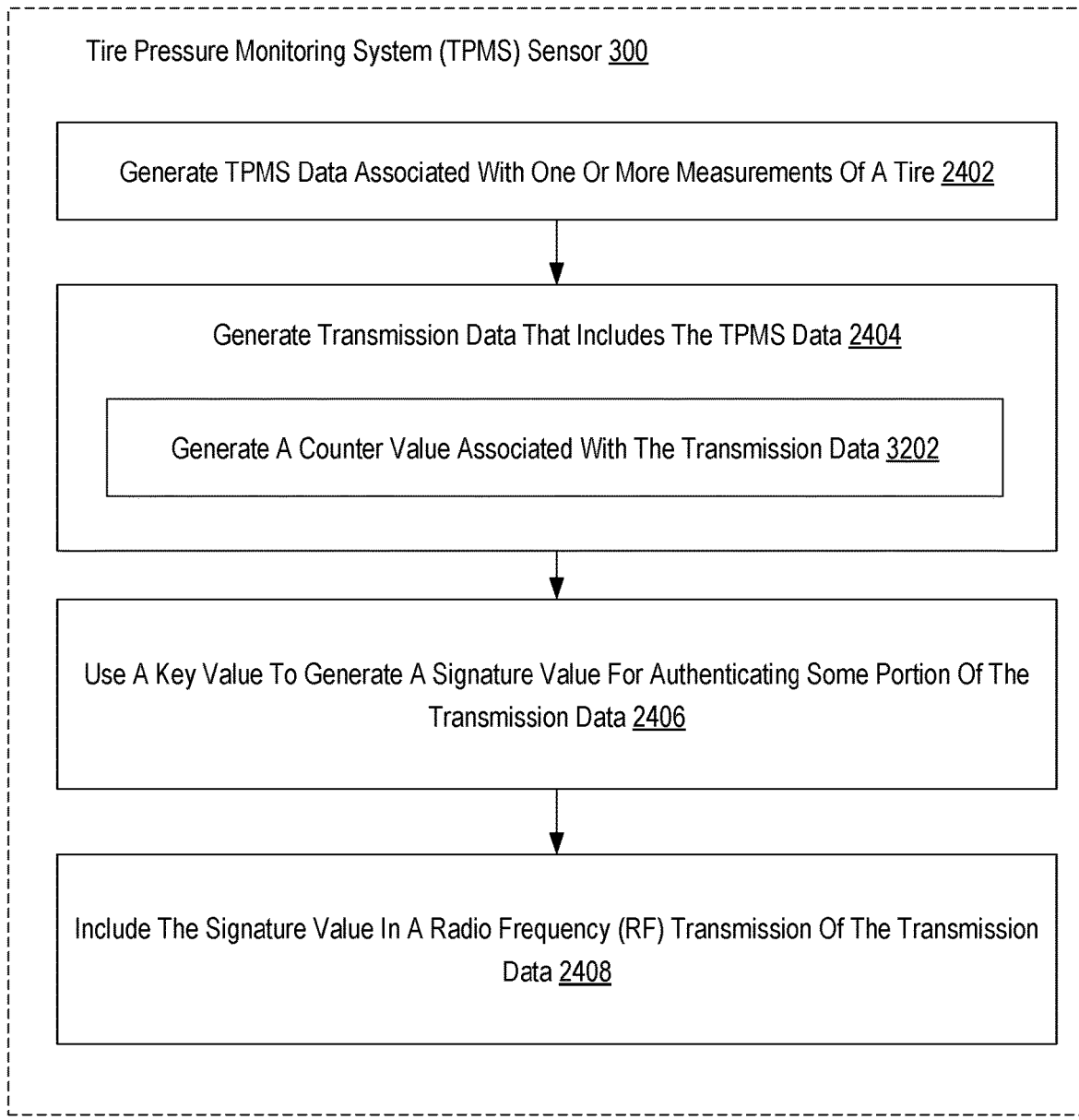
FIG. 32 is a flowchart of an example method for TPMS sensor authentication in accordance with at least one embodiment of the present disclosure.

For further explanation, FIG. 32 sets forth a flowchart of an example method for TPMS sensor authentication in accordance with at least one embodiment of the present disclosure. The method of FIG. 32 includes elements of FIG. 24. In the method of FIG. 32, generating (2404), by the TPMS sensor (300), transmission data that includes the TPMS data includes generating (3202) a counter value associated with the transmission data. As described above, the TPMS sensor may be configured to transmit a security section (460) that includes a counter (438) that indicates a count or ordering of an RF transmission. While the example provided above described that the pressure (434) is hashed to obtain the signature (440), readers will appreciate that, in some implementations, the TPMS sensor (300) may hash the counter (438) to obtain the signature (440). In other implementations, the TPMS sensor (300) may generate a hash of both the pressure (434) and the counter (438), or combine the pressure (434) and the counter (438) in other ways to obtain the signature (440). The ECU (200) may be configured to decode the signature (440) to obtain the counter (438).

Figure 33:
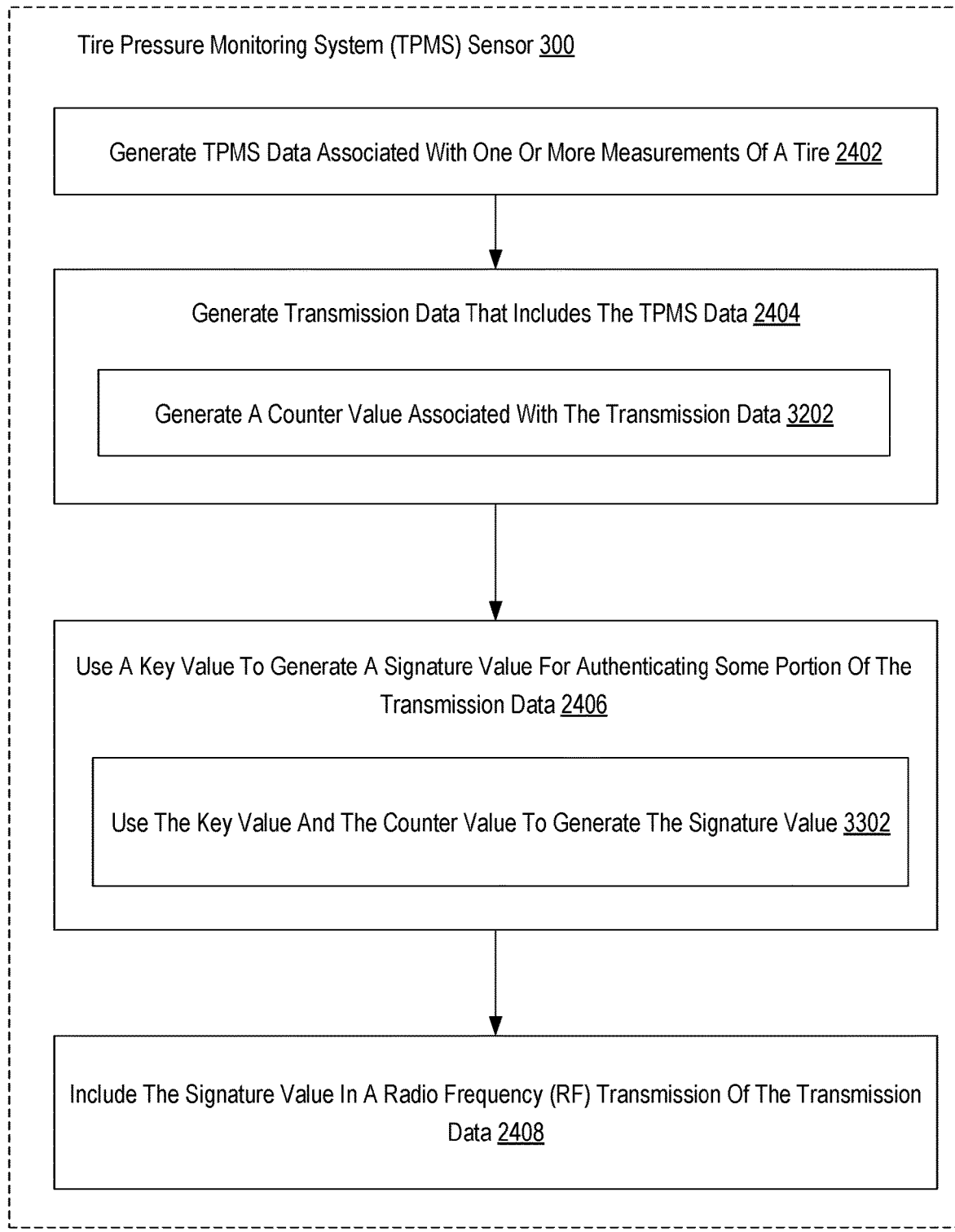
FIG. 33 is a flowchart of an example method for TPMS sensor authentication in accordance with at least one embodiment of the present disclosure.

For further explanation, FIG. 33 sets forth a flowchart of an example method for TPMS sensor authentication in accordance with at least one embodiment of the present disclosure. The method of FIG. 33 includes elements of FIG. 32. In the method of FIG. 33, using (2406), by the TPMS sensor (300), a key value to generate a signature value for authenticating some portion of the transmission data includes using (3302) the key value and the counter value to generate the signature value. Using (3302) the key value to encode the counter value as the signature value may be carried out by applying a hash function or algorithm to encode the counter value as the signature value.

In view of the explanations set forth above, readers will recognize that the benefits of TPMS RF authentication according to embodiments of the present disclosure include, but are not limited to:
- A vehicle's TPMS sensors transmit security information such as signature values or counter values that can be used to authenticate the TPMS sensor to a vehicle computer or electronic control unit (ECU).
- The vehicle ECU can be configured to accept TPMS data from authenticated TPMS sensors and reject any transmissions that may be from an unauthorized device such as an attacker/hacker device.
- Since many TPMS systems use only unidirectional RF links, the disclosed system enables a TPMS sensor to authenticate itself without the need for bidirectional communication between the TPMS sensor and an ECU because the ECU does not need to send any authentication information back to the TPMS sensor.
- The ECU is configured to use RF signal characteristic data that is already available such as RF power level and message repetition rates in order to distinguish between transmissions from an authentic TPMS and unauthorized transmitters/attackers.

Exemplary embodiments of the present invention are described largely in the context of a fully functional computer system for TPMS RF authentication. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, an apparatus, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or other devices to cause a series of operational steps to be performed on the computer, other programmable apparatuses or other devices to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, apparatuses, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Advantages and features of the present disclosure can be further described by the following statements:

1. A method, system, apparatus, and computer program product for tire pressure monitoring system (TPMS) sensor authentication including receiving, by an electronic control unit (ECU) of a vehicle, a first radio frequency (RF) transmission that includes TPMS data and a first signature value; using, by the ECU, a key value to generate a second signature value; determining, by the ECU, whether the second signature value corresponds with the first signature value; and using, by the ECU, a determination of whether the second signature value corresponds with the first signature value to determine whether the first RF transmission is from a particular TPMS sensor that is authenticated to the key value.

2. The method, system, apparatus, and computer program product of statement 1 further comprising rejecting, by the ECU, the first RF transmission after determining that the first RF transmission is not from the particular TPMS sensor associated with the key value.

3. The method, system, apparatus, and computer program product of any of statements 1-2, wherein determining, by the ECU, whether the second signature value corresponds with the first signature value includes: determining whether the second signature value authenticates a message counter value within the data of the first RF transmission.

4. The method, system, apparatus, and computer program product of any of statements 1-3, further comprising computer program instructions that when executed by the computer processor cause the apparatus to carry out the operations of: logging, by the ECU, details associated with the first RF transmission after determining that the first RF transmission is not from the particular TPMS sensor associated with the key value.

5. The method, system, apparatus, and computer program product of any of statements 1-4, further comprising computer program instructions that when executed by the computer processor cause the apparatus to carry out the operations of: receiving, by the ECU, the key value from a programming device coupled to the ECU.

6. The method, system, apparatus, and computer program product of any of statements 1-5 further comprising computer program instructions that when executed by the computer processor cause the apparatus to carry out the operations of: after determining that the first RF transmission is from the particular TPMS sensor associated with the key value, rejecting, by the ECU, any RF transmissions received with a predetermined time window after the first RF transmission is received.

7. The method, system, apparatus, and computer program product of any of statements 1-6 further comprising computer program instructions that when executed by the computer processor cause the apparatus to carry out the operations of: before receiving the first RF transmission, receiving from the particular TPMS sensor, by the ECU, a plurality of separate RF transmissions that each include a different key value portion; and using, by the ECU, the different key value portions to re-assemble the key value.

8. The method, system, apparatus, and computer program product of any of statements 1-7 further comprising computer program instructions that when executed by the computer processor cause the apparatus to carry out the operations of: receiving, by the ECU, a second RF transmission that includes data indicating a new key value; using, by the ECU, phase angle location (PAL) auto location to determine that the second RF transmission is from the particular TPMS sensor associated with the key value; after determining that the second RF transmission is from the particular TPMS sensor associated with the key value, using, by the ECU, the data indicating the new key value to determine the new key value; and utilizing, by the ECU, the new key value to authenticate subsequently received RF transmissions.

9. The method, system, apparatus, and computer program product of any of statements 1-8 further comprising computer program instructions that when executed by the computer processor cause the apparatus to carry out the operations of: receiving, by the ECU, a second RF transmission that includes a pair value; using, by the ECU, a pair value-to-key value list to determine a particular key value that is associated with the pair value; and utilizing, by the ECU, the determined particular key value to authenticate subsequently received RF transmissions.

10. A method, system, apparatus, and computer program product combined with any or none of statements 1-9 and comprising: receiving from a TPMS sensor, by an electronic control unit (ECU) of a vehicle, a plurality of separate radio frequency (RF) transmissions that each include a different key value portion; using, by the ECU, the different key value portions to generate a key value associated with the TPMS sensor; and using, by the ECU, the generated key value to determine whether a RF transmission that is received after generating the key value is from the TPMS sensor associated with the generated key value.

11. The method, system, apparatus, and computer program product of any of statements 1-10 further comprising computer program instructions that when executed by the computer processor cause the apparatus to carry out the operations of: rejecting, by the ECU, the RF transmission after determining that the RF transmission is not from the TPMS sensor that is authenticated to the generated key value.

12. The method, system, apparatus, and computer program product of any of statements 1-11 further comprising computer program instructions that when executed by the computer processor cause the apparatus to carry out the operations of: after generating the key value, receiving, by the ECU, the RF transmission that includes TPMS data and a first signature value; wherein using, by the ECU, the generated key value to determine whether the RF transmission is from the TPMS sensor associated with the generated key value includes: using, by the ECU, the generated key value to generate a second signature value; determining, by the ECU, whether the second signature value corresponds with the first signature value; and using, by the ECU, a determination of whether the second signature value corresponds with the first signature value to determine whether the RF transmission is from the TPMS sensor that is authenticated to the generated key value.

13. A method, system, apparatus, and computer program product combined with any or none of statements 1-12 and comprising: receiving, by an electronic control unit (ECU) of a vehicle, one or more radio frequency (RF) transmissions; determining, by the ECU, whether characteristics of the one or more RF transmissions align with known characteristics of RF transmissions from an authenticated TPMS sensor; and using, by the ECU, a determination of whether the characteristics of the one or more RF transmissions align with the known characteristics of RF transmissions from the authenticated TPMS sensor to determine whether the one or more RF transmissions are from the authenticated TPMS sensor.

14. The method, system, apparatus, and computer program product of any of statements 1-13, wherein determining, by the ECU, whether characteristics of the one or more RF transmissions align with the known characteristics of RF transmissions from the authenticated TPMS sensor includes: determining whether the one or more RF transmissions are associated with a repetition rate that is different than a known repetition rate associated with the authenticated TPMS sensor.

15. The method, system, apparatus, and computer program product of any of statements 1-14 wherein determining, by the ECU, whether characteristics of the one or more RF transmissions align with known characteristics of RF transmissions from the authenticated TPMS sensor includes: determining whether the one or more RF transmissions are associated with a RF power level that is different than the RF power level of RF transmission from the authenticated TPMS sensor.

16. The method, system, apparatus, and computer program product of any of statements 1-15 wherein determining, by the ECU, whether characteristics of the one or more RF transmissions align with the known characteristics of RF transmissions from the authenticated TPMS includes: determining whether the one or more RF transmissions are received at a time that is different than an expected time associated with the RF transmissions from the authenticated TPMS sensor.

17. The method, system, apparatus, and computer program product of any of statements 1-16 wherein determining, by the ECU, whether characteristics of the one or more RF transmissions align with the known characteristics of RF transmissions from the authenticated TPMS sensor includes: detecting changes in background RF signal levels associated with the one or more RF transmissions that are different than any changes in background RF signal levels associated with the RF transmissions from the authenticated TPMS sensor.

18. The method, system, apparatus, and computer program product of any of statements 1-17 wherein determining, by the ECU, whether characteristics of the one or more RF transmissions align with the known characteristics of RF transmissions from the authenticated TPMS sensor includes: determining whether one or more parameters indicating at least one of consistency and validity for the one or more RF transmissions exceed one or more thresholds associated with the RF transmission from the authenticated TPMS sensor.

19. The method, system, apparatus, and computer program product of any of statements 1-18 further comprising computer program instructions that when executed by the computer processor cause the apparatus to carry out the operations of: measuring, by the ECU, RF power levels while the tire is in motion; and using, by the ECU, the measured RF power levels to generate the known characteristics of the one or more RF transmissions from the authenticated TPMS sensor.

20. A method, system, apparatus, and computer program product combined with any or none of statements 1-19 and comprising: generating, by the TPMS sensor, TPMS data associated with one or more measurements of a tire; generating, by the TPMS sensor, transmission data that includes the TPMS data; using, by the TPMS sensor, a key value to generate a signature value for authenticating some portion of the transmission data; and including, by the TPMS sensor, the signature value in a radio frequency (RF) transmission of the transmission data.

21. The method, system, apparatus, and computer program product of any of statements 1-20, further comprising computer program instructions that when executed by the computer processor cause the apparatus to carry out the operations of: transmitting, by the TPMS sensor, at least some portion of the key value.

22. The method, system, apparatus, and computer program product of any of statements 1-21, wherein transmitting, by the TPMS sensor, at least some portion of the key value includes: transmitting, by the TPMS sensor, a plurality of separate radio frequency (RF) transmissions that each include a different portion of the key value.

23. The method, system, apparatus, and computer program product of any of statements 1-22, wherein transmitting, by the TPMS sensor, at least some portion of the key value includes: determining, by the TPMS sensor, that the tire exceeds a threshold speed for at least a threshold period of time; and after determining that the tire exceeds the threshold speed for at least the threshold period of time, transmitting, by the TPMS sensor, at least some portion of the key value.

24. The method, system, apparatus, and computer program product of any of statements 1-23, wherein transmitting, by the TPMS sensor, at least some portion of the key value includes: determining, by the TPMS sensor, that an amount of time after an installation of the TPMS sensor exceeds a predetermined threshold; and after determining that the amount of time after the installation of the TPMS sensor exceeds the predetermined threshold, transmitting, by the TPMS sensor, some portion of the key value.

25. The method, system, apparatus, and computer program product of any of statements 1-24, wherein transmitting, by the TPMS sensor, at least some portion of the key value includes: determining during a TPMS installation that a pressure of the tire exceeds a predetermined threshold; and after determining that the pressure of the tire exceeds the predetermined threshold, transmitting at least some portion of the key value.

26. The method, system, apparatus, and computer program product of any of statements 1-25, wherein transmitting, by the TPMS sensor, at least some portion of the key value includes: generating an encrypted version of at least some portion of the key value.

27. The method, system, apparatus, and computer program product of any of statements 1-26, further comprising computer program instructions that when executed by the computer processor cause the apparatus to carry out the operations of: receiving, by the TPMS sensor, a trigger command from a low frequency (LF) device; and transmitting, by the TPMS sensor, the key value after receiving the trigger command.

28. The method, system, apparatus, and computer program product of any of statements 1-27, wherein generating, by the TPMS sensor, transmission data that includes the TPMS data includes: generating a counter value associated with the transmission data.

29. The method, system, apparatus, and computer program product of any of statements 1-28, wherein using, by the TPMS sensor, a key value to generate a signature value for authenticating some portion of the transmission data includes: using the key value and the counter value to generate the signature value.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

The invention claimed is:

1. An apparatus for tire pressure monitoring system (TPMS) sensor authentication, the apparatus including a computer processor coupled to a computer readable storage medium, the computer readable storage medium including computer program instructions that when executed by the computer processor cause the apparatus to carry out the operations of:
   receiving, by an electronic control unit (ECU) of a vehicle, a first radio frequency (RF) transmission that includes TPMS data and a first signature value;
   using, by the ECU, a key value and at least a portion of the TPMS data to generate a second signature value;
   determining, by the ECU, whether the second signature value corresponds with the first signature value; and
   using, by the ECU, a determination of whether the second signature value corresponds with the first signature value to determine whether the first RF transmission is from a particular TPMS sensor that is authenticated to the key value, wherein data indicating the key value was received from the particular TPMS sensor prior to the first RF transmission.

2. The apparatus of claim 1 further comprising computer program instructions that when executed by the computer processor cause the apparatus to carry out the operations of:
   rejecting, by the ECU, the first RF transmission after determining that the first RF transmission is not from the particular TPMS sensor associated with the key value.

3. The apparatus of claim 1 wherein determining, by the ECU, whether the second signature value corresponds with the first signature value includes:
   determining whether the second signature value authenticates a message counter value within the data of the first RF transmission.

4. The apparatus of claim 1 further comprising computer program instructions that when executed by the computer processor cause the apparatus to carry out the operations of:
   logging, by the ECU, details associated with the first RF transmission after determining that the first RF transmission is not from the particular TPMS sensor associated with the key value.

5. The apparatus of claim 1 further comprising computer program instructions that when executed by the computer processor cause the apparatus to carry out the operations of:
   after determining that the first RF transmission is from the particular TPMS sensor associated with the key value, rejecting, by the ECU, any RF transmissions received within a predetermined time window after the first RF transmission is received.

6. The apparatus of claim 1 further comprising computer program instructions that when executed by the computer processor cause the apparatus to carry out the operations of:

before receiving the first RF transmission, receiving from the particular TPMS sensor, by the ECU, a plurality of separate RF transmissions that each include a different key value portion; and
using, by the ECU, the different key value portions to generate the key value.

7. The apparatus of claim 1 further comprising computer program instructions that when executed by the computer processor cause the apparatus to carry out the operations of:
receiving, by the ECU, a second RF transmission that includes data indicating a new key value;
using, by the ECU, phase angle location (PAL) auto location to determine that the second RF transmission is from the particular TPMS sensor associated with the key value;
after determining that the second RF transmission is from the particular TPMS sensor associated with the key value, using, by the ECU, the data indicating the new key value to determine the new key value; and
utilizing, by the ECU, the new key value to authenticate subsequently received RF transmissions.

8. The apparatus of claim 1, wherein using, by the ECU, a key value to generate a second signature value includes:
generating the second signature using the key value to hash one or more portions of an RF transmission frame of the first RF transmission.

9. The apparatus of claim 1 further comprising computer program instructions that when executed by the computer processor cause the apparatus to carry out the operations of:
receiving, by the ECU, a second RF transmission that includes a pair value;
using, by the ECU, a pair value-to-key value list to determine a particular key value that is associated with the pair value; and
utilizing, by the ECU, the determined particular key value to authenticate subsequently received RF transmissions.

10. An apparatus for tire pressure monitoring system (TPMS) sensor authentication, the apparatus including a computer processor coupled to a computer readable storage medium, the computer readable storage medium including computer program instructions that when executed by the computer processor cause the apparatus to carry out the operations of:
receiving from a TPMS sensor, by an electronic control unit (ECU) of a vehicle, a plurality of separate radio frequency (RF) transmissions that each include a different key value portion;
using, by the ECU, the different key value portions to generate a key value associated with the TPMS sensor; and
using, by the ECU, the generated key value to determine whether a RF transmission that is received after generating the key value is from the TPMS sensor associated with the generated key value.

11. The apparatus of claim 10 further comprising computer program instructions that when executed by the computer processor cause the apparatus to carry out the operations of:
rejecting, by the ECU, the RF transmission after determining that the RF transmission is not from the TPMS sensor that is authenticated to the generated key value.

12. The apparatus of claim 10 further comprising computer program instructions that when executed by the computer processor cause the apparatus to carry out the operations of:
after generating the key value, receiving, by the ECU, the RF transmission that includes TPMS data and a first signature value;
wherein using, by the ECU, the generated key value to determine whether the RF transmission is from the TPMS sensor associated with the generated key value includes:
using, by the ECU, the generated key value to decode generate a second signature value;
determining, by the ECU, whether the second signature value corresponds with the first signature value; and
using, by the ECU, a determination of whether the second signature value corresponds with the first signature value to determine whether the RF transmission is from the TPMS sensor that is authenticated to the generated key value.

13. An apparatus for tire pressure monitoring system (TPMS) sensor authentication, the apparatus including a computer processor coupled to a computer readable storage medium, the computer readable storage medium including computer program instructions that when executed by the computer processor cause the apparatus to carry out the operations of:
receiving, by an electronic control unit (ECU) of a vehicle, one or more radio frequency (RF) transmissions;
determining, by the ECU, whether characteristics of the one or more RF transmissions align with known characteristics of RF transmissions from an authenticated TPMS sensor, wherein the characteristics of the RF transmissions include an RF transmission power level measured by the ECU; and
using, by the ECU, a determination of whether the characteristics of the one or more RF transmissions align with the known characteristics of RF transmissions from the authenticated TPMS sensor to determine whether the one or more RF transmissions are from the authenticated TPMS sensor.

14. The apparatus of claim 13 wherein determining, by the ECU, whether characteristics of the one or more RF transmissions align with the known characteristics of RF transmissions from the authenticated TPMS sensor includes:
determining whether the one or more RF transmissions are associated with a repetition rate that is different than a known repetition rate associated with the authenticated TPMS sensor.

15. The apparatus of claim 13 wherein determining, by the ECU, whether characteristics of the one or more RF transmissions align with known characteristics of RF transmissions from the authenticated TPMS sensor includes:
determining whether the one or more RF transmissions are associated with a RF power level that is different than the RF power level of RF transmission from the authenticated TPMS sensor.

16. The apparatus of claim 13 wherein determining, by the ECU, whether characteristics of the one or more RF transmissions align with the known characteristics of RF transmissions from the authenticated TPMS includes:
determining whether the one or more RF transmissions are received at a time that is different than an expected time associated with the RF transmissions from the authenticated TPMS sensor.

17. The apparatus of claim 13 wherein determining, by the ECU, whether characteristics of the one or more RF transmissions align with the known characteristics of RF transmissions from the authenticated TPMS sensor includes:

detecting changes in background RF signal levels associated with the one or more RF transmissions that are different than any changes in background RF signal levels associated with the RF transmissions from the authenticated TPMS sensor.

18. The apparatus of claim 13 wherein determining, by the ECU, whether characteristics of the one or more RF transmissions align with the known characteristics of RF transmissions from the authenticated TPMS sensor includes:
determining whether one or more parameters indicating at least one of consistency and validity for the one or more RF transmissions exceed one or more thresholds associated with the RF transmission from the authenticated TPMS sensor.

19. The apparatus of claim 13 further comprising computer program instructions that when executed by the computer processor cause the apparatus to carry out the operations of:
measuring, by the ECU, RF power levels while the tire is in motion; and
using, by the ECU, the measured RF power levels to generate the known characteristics of the one or more RF transmissions from the authenticated TPMS sensor.

20. An apparatus for tire pressure monitoring system (TPMS) sensor authentication, the apparatus including a computer processor coupled to a computer readable storage medium, the computer readable storage medium including computer program instructions that when executed by the computer processor cause the apparatus to carry out the operations of:
transmitting, by the TPMS sensor, at least some portion of a key value;
generating, by the TPMS sensor, TPMS data associated with one or more measurements of a tire;
generating, by the TPMS sensor, transmission data that includes the TPMS data;
using, by the TPMS sensor, the key value to generate a signature value for authenticating some portion of the transmission data; and
including, by the TPMS sensor, the signature value in a radio frequency (RF) transmission of the transmission data.

21. The apparatus of claim 20, wherein transmitting, by the TPMS sensor, at least some portion of the key value includes:
transmitting, by the TPMS sensor, a plurality of separate radio frequency (RF) transmissions that each include a different portion of the key value.

22. The apparatus of claim 20, wherein transmitting, by the TPMS sensor, at least some portion of the key value includes:
determining, by the TPMS sensor, that the tire exceeds a threshold speed for at least a threshold period of time; and
after determining that the tire exceeds the threshold speed for at least the threshold period of time, transmitting, by the TPMS sensor, at least some portion of the key value.

23. The apparatus of claim 20, wherein transmitting, by the TPMS sensor, at least some portion of the key value includes:
determining, by the TPMS sensor, that an amount of time after an installation of the TPMS sensor exceeds a predetermined threshold; and
after determining that the amount of time after the installation of the TPMS sensor exceeds the predetermined threshold, transmitting, by the TPMS sensor, some portion of the key value.

24. The apparatus of claim 20, wherein transmitting, by the TPMS sensor, at least some portion of the key value includes:
determining during a TPMS installation that a pressure of the tire exceeds a predetermined threshold; and
after determining that the pressure of the tire exceeds the predetermined threshold, transmitting at least some portion of the key value.

25. The apparatus of claim 20, wherein transmitting, by the TPMS sensor, at least some portion of the key value includes:
generating an encrypted version of at least some portion of the key value.

26. The apparatus of claim 20, further comprising computer program instructions that when executed by the computer processor cause the apparatus to carry out the operations of:
receiving, by the TPMS sensor, a trigger command from a low frequency (LF) device; and
transmitting, by the TPMS sensor, the key value after receiving the trigger command.

27. The apparatus of claim 20 wherein generating, by the TPMS sensor, transmission data that includes the TPMS data includes:
generating a counter value associated with the transmission data.

28. The apparatus of claim 27 wherein using, by the TPMS sensor, a key value to generate a signature value for authenticating some portion of the transmission data includes:
using the key value and the counter value to generate the signature value.

29. The apparatus of claim 20, wherein using, by the TPMS sensor, the key value to generate a signature value for authenticating some portion of the transmission data includes:
generating the signature value using the key value to hash the portion of the transmission data.

* * * * *